(12) United States Patent
Park et al.

(10) Patent No.: US 10,567,773 B2
(45) Date of Patent: Feb. 18, 2020

(54) INTER-LAYER VIDEO DECODING METHOD FOR PERFORMING SUBBLOCK-BASED PREDICTION AND APPARATUS THEREFOR, AND INTER-LAYER VIDEO ENCODING METHOD FOR PERFORMING SUBBLOCK-BASED PREDICTION AND APPARATUS THEREFOR

(71) Applicant: SAMSUNG ELECTRONICS CO., LTD., Suwon-si (KR)

(72) Inventors: Min-woo Park, Yongin-si (KR); Jin-young Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 456 days.

(21) Appl. No.: 15/192,262

(22) Filed: Jun. 24, 2016

(65) Prior Publication Data

US 2016/0309156 A1    Oct. 20, 2016

Related U.S. Application Data

(63) Continuation of application No. PCT/KR2014/012932, filed on Dec. 26, 2014.
(Continued)

(51) Int. Cl.
*H04N 19/139* (2014.01)
*H04N 19/30* (2014.01)
(Continued)

(52) U.S. Cl.
CPC ......... *H04N 19/139* (2014.11); *H04N 19/119* (2014.11); *H04N 19/187* (2014.11);
(Continued)

(58) Field of Classification Search
CPC .... H04N 19/139; H04N 19/52; H04N 19/521; H04N 19/188; H04N 19/577;
(Continued)

(56) References Cited

U.S. PATENT DOCUMENTS 7,605,727 B2   10/2009   Sung et al.
8,014,447 B2    9/2011   Hinz et al.
(Continued)

FOREIGN PATENT DOCUMENTS

CN   1846446 A    10/2006
CN   102595135 A   7/2012
(Continued)

OTHER PUBLICATIONS

Bartnik, et al., "HEVC Extension for Multiview Video Coding and Multiview Video plus Depth Coding", 2012, Video Coding Experts Group (VCEG) of ITU-T SG.16, VCEG-AR13, XP030003856, 42 pages total.
(Continued)

*Primary Examiner* — Joseph W Becker
(74) *Attorney, Agent, or Firm* — Sughrue Mion, PLLC

(57) ABSTRACT

Provided is an inter-layer video decoding method including: obtaining subblock size information of a second layer image, which indicates a size of a subblock within a range less than or equal to a maximum size of a coding unit; determining a size of a subblock from a range equal to or greater than a minimum size of the coding unit and less than or equal to the maximum size of the coding unit by using the size information; determining a candidate block that corresponds to a current block included in the second layer image and is included in a first layer image different from the second layer image; obtaining motion information of a subblock of the first layer image corresponding to a subblock of the second layer image, when at least one subblock
(Continued)

of the second layer image determined by using the size of the subblock is obtained from the current block; obtaining or predicting motion information of the current block by using the motion information of the subblock of the first layer image, and decoding the current block by using the obtained or predicted motion information of the current block, wherein the subblock of the first layer image is determined to be located in a region inside the candidate block.

8 Claims, 40 Drawing Sheets

Related U.S. Application Data

(60) Provisional application No. 61/920,818, filed on Dec. 26, 2013.

(51) Int. Cl.
| | |
|---|---|
| *H04N 19/597* | (2014.01) |
| *H04N 19/119* | (2014.01) |
| *H04N 19/187* | (2014.01) |
| *H04N 19/169* | (2014.01) |
| *H04N 19/513* | (2014.01) |
| *H04N 19/577* | (2014.01) |
| *H04N 19/52* | (2014.01) |
| *H04N 19/503* | (2014.01) |
| *H04N 19/157* | (2014.01) |

(52) U.S. Cl.
CPC ........... *H04N 19/188* (2014.11); *H04N 19/30* (2014.11); *H04N 19/52* (2014.11); *H04N 19/521* (2014.11); *H04N 19/577* (2014.11); *H04N 19/597* (2014.11); *H04N 19/157* (2014.11); *H04N 19/503* (2014.11)

(58) Field of Classification Search
CPC .. H04N 19/597; H04N 19/119; H04N 19/187; H04N 19/30; H04N 19/157; H04N 19/503
See application file for complete search history.

(56) References Cited

U.S. PATENT DOCUMENTS

| | | | | |
|---|---|---|---|---|
| 10,003,793 | B2* | 6/2018 | Fang | .................... H04N 19/46 |
| 2012/0177116 | A1 | 7/2012 | Panusopone et al. | |
| 2012/0230408 | A1 | 9/2012 | Zhou | |
| 2012/0230411 | A1 | 9/2012 | Liu et al. | |
| 2013/0308704 | A1 | 11/2013 | Park et al. | |
| 2013/0329794 | A1 | 12/2013 | Jeon et al. | |
| 2014/0133556 | A1* | 5/2014 | Chen | .................... H04N 19/597 |
| | | | | 375/240.12 |
| 2016/0165263 | A1* | 6/2016 | Zhang | .................. H04N 19/597 |
| | | | | 375/240.12 |

FOREIGN PATENT DOCUMENTS

| | | | |
|---|---|---|---|
| EP | 2528345 | A1 | 11/2012 |
| EP | 3016392 | A1 | 5/2016 |
| KR | 10-2012-0118780 | A | 10/2012 |
| KR | 10-2013-0133250 | A | 12/2013 |
| KR | 10-2013-0136525 | A | 12/2013 |
| KR | 10-2013-0138461 | A | 12/2013 |
| KR | 10-2013-0139827 | A | 12/2013 |
| WO | 2008/049052 | A2 | 4/2008 |
| WO | 2008/049052 | A3 | 4/2008 |

OTHER PUBLICATIONS

Schwarz, et al., "3D Video Coding Using Advanced Prediction, Depth Modeling, and Encoder Control Methods", 2012, 2012 Picture Coding Symposium (PCS 2012), XP032449814, 4 pages total.

Communication dated Jun. 22, 2017, issued by the European Patent Office in counterpart European Patent Application No. 14873781.0.

An, et al., "3D-CE3: Sub-PU level inter-view motion prediction", Joint Collaborative Team on 3D Video Coding Extension Development of ITU-T SG 16 WP 3 and ISO/IEC JTC 1/SC 29/WG 11, 6$^{th}$ meeting, Document JCT3V-F0110, Oct. 25, 2013-Nov. 1, 2013, 6 pages total.

Search Report dated Mar. 16, 2015, issued by the International Searching Authority in counterpart International Patent Application No. PCT/KR2014/012932 (PCT/ISA/210).

Written Opinion dated Mar. 16, 2015, issued by the International Searching Authority in counterpart International Patent Application No. PCT/KR2014/012932 (PCT/ISA/237).

Communication dated Sep. 29, 2018, issued by the State Intellectual Property Office of P.R. China in counterpart Chinese Application No. 201480076495.4.

Jicheng AN et al., "3D-CE3.h related: Sub-PU level inter-view motion prediction", Joint Collaborative Team on 3D Video Coding Extensions of ITU-T SG 16 WP 3 and ISO/IEC JTC 1/SC 29/WG 11, 5th meeting, Document JCT3V-E0184, Jul. 27, 2013-Aug. 2, 2013, pp. 1-4 (4 pages total).

\* cited by examiner

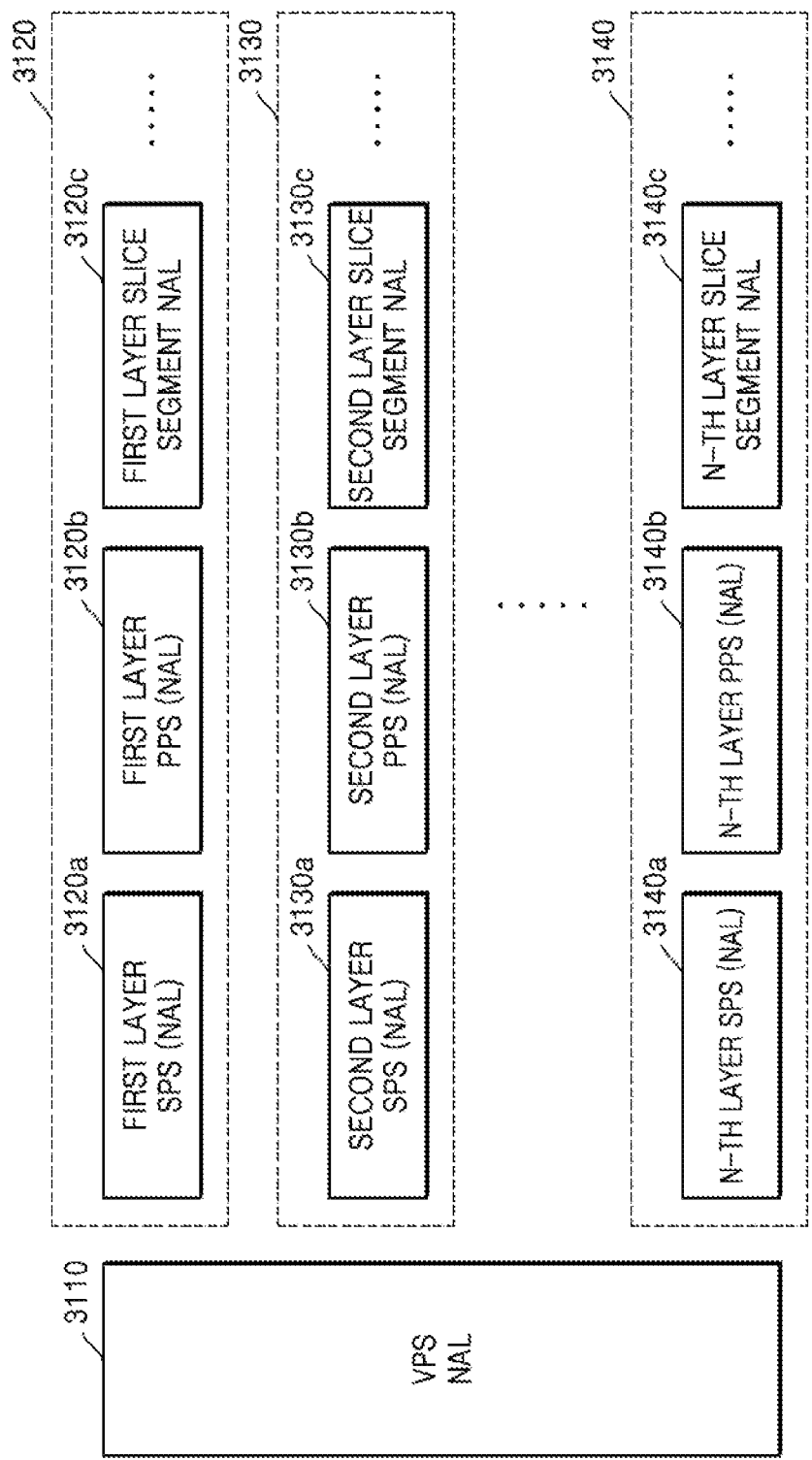

PART_nLX2N

PART_nRX2N

PART_2NXnU

PART_2NXnD

FIG. 7A

| vps_extension2( ) { | Descriptor |
|---|---|
|   while( !byte_aligned( ) ) | |
|     vps_extension_byte_alignment_reserved_one_bit | u(1) |
|   for( i = 0; i <= vps_max_layers_minus1; i++ ) { | |
|     layerId = layer_id_in_nuh[ i ] | |
|     if (layerId != 0 ) { | |
|       iv_mv_pred_flag [ layerId ] | u(1) |
| 71 —       log2_sub_pb_size_minus3 [ layerId ] | ue(v) |

FIG. 7B

| sps_3d_extension( ) { | Descriptor |
|---|---|
|    for( d = 0; d <= 1; d++ ) { | |
|       ... | |
|       ... | |
|      if( d = = 0 ) { | |
|       log2_sub_pb_size_minus3[ d ] | ue(v) |
|       ... | |
|       ... | |
| ... | |
| ... | |
|     } else { | |
|       ... | |
|       log2_mpi_sub_pb_size_minus3[ d ] | ue(v) |
|       ... | |
|       ... | |
|       ... | |
|       ... | |
|       ... | |
|     } | |
|    } | |
| } | |

72 — log2_sub_pb_size_minus3[ d ]
73 — log2_mpi_sub_pb_size_minus3[ d ]

INTER-LAYER VIDEO DECODING METHOD FOR PERFORMING SUBBLOCK-BASED PREDICTION AND APPARATUS THEREFOR, AND INTER-LAYER VIDEO ENCODING METHOD FOR PERFORMING SUBBLOCK-BASED PREDICTION AND APPARATUS THEREFOR

TECHNICAL FIELD

The present disclosure relates to an inter-layer video encoding method and an inter-layer video decoding method, and more particularly, to an inter-layer video encoding method and decoding method of determining a subblock and performing prediction based on the determined subblock.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multi-layer video codec encodes and decodes a first layer video and at least one second layer video. Amounts of data of the first layer video and the second layer video may be reduced by removing temporal/spatial redundancy and layer redundancy of the first layer video and the second layer video.

Meanwhile, when subblock-based inter-layer prediction is performed, subblock size information is signaled. Here, since the subblock size information is signaled without considering at all a case in which the subblock size is less than a minimum size of a coding unit or is greater than a maximum size of the coding unit, realization/operation complexity of encoding and decoding apparatuses unnecessarily increases. Also, the signaled subblock size information includes information about a block having a size that is not used as a prediction unit, and thus the number of bits may be unnecessarily wasted.

Also, when the subblock-based inter-layer prediction is performed, since a subblock is determined without considering a prediction unit allowed in an existing codec, compatibility with the existing codec is low.

DETAILED DESCRIPTION OF THE INVENTION

Technical Problem

According to an aspect of the present disclosure, there is provided an inter-layer video decoding method including obtaining subblock size information of a second layer image, which indicates a size of a subblock within a range that is equal to or greater than a minimum size of a coding unit and is less than or equal to a maximum size of the coding unit; determining a size of a subblock from a range that is equal to or greater than the maximum size of the coding unit and is less than or equal to the maximum size of the coding unit, by using the subblock size information; determining a candidate block that corresponds to a current block included in the second layer image and is included in a first layer image different from the second layer image; obtaining motion information of a subblock of the first layer image corresponding to a subblock of the second layer image, when at least one subblock of the second layer image determined by using the size of the subblock is obtained from the current block; and obtaining or predicting motion information of the current block by using the motion information of the subblock of the first layer image, and decoding the current block by using the obtained or predicted motion information of the current block, wherein the subblock of the first layer image is determined to be located in a region inside the candidate block According to an aspect of the present disclosure, there is provided an inter-layer video encoding method including determining a size of a subblock of a second layer image from a range that is equal to or greater than a minimum size of a coding unit and less than or equal to a maximum size of the coding unit; determining a candidate block that corresponds to a current block included in the second layer image and is included in a first layer image different from the second layer image; obtaining motion information of a subblock of the first layer image corresponding to the subblock of the second layer image, when at least one subblock of the second layer image determined by using the determined size of the subblock is obtained from the current block; obtaining or predicting motion information of the current block by using the obtained motion information of the subblock of the first layer image, and encoding the current block by using the obtained or predicted motion information of the current block; and generating a bitstream including subblock size information indicating the determined size of the subblock, wherein the subblock of the first layer image is determined to be located in a region inside the candidate block.

According to an aspect of the present disclosure, there is provided an inter-layer video decoding method including decoding a first layer image that is encoded; determining a candidate block that corresponds to a current block included in a second layer image and is included in the first layer image; when a size of the current block is not an integer multiple of a predetermined size of a subblock, determining at least one block having a size that is not the predetermined size of the subblock as a subblock; when the subblock is determined, obtaining motion information of a subblock of the first layer image corresponding to a subblock of the second layer image; and obtaining or predicting motion information of the current block by using the obtained motion information of the subblock of the first layer image, and decoding the current block by using the obtained or predicted motion information of the current block, wherein the subblock of the second layer image is determined to be located in a region inside the candidate block.

According to an aspect of the present disclosure, there is provided an inter-layer video encoding method including encoding a first layer image; determining a candidate block that corresponds to a current block included in a second layer image and is included in the first layer image; when a size of the current block is not an integer multiple of a predetermined size of a subblock, determining at least one block having a size that is not the predetermined size of the subblock as a subblock; when the subblock is determined, obtaining motion information of a subblock of the first layer image corresponding to a subblock of the second layer image; and obtaining or predicting motion information of the current block by using the obtained motion information of the subblock of the first layer image, and encoding the current block by using the obtained or predicted motion information of the current block, wherein the subblock of the second layer image is determined to be located in a region inside the candidate block.

Advantageous Effects

According to an embodiment of the present disclosure, by setting a limit on a subblock size range, a size of signaled subblock size-related information may be reduced and realization/operation complexity of encoding and decoding apparatuses may be reduced.

Also, according to another embodiment of the present disclosure, by determining a size of a subblock in consideration of a size of a prediction unit allowed in an existing codec, compatibility with the existing codec may increase.

DESCRIPTION OF THE DRAWINGS

FIG. 3C is a diagram of network abstraction layer (NAL) units including encoded data of a multilayer video, according to various embodiments.

FIG. 7A is a diagram illustrating a video parameter set (VPS) extension syntax according to an embodiment of the present disclosure.

FIG. 7B is a diagram illustrating a sequence parameter set (SPS) extension syntax according to an embodiment of the present disclosure.

BEST MODE

Figure 1A:
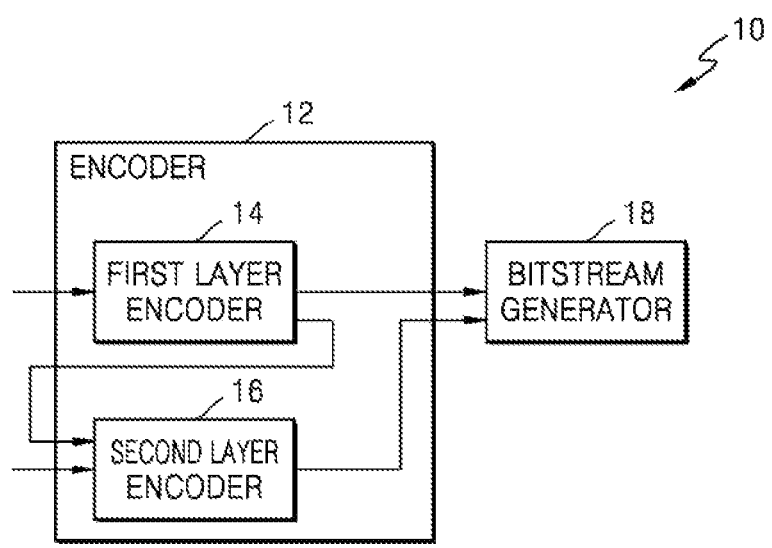
FIG. 1A is a block diagram of an inter-layer video encoding apparatus according to various embodiments.

According to an aspect of the present disclosure, there is provided an inter-layer video decoding method including obtaining subblock size information of a second layer image, which indicates a size of a subblock within a range that is equal to or greater than a minimum size of a coding unit and is less than or equal to a maximum size of the coding unit; determining a size of a subblock from a range that is equal to or greater than the maximum size of the coding unit and is less than or equal to the maximum size of the coding unit, by using the subblock size information; determining a candidate block that corresponds to a current block included in the second layer image and is included in a first layer image different from the second layer image; obtaining motion information of a subblock of the first layer image corresponding to a subblock of the second layer image, when at least one subblock of the second layer image determined by using the size of the subblock is obtained from the current block; and obtaining or predicting motion information of the current block by using the motion information of the subblock of the first layer image, and decoding the current block by using the obtained or predicted motion information of the current block, wherein the subblock of the first layer image is determined to be located in a region inside the candidate block.

The determining of the candidate block that corresponds to the current block included in the second layer image and is included in the first layer image different from the second layer image may include obtaining, from the current block included in the second layer image, a disparity vector pointing to the candidate block included in the first layer image different from the second layer image, wherein a vertical component of the obtained disparity vector is 0.

The current block may be one of one or more prediction units generated as a coding unit of the second layer image is split, and the subblock may be a block smaller than or equal to the prediction unit.

The determining of the size of the subblock from the range that is equal to or greater than the maximum size of the coding unit and is less than or equal to the maximum size of the coding unit, by using the subblock size information may include determining the size of the subblock by using information indicating the minimum size of the coding unit obtained from a bitstream and information indicating a difference between the maximum size of the coding unit and the minimum size of the coding unit and included in the bitstream.

A video parameter set network abstraction layer (VPS NAL) unit or a sequence parameter set network abstraction layer (SPS NAL) unit, which includes the subblock size information, may be obtained from a bitstream, and the subblock size information of the second layer image may be obtained from the VPS NAL unit or the SPS NAL unit.

According to an aspect of the present disclosure, there is provided an inter-layer video encoding method including determining a size of a subblock of a second layer image from a range that is equal to or greater than a minimum size of a coding unit and less than or equal to a maximum size of the coding unit; determining a candidate block that corresponds to a current block included in the second layer image and is included in a first layer image different from the second layer image; obtaining motion information of a subblock of the first layer image corresponding to the subblock of the second layer image, when at least one subblock of the second layer image determined by using the determined size of the subblock is obtained from the current block; obtaining or predicting motion information of the current block by using the obtained motion information of the subblock of the first layer image, and encoding the current block by using the obtained or predicted motion information of the current block; and generating a bitstream including subblock size information indicating the determined size of the subblock, wherein the subblock of the first layer image is determined to be located in a region inside the candidate block.

The determining of the candidate block that corresponds to the current block included in the second layer image and is included in the first layer image different from the second layer image may include obtaining, from the current block included in the second layer image, a disparity vector pointing to the candidate block included in the first layer image different from the second layer image, wherein a vertical component of the obtained disparity vector may be 0.

The current block may be one of one or more prediction units generated as a coding unit of the second layer image is split, and the subblock may be a block smaller than or equal to the prediction unit.

The generating of the bitstream including the subblock size information indicating the determined size of the subblock may include generating the bitstream further including information indicating the minimum size of the coding unit and information indicating a difference between the maximum size of the coding unit and the minimum size of the coding unit.

The generating of the bitstream including the subblock size information indicating the determined size of the subblock may include generating a video parameter set network abstraction layer (VPS NAL) unit or a sequence parameter set network abstraction layer (SPS NAL) unit, which includes the subblock size information; and generating the bitstream including the VPS NAL unit or the SPS NAL unit.

According to an aspect of the present disclosure, there is provided an inter-layer video decoding apparatus including an obtainer configured to obtain subblock size information of a second layer image within a range that is equal to or greater than a minimum size of a coding unit and is less than or equal to a maximum size of the coding unit; and a decoder configured to determine a size of a subblock from a range that is equal to or greater than the maximum size of the coding unit and is less than or equal to the maximum size of the coding unit, by using the subblock size information, determine a candidate block that corresponds to a current block included in the second layer image and is included in a first layer image different from the second layer image, obtain motion information of a subblock of the first layer image corresponding to a subblock of the second layer image, when at least one subblock of the second layer image determined by using the size of the subblock is obtained from the current block, obtain or predict motion information of the current block by using the motion information of the subblock of the first layer image, and decode the current block by using the obtained or predicted motion information of the current block, wherein the subblock of the first layer image is determined to be located in a region inside the candidate block.

According to an aspect of the present disclosure, there is provided an inter-layer video encoding apparatus including an encoder configured to determine a size of a subblock of a second layer image from a range that is equal to or greater than a minimum size of a coding unit and less than or equal to a maximum size of the coding unit, determine a candidate block that corresponds to a current block included in the second layer image and is included in a first layer image different from the second layer image, obtain motion information of a subblock of the first layer image corresponding to the subblock of the second layer image, when at least one subblock of the second layer image determined by using the determined size of the subblock is obtained from the current block, obtain or predict motion information of the current block by using the obtained motion information of the subblock of the first layer image, and encode the current block by using the obtained or predicted motion information of the current block; and a bitstream generator configured to generate a bitstream including subblock size information indicating the determined size of the subblock, wherein the subblock of the first layer image is determined to be located in a region inside the candidate block.

According to an aspect of the present disclosure, there is provided an inter-layer video decoding method including decoding a first layer image that is encoded; determining a candidate block that corresponds to a current block included in a second layer image and is included in the first layer image; when a size of the current block is not an integer multiple of a predetermined size of a subblock, determining at least one block having a size that is not the predetermined size of the subblock as a subblock; when the subblock is determined, obtaining motion information of a subblock of the first layer image corresponding to a subblock of the second layer image; and obtaining or predicting motion information of the current block by using the obtained motion information of the subblock of the first layer image, and decoding the current block by using the obtained or predicted motion information of the current block, wherein the subblock of the second layer image is determined to be located in a region inside the candidate block.

According to an aspect of the present disclosure, there is provided an inter-layer video encoding method including encoding a first layer image; determining a candidate block that corresponds to a current block included in a second layer image and is included in the first layer image; when a size of the current block is not an integer multiple of a predetermined size of a subblock, determining at least one block having a size that is not the predetermined size of the subblock as a subblock; when the subblock is determined, obtaining motion information of a subblock of the first layer image corresponding to a subblock of the second layer image; and obtaining or predicting motion information of the current block by using the obtained motion information of the subblock of the first layer image, and encoding the current block by using the obtained or predicted motion information of the current block, wherein the subblock of the second layer image is determined to be located in a region inside the candidate block.

According to an aspect of the present disclosure, there is provided a non-transitory computer-readable recording medium having recorded thereon a program, which, when executed by a computer, performs the inter-layer video encoding method and the inter-layer video decoding method.

Mode of the Invention

Hereinafter, an inter-layer video encoding technique and an inter-layer video decoding technique for performing subblock-based prediction will be described with reference to FIGS. 1A through 7B. Also, a video encoding technique and a video decoding technique, which are based on coding units having a tree structure, according to embodiments applicable to the inter-layer video encoding and decoding techniques will be described with reference to FIGS. 8 through 20. Also, various embodiments to which the video encoding method and the video decoding method are applicable, will be described with reference to FIGS. 21 through 27.

Hereinafter, an 'image' may denote a still image or a moving image of a video, or a video itself.

Hereinafter, a 'sample' denotes data that is assigned to a sampling location of an image and is to be processed. For example, pixels in an image of a spatial domain may be samples.

Hereinafter, a 'current block' may denote a block of an image to be encoded or decoded.

Hereinafter, a 'neighboring block' denotes at least one encoded or decoded block adjacent to the current block. For example, a neighboring block may be located at the top, upper right, left, or upper left of a current block. Also, a neighboring block may be a spatial neighboring block or a temporal neighboring block. For example, a temporal neighboring block may include a block of a reference picture, which is co-located as a current block, or a neighboring block of the co-located block.

First, inter-layer video decoding and encoding apparatuses and methods for performing subblock-based prediction according to various embodiments will be described with reference to FIGS. 1A through 7B.

FIG. 1A is a block diagram of an inter-layer video encoding apparatus 10 according to various embodiments.

Figure 1B:
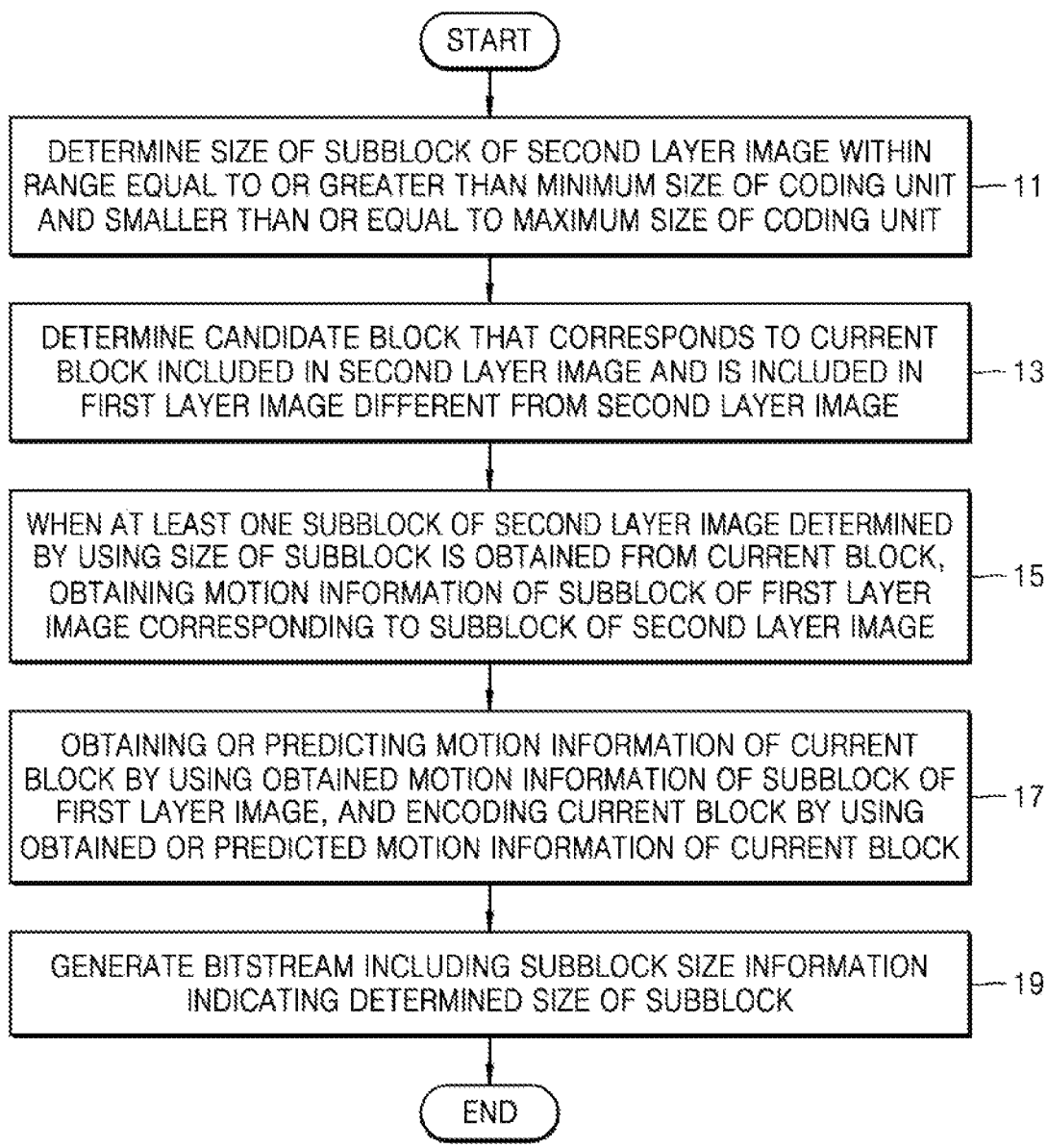
FIG. 1B is a flowchart of an inter-layer video encoding method according to various embodiments.

FIG. 1B is a flowchart of an inter-layer video encoding method according to various embodiments.

The inter-layer video encoding apparatus 10 according to various embodiments include an encoder 12 and a bitstream generator 18.

The encoder 12 may include a first layer encoder 14 and a second layer encoder 16.

The inter-layer video encoding apparatus 10 according to various embodiments may classify a plurality of image sequences according to layers and encode each of the image sequences according to a scalable video coding scheme, and output separate streams including data encoded according to layers. The inter-layer video encoding apparatus 10 may encode a first layer image sequence and a second layer image sequence to different layers.

The first layer encoder 12 may encode first layer images and output a first layer stream including encoding data of the first layer images.

The second layer encoder 16 may encode second layer images and output a second layer stream including encoding data of the second layer images.

The inter-layer video encoding apparatus 10 according to various embodiments may classify a plurality of image sequences according to layers and encode each of the image sequences similarly to a scalable video coding method, and output separate streams including data encoded according to layers. The inter-layer video encoding apparatus 10 may encode a first layer image sequence and a second layer image sequence to different layers.

For example, according to a scalable video coding method based on spatial scalability, low resolution images may be encoded as first layer images, and high resolution images may be encoded as second layer images. An encoding result of the first layer images is output as a first layer stream, and an encoding result of the second layer images is output as a second layer stream.

The inter-layer video encoding apparatus 10 according to an embodiment may express and encode the first layer stream and the second layer stream as one bitstream through a multiplexer.

As another example, a multiview video may be encoded according to a scalable video coding scheme. Left view images may be encoded as first layer images and right view images may be encoded as second layer images. Alternatively, central view images, left view images, and right view images may be each encoded, wherein the central view images are encoded as first layer images, the left view images are encoded as second layer images, and the right view images are encoded as third layer images. Alternatively, a central view color image, a central view depth image, a left view color image, a left view depth image, a right view color image, and a right view depth image may be respectively encoded as a first layer image, a second layer image, a third layer image, a fourth layer image, a fifth layer image, and a sixth layer image. As another example, a central view color image, a central view depth image, a left view depth image, a left view color image, a right view depth image, and a right view color image may be respectively encoded as a first layer image, a second layer image, a third layer image, a fourth layer image, a fifth layer image, and a sixth layer image.

As another example, a scalable video coding method may be performed according to temporal hierarchical prediction based on temporal scalability. A first layer stream including encoding information generated by encoding base frame rate images may be output. Temporal levels may be classified according to frame rates and each temporal level may be encoded according to layers. A second layer stream including encoding information of a high frame rate may be output by further encoding higher frame rate images by referring to the base frame rate images.

Also, scalable video coding may be performed on a first layer and a plurality of extension layers (a second layer through a K-th layer). When there are at least three extension layers, first layer images and K-th layer images may be encoded. Accordingly, an encoding result of the first layer images may be output as a first layer stream, and encoding results of the first through K-th layer images may be respectively output as first through K-th layer streams.

The inter-layer video encoding apparatus 10 according to various embodiment may perform inter prediction in which images of a single layer are referenced in order to predict a current image. By performing inter prediction, a motion vector indicating motion information between a current image and a reference image and a residual between the current image and the reference image may be predicted from a region corresponding to a first layer (base layer).

Also, the inter-layer video encoding apparatus 10 may perform inter-layer prediction in which prediction information of first layer images are referenced in order to predict prediction information of second layer images.

Also, when the inter-layer video encoding apparatus 10 according to an embodiment allows at least three layers, i.e., first through third layers, inter-layer prediction between a first layer image and a third layer image, and inter-layer prediction between a second layer image and a third layer image may be performed according to a multilayer prediction structure.

In interlayer prediction, a disparity vector between a current image and a reference image of a layer different from that of the current image may be derived, and a residual that is a difference component between the current image and a prediction image generated by using the reference image of the different layer may be generated.

Also, the inter-layer video encoding apparatus 10 may perform inter-layer prediction in which first layer images are referenced in order to predict second layer images.

Also, when the inter-layer video encoding apparatus 10 according to various embodiments allows at least three layers, i.e., first through third layers, inter-layer prediction between a first layer image and a third layer image, and inter-layer prediction between a second layer image and a third layer image may be performed according to a multi-layer prediction structure.

Via inter-layer prediction, a position difference component between a current image and a reference image of a layer different from that of the current image and a residual between the current image and the reference image of the different layer may be generated.

An inter-layer prediction structure will be described later with reference to FIG. 3A.

The inter-layer video encoding apparatus 10 according to various embodiments may perform encoding according to blocks of each image of a video, according to layers. A block may have a square shape, a rectangular shape, or an arbitrary geometrical shape, and is not limited to a data unit having a predetermined size. The block may be a maximum coding unit, a coding unit, a prediction unit, or a transformation unit, among coding units according to a tree structure. A largest coding unit (LCU) including coding units of a tree structure may be called differently, such as a coding tree unit, a coding block tree, a block tree, a root block tree, a coding tree, a coding root, or a tree trunk. Video encoding and decoding methods based on coding units according to a tree structure will be described later with reference to FIGS. 8 through 20.

Inter prediction and inter-layer prediction may be performed based on a data unit, such as a coding unit, a prediction unit, or a transformation unit.

The first layer encoder 12 according to various embodiments may generate symbol data by performing source coding operations including inter prediction or intra prediction on first layer images. Symbol data indicates a value of each encoding parameter and a sample value of a residual.

For example, the encoder 12 may generate symbol data by performing inter or intra prediction, transformation, and quantization on samples on samples of a data unit of first layer images, and generate a first layer stream by performing entropy encoding on the symbol data.

The second layer encoder 16 may encode second layer images based on coding units of a tree structure. The second layer encoder 16 may generate symbol data by performing inter/intra prediction, transformation, and quantization on samples of a coding unit of second layer images, and generate a second layer stream by performing entropy encoding on the symbol data.

The second layer encoder 16 according to various embodiments may perform inter-layer prediction in which a second layer image is predicted by using prediction information of a first layer image. In order to encode a second layer original image from a second layer image sequence through an inter-layer prediction structure, the second layer encoder 16 may determine prediction information of a second layer current image by using prediction information of a first layer reconstructed image, and encode a prediction error between the second layer original image and a second layer prediction image by generating the second layer prediction image based on the determined prediction information.

Meanwhile, the second layer encoder 16 may determine a block of a first layer image to be referenced by a block of a second layer image by performing inter-layer prediction according to coding units or prediction units, on the second layer image. For example, a reconstruction block of the first layer image, which is located correspondingly to a location of a current block in the second layer image, may be determined. The second layer encoder 16 may determine a second layer prediction block by using a first layer reconstruction block corresponding to a second layer block. Here, the second layer encoder 16 may determine the second layer prediction block by using the first layer reconstruction block located at the same point as the second layer block.

The second layer encoder 16 may use the second layer prediction block determined by using the first layer reconstruction block according to an inter-layer prediction block, as a reference image for inter-layer prediction of a second layer original block. The second layer encoder 16 may perform entropy encoding by transforming and quantizing an error, i.e., a residual according to inter-layer prediction, between a sample value of a second layer prediction block and a sample value of a second layer original block, by using a first layer reconstruction image.

Meanwhile, when the inter-layer video encoding apparatus 10 described above encodes a multiview video, a first layer image that is encoded may be a first view video and a second layer image may be a second view video. Since such a multiview image is obtained at the same time, similarity between images according to views is high.

However, a multiview image may have a disparity since characteristics of photographing angles, lightings, and photographing devices (a camera and a lens) are different according to views. Accordingly, encoding efficiency may be increased by performing disparity compensated prediction in which such a disparity is indicated as a disparity vector, and a region that is most similar to a block to be currently encoded is found and encoded from a different view image by using the disparity vector.

The second layer encoder 16 may determine a size of a subblock of a second layer image. Here, the subblock is a block smaller than or equal to a prediction unit. The prediction unit is generated as a coding unit is split, and the subblock is a block smaller than or equal to the prediction unit. Accordingly, the second layer encoder 16 performs inter-layer prediction according to subblock units, and determines a prediction sample value on the prediction unit by using a prediction sample values according to subblocks.

In detail, the second layer encoder 16 may determine the size of the subblock of the second layer image within a range equal to or greater than a minimum size of a coding unit and less than or equal to a maximum size of the coding unit.

The size of the subblock may be determined according to layers, and sizes of subblocks in a certain layer may be the same. Meanwhile, the subblock may be a sub-prediction unit having a square shape.

For example, the second layer encoder 16 may determine the size of the subblock within a range in which a size of a coding unit is from 8×8 to 64×64 when a minimum size of the coding unit is 8×8 and a maximum size of the coding unit is 64×64.

Hereinafter, reasons for determining the size of the subblock of the second layer image within the range equal to or greater than the minimum size of the coding unit are described.

Here, it is assumed that a current coding unit has the minimum size of the coding unit, and a partition type other than 2N×2N is determined as a partition type and thus a prediction unit included in the current coding unit is smaller than a minimum unit of the current coding unit.

Here, when an inter-layer video decoding apparatus 20 obtains subblock size information indicating a size less than the minimum size of the coding unit from the inter-layer video encoding apparatus, the inter-layer video decoding apparatus 20 may determine the size of the subblock less than the minimum size of the coding unit by using the subblock size information.

However, when the size of the subblock determined by the subblock size information is greater than the size of the prediction unit included in the current coding unit, the inter-layer video decoding apparatus 20 may change the size of the subblock to the size of the prediction unit in the current coding unit.

In other words, when the size of the subblock determined by the subblock size information is greater than the size of the prediction unit included in the current coding unit, the inter-layer video decoding apparatus 20 may not follow the size of the subblock determined by the subblock size information, but may determine the prediction unit included in the current coding unit to be the subblock.

Accordingly, when the prediction unit is smaller than the minimum size of the coding unit, it is efficient that the size of the subblock is determined according to the prediction unit.

Consequently, it is preferable to reduce realization/operation complexity of encoding and decoding apparatuses by signaling the subblock size information considering only a case in which the subblock is equal to or larger than the minimum size of the coding unit.

Also, the maximum size of the coding unit is determined because, since the prediction unit is obtained as the coding unit is split, the size of the prediction unit is always less than or equal to the size of the coding unit, but when the size of the subblock is determined to be greater than the maximum size of the coding unit, There is a contradiction that the size of the prediction unit becomes greater than the size of the coding unit.

The second layer encoder 16 may determine a candidate block included in a first layer image, which corresponds to the current block included in the second layer image. Here, the candidate block denotes a corresponding block located in another layer image correspondingly to the current block, and motion information included in the candidate block may be used to predict or obtain motion information of the current block.

For example, the second layer encoder 16 may obtain a disparity vector indicating the candidate block included in the first layer image from the current block included in the second layer image. The second layer encoder 16 may determine the candidate block included in the first layer image by using the disparity vector.

Meanwhile, the second layer encoder 16 may determine the candidate block of the first layer image, which is co-located with the current block included in the second layer image.

Here, the current block may be one of one or more prediction units generated as the coding unit of the second layer image is split. Meanwhile, the subblock may be smaller than or equal to the prediction unit. In other words, the subblock is generally smaller than the prediction unit but is not limited thereto, and the subblock and the prediction unit may have the same size.

The second layer encoder 16 may determine the disparity vector pointing to the candidate block included in the first layer image from the current block, by using a disparity block of a temporal or spatial neighboring block adjacent to the current block.

Here, the second layer encoder 16 may determine a vertical component of the obtained disparity vector to 0, because layer images having different viewpoints are obtained by a camera while viewpoints are varied in a horizontal direction. In other words, the vertical component of the obtained disparity vector may not be 0, but since the layer images are obtained while varying the viewpoints only in the horizontal direction while images are obtained, the vertical component of the disparity vector is changed to 0 based on characteristics of the images, and encoding efficiency may further increase when inter-layer prediction is performed by using the changed disparity vector.

Meanwhile, the second layer encoder 16 may obtain at least one subblock of the second layer image determined by using the size of the subblock from the current block. For example, when the current block is 16×16 and the size of the subblock is 8×8, four 8×8 subblocks may be determined in the current block. When at least one subblock of the second layer image is obtained, the second layer encoder 16 determines the subblock of the first layer image corresponding to the subblock of the second layer image. Here, the subblock of the first layer image may be determined to be located in a region inside the candidate block.

The second layer encoder 16 obtains the motion information of the current block by using the motion information of the subblock of the first layer image.

Here, the motion information may include a motion vector according to motion prediction, information indicating a reference picture in a reference picture list, and information indicating whether a motion vector is usable. The second layer encoder 16 may predict the motion information of the current block by using the obtained motion information of the subblock of the first layer image.

The second layer encoder 16 may encode the current block by using the predicted motion information of the current block.

For example, the second layer encoder 16 may determine a prediction sample value of the current block by using the predicted motion information of the current block, and encode information about a residue indicating a difference between original pixel values of the current block and the prediction sample value of the current block. Here, the information about the residue is transformed in detail, and the transformed information may be entropy-encoded.

The bitstream generator 18 may generate a bitstream including an encoded video and inter-layer prediction information determined in relation to inter-layer prediction, and transmit the generated bitstream to a decoding apparatus. Meanwhile, when subblock-based inter-layer prediction is performed in relation to inter-layer prediction, the bitstream generator 18 may generate the bitstream including information about the size of the subblock. Also, the bitstream generator 18 may include information about the entropy-encoded residue as the encoded video.

Meanwhile, the bitstream generator 18 may generate the bitstream further including information indicating the minimum size of the coding unit and information indicating a difference between the maximum size and the minimum size of the coding unit.

For example, the second layer encoder 16 may determine the minimum size of the coding unit and the size of the coding unit regarding the second layer image, and by using them, the bitstream generator 18 generates the information indicating the minimum size of the coding unit and the information indicating the difference between the maximum size and the minimum size of the coding unit.

The bitstream generator 18 may first generate a video parameter set (VPS) unit or sequence parameter set (SPS) network abstraction layer (NAL) unit including the subblock size information. Then, the bitstream generator 18 may generate the bitstream including the VPS NAL unit or the SPS NAL unit.

Alternatively, the inter-layer video encoding apparatus 10 may predict (or derive) a disparity vector from different encoding information so as to decrease a data amount transmitted according to prediction units. For example, a disparity vector may be predicted from neighboring blocks of a block to be currently reconstructed. If a disparity vector is not predicted from the neighboring blocks, a default disparity vector may be set as the disparity vector.

An inter-layer video encoding method of performing, by the inter-layer video encoding apparatus 10, subblock-based prediction according to various embodiments, will be described in detail later with reference to FIGS. 4 through 7B.

The inter-layer video encoding apparatus 10 may perform entropy encoding by transforming and quantizing an error, i.e., a residual according to inter-layer prediction, between a sample value of a second layer prediction block and a sample value of a second layer original block, by using a first layer reconstruction image. Also, entropy encoding may also be performed on an error between prediction information.

As described above, the inter-layer video encoding apparatus 10 may encode a current layer image sequence by referencing first layer reconstruction images through an inter-layer prediction structure. However, the inter-layer video encoding apparatus 10 according to various embodiments may encode a second layer image sequence according to a single layer prediction structure without having to reference other layer samples. Accordingly, it should not be limitedly construed that the inter-layer video encoding apparatus 10 only performs inter prediction of an inter-layer prediction structure in order to encode a second layer image sequence.

Detailed operations of the inter-layer video encoding apparatus 10 for inter-layer prediction will now be described with reference to FIG. 1B. Hereinafter, a first layer image may denote a reference view image and a second layer image may denote a current view image to be encoded.

FIG. 1B is a flowchart of an inter-layer video encoding method according to various embodiments.

In operation 11, the inter-layer video encoding apparatus 10 may determine the size of the subblock of the second layer image within the range equal to or greater than the minimum size of the coding unit and less than or equal to the maximum size of the coding unit. Here, the subblock is a block smaller than or equal to the prediction unit. The prediction unit is generated as the coding unit is split, and is a block smaller than or equal to the prediction unit. Accordingly, the inter-layer video encoding apparatus 10 may perform inter-layer prediction according to subblock units, and determine the prediction sample value of the prediction unit by using the prediction sample value according to subblocks.

In operation 13, the inter-layer video encoding apparatus 10 determines the candidate block that corresponds to the current block included in the second layer image and is included in the first layer image different from the second layer image.

The inter-layer video encoding apparatus 10 obtains the disparity vector pointing to the candidate block included in the first layer image different from the second layer image from the current block included in the second layer image. The inter-layer video encoding apparatus 10 may search for the candidate block by using the obtained disparity vector.

Meanwhile, the inter-layer video encoding apparatus 10 may determine the candidate block included in the first layer image, which is co-located with the current block included in the second layer image.

In operation 15, when at least one subblock of the second layer image determined by using the size of the subblock is obtained from the current block, the inter-layer video encoding apparatus 10 obtains the motion information of the subblock of the first layer image corresponding to the subblock of the second layer image.

Here, the subblock of the first layer image is determined to be located in a region inside the candidate block.

In operation 17, the inter-layer video encoding apparatus 10 obtains or predicts the motion information of the current block by using the obtained motion information of the subblock of the first layer image, and encodes the current block by using the obtained or predicted motion information of the current block.

In operation 19, the inter-layer video encoding apparatus 10 generates the bitstream including the determined subblock size information.

As described above, when the size of the subblock is determined, the inter-layer video encoding apparatus 10 may determine the size of the subblock within the range of the minimum size and the maximum size of the coding unit while considering the minimum size and the maximum size of the coding unit to simplify processing operations and reduce realization/operation complexity of encoding and decoding apparatuses.

The inter-layer video encoding apparatus 10 according to the present disclosure may include a central processor (not shown) that generally controls the first layer encoder 14, the second layer encoder 16, and the bitstream generator 18. Alternatively, the first layer encoder 14, the second layer encoder 16, and the bitstream generator 18 may be operated by individual processors (not shown), and the inter-layer video encoding apparatus 10 may be operated as the individual processors systematically operate. Alternatively, the first layer encoder 14, the second layer encoder 16, and the bitstream generator 18 may be controlled according to control of an external processor (not shown) of the inter-layer video encoding apparatus 10.

The inter-layer video encoding apparatus 10 may include at least one data storage unit (not shown) in which input and output data of the first layer encoder 14, the second layer encoder 16, and the bitstream generator 18 is stored. The inter-layer video encoding apparatus 10 may include a memory controller (not shown) that manages data input and output of the data storage unit (not shown).

In order to output a video encoding result, the inter-layer video encoding apparatus 10 may operate in cooperation with an internal video encoding processor installed therein or an external video encoding processor so as to perform video encoding operations including transformation. The internal video encoding processor of the inter-layer video encoding apparatus 10 may perform the video encoding operations as a separate processor. Also, basic video encoding operations may be realized as the inter-layer video encoding apparatus 10, a central processing apparatus, or a graphic processing apparatus includes a video encoding processing module.

Figure 1C:
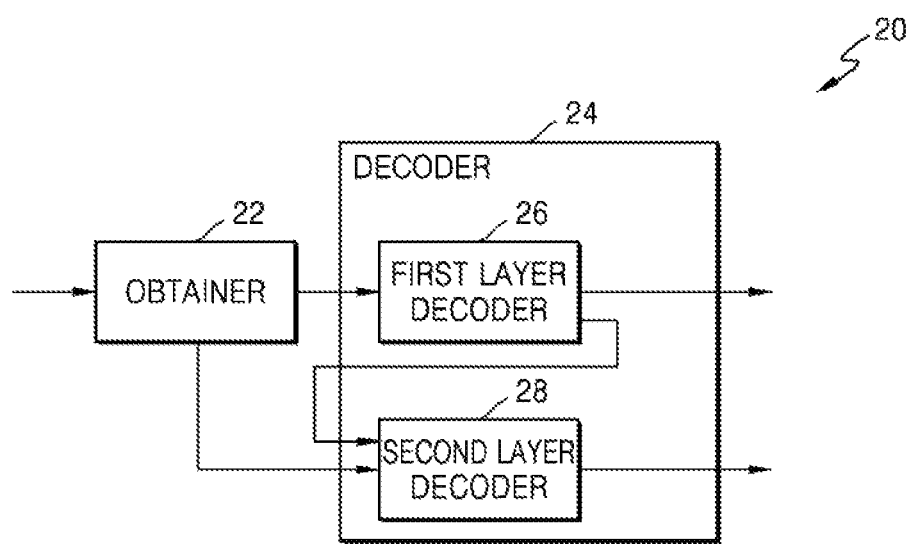
FIG. 1C is a block diagram of an inter-layer video decoding apparatus according to various embodiments.

FIG. 1C is a block diagram of an inter-layer video decoding apparatus according to various embodiments.

The inter-layer video decoding apparatus 20 according to various embodiments may include an obtainer 22 and a decoder 24. The decoder 24 may include a first layer decoder 26 and a second layer decoder 28.

The inter-layer video decoding apparatus 20 according to various embodiments receives a bitstream of an encoded video according to layers.

The inter-layer video decoding apparatus 20 may receive bitstreams according to layers, via a scalable encoding scheme. The number of layers of bitstreams received by the inter-layer video decoding apparatus 20 is not limited. However, for convenience of description, an embodiment in which the first layer decoder 26 of the inter-layer video decoding apparatus 20 receives and decodes a first layer stream and the second layer decoder 28 receives and decodes a second layer stream will be described.

For example, the inter-layer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multiview video may be decoded according to a scalable video coding scheme. When a stereoscopic video stream is received in a plurality of layers, a first layer stream may be decoded to reconstruct left view images. A second layer stream may be further decoded to reconstruct right view images.

Alternatively, when a multiview video stream is received in a plurality of layers, a first layer stream may be decoded to reconstruct central view images. A second layer stream may be further decoded to reconstruct left view images. A third layer stream may be further decoded to reconstruct right view images.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to first layer reconstruction images, second layer images may be further reconstructed. When K-th layer stream is further decoded by referring to second layer reconstruction images, K-th layer images may be further reconstructed.

The inter-layer video decoding apparatus 20 may obtain encoded data of first layer images and second layer images from a first layer stream and a second layer stream, and in addition, may further obtain a motion vector generated via inter prediction and prediction information generated via inter-layer prediction.

For example, the inter-layer video decoding apparatus 20 may decode inter-predicted data per layer, and decode inter-layer predicted data between a plurality of layers. Reconstruction may be performed through motion compensation and inter-layer video decoding based on a coding unit or a prediction unit.

Images may be reconstructed by performing motion compensation for a current image by referencing reconstruction images predicted via inter prediction of a same layer, with respect to each layer stream. Motion compensation is an operation in which a reconstruction image of a current image is reconstructed by composing a reference image determined by using a motion vector of the current image and a residual of the current image.

Also, the inter-layer video decoding apparatus 20 may perform inter-layer video decoding by referring to prediction information of first layer images so as to decode a second layer image predicted via inter-layer prediction. Inter-layer video decoding is an operation in which prediction information of a current image is reconstructed by using prediction information of a reference block of a different layer so as to determine the prediction information of the current image.

The inter-layer video decoding apparatus 20 according to various embodiments may perform inter-layer video decoding for reconstructing third layer images predicted by using second layer images. An inter-layer prediction structure will be described later with reference to FIG. 3A.

However, the second layer decoder 28 according to various embodiments may decode a second layer stream without having to reference a first layer image sequence. Accordingly, it should not be limitedly construed that the second layer decoder 28 performs inter-layer prediction to decode a second layer image sequence.

The inter-layer video decoding apparatus 20 performs decoding according to blocks of each image of a video. A block may be, from among coding units according to a tree structure, a largest coding unit, a coding unit, a prediction unit, or a transformation unit.

The obtainer 22 may receive a bitstream and obtain information about an encoded image from the received bitstream.

For example, the obtainer 22 may obtain subblock size information of an image from the bitstream. In detail, the obtainer 22 obtains the subblock size information indicating a size of a subblock of a certain layer image from the bitstream.

The first layer decoder 26 may decode a first layer image by using parsed encoding symbols of the first layer image. When the inter-layer video decoding apparatus 20 receives streams encoded based on coding units of a tree structure, the first layer decoder 26 may perform decoding based on the coding units of the tree structure, according to a largest coding unit of a first layer stream.

The first layer decoder 26 may obtain encoding information and encoded data by performing entropy decoding per largest coding unit. The first layer decoder 26 may reconstruct a residual by performing inverse quantization and inverse transformation on encoded data obtained from a stream. The first layer decoder 26 according to another exemplary embodiment may directly receive a bitstream of quantized transformation coefficients. Residuals of images may be reconstructed by performing inverse quantization and inverse transformation on quantized transformation coefficients.

The first layer decoder 26 may determine a prediction image via motion compensation between same layer images, and reconstruct first layer images by combining the prediction image and a residual.

According to an inter-layer prediction structure, the second layer decoder 28 may generate a second layer prediction image by using samples of a first layer reconstruction image. The second layer decoder 28 may obtain a prediction error according to inter-layer prediction by decoding a second layer stream. The second layer decoder 28 may generate a second layer reconstruction image by combining a second layer prediction image and the prediction error.

The second layer decoder 28 may determine a second layer prediction image by using a first layer reconstruction image decoded by the first layer decoder 26. According to an inter-layer prediction structure, the second layer decoder 28 may determine a block of a first layer image, which is to be referenced by a coding unit or a prediction unit, of a second layer image. For example, a reconstruction block of a first layer image, which is located correspondingly to a location of a current block in a second layer image, may be determined. The second layer decoder 28 may determine a second layer prediction block by using a first layer reconstruction block corresponding to a second layer block. The second layer decoder 28 may determine the second layer prediction block by using the first layer reconstruction block co-located with the second layer block.

The second layer decoder 28 may use a second layer prediction block determined by using a first layer reconstruction block according to an inter-layer prediction structure, as a reference image for inter-layer prediction of a second layer original block. In this case, the second layer decoder 28 may reconstruct a second layer block by composing a sample value of a second layer prediction block determined by using a first layer reconstruction image and a residual according to inter-layer prediction.

Meanwhile, when the inter-layer video decoding apparatus 20 described above decodes a multiview video, a first layer image to be encoded may be a first view video and a second layer image may be a second view video. Also, when the inter-layer video decoding apparatus 20 described above decodes a color depth video, a first layer image to be encoded may be a color (texture) video and a second layer image may be a depth video.

Meanwhile, since a multiview image is obtained at the same time, similarity between images of views is very high. Accordingly, encoding efficiency may be increased by performing disparity compensated prediction in which a region that is most similar to a block to be currently encoded is found and encoded from a different view image by using a disparity vector. The inter-layer video decoding apparatus 20 may obtain a disparity vector for inter-layer prediction through a bitstream or predict the disparity vector from other pieces of encoding information.

For example, a disparity vector may be predicted from neighboring blocks of a block to be currently reconstructed. Also, when a disparity vector is unable to be predicted from neighboring blocks, a disparity vector may be set as a default disparity vector.

The second layer decoder 28 may determine a size of a subblock within a range equal to or greater than a minimum size of a coding unit and less than or equal to a maximum size of the coding unit by using subblock size information of a second layer image obtained from a bitstream.

The second layer decoder 28 obtains a disparity vector pointing to a candidate block included in a first layer image by using a current block included in the second layer image as a start point.

The second layer decoder 28 determines the size of the subblock according to the subblock size information. When the subblock is obtained from the current block by using the determined size of the subblock, the second layer decoder 28 may obtain motion information of a subblock of the first layer image corresponding to the subblock of the second layer image. The subblock of the first layer image may be determined to be located in a region inside the candidate block.

The second layer decoder 28 may predict motion information of the current block by using motion information of the subblock of the second layer image, and decode the current block by using the predicted motion information of the current block.

In the above description, it is assumed that the inter-layer video decoding apparatus 20 determines to perform inter-layer motion prediction.

Hereinafter, processes of the inter-layer video decoding apparatus 20 determining a motion vector candidate, generating a merge list, and determining to perform inter-layer motion prediction by using the merge list are described. Here, the inter-layer motion prediction is assumed to be inter-view motion prediction.

Meanwhile, the inter-layer video decoding apparatus 20 may use one of various motion vector candidates to predict a motion vector.

For example, the inter-layer video decoding apparatus 20 may determine a motion vector to be predicted from a spatial candidate block as a motion vector candidate. Also, the inter-layer video decoding apparatus 20 may determine a motion vector to be predicted from a temporal candidate block to be another motion vector candidate.

The inter-layer video decoding apparatus 20 determines a motion vector candidate for subblock-based inter-view motion vector prediction.

The inter-layer video decoding apparatus 20 may determine the motion vector candidate for the inter-view motion vector prediction regarding a current prediction unit by using a disparity vector mvDisp. In addition, the inter-layer video decoding apparatus 20 may determine the motion vector candidate for the inter-view motion vector prediction regarding the current prediction unit by using an index indicating a reference viewpoint.

The inter-layer video decoding apparatus 20 obtains the motion vector candidate from at least one of a L0 prediction list and a L1 prediction list.

In addition, the inter-layer video decoding apparatus 20 may determine a picture to be referenced from among pictures included in the L0 prediction list or the L1 prediction list. In detail, the inter-layer video decoding apparatus 20 may determine the picture to be referenced from among the pictures included in the prediction list by using a reference picture index. The reference picture index may include an index indicating the picture to be referenced from among the pictures included in the L0 prediction list and an index indicating the picture to be referenced from among the pictures included in the L1 prediction list.

Also, the inter-layer video decoding apparatus 20 may determine a prediction direction. In detail, the inter-layer video decoding apparatus 20 may determine the prediction direction by using prediction direction information. The prediction direction information is information indicating at least one prediction direction from among the L1 list and the L0 list. For example, the prediction direction information may include L0 prediction direction information indicating that the L0 list is usable and L1 prediction direction information indicating that the L1 list is usable.

The inter-layer video decoding apparatus 20 may later reference one picture included in the prediction list related to the prediction direction, predict the motion vector by using the motion vector, determine a block in the reference picture by using the predicted motion vector, and generate a prediction sample value by using the determined block.

Meanwhile, the inter-layer video decoding apparatus 20 generates a merge candidate list when the motion vector candidate is determined.

For example, the inter-layer video decoding apparatus 20 generates the merge candidate list including various merge candidates, such as a spatial merge candidate, a temporal merge candidate, an inter-view motion compensation merge candidate, and an inter-view disparity compensation merge candidate.

Here, the motion vector candidate, the reference picture index, and the prediction direction, which may be used in inter prediction regarding the merge candidate, may be already determined. In detail, the merge candidate may denote a block used in motion vector prediction.

First, the inter-layer video decoding apparatus 20 determines whether each merge candidate is usable according to priority of merge candidates. The inter-layer video decoding apparatus 20 adds a usable merge candidate to the merge list.

For example, the inter-layer video decoding apparatus 20 determines whether the temporal merge candidate is usable, and when the temporal merge candidate is usable, adds the temporal merge candidate to the merge list. The inter-layer video decoding apparatus 20 may determine whether the inter-view motion compensation merge candidate that is a next priority according to the priority of the merge candidates is usable.

When the inter-view motion compensation merge candidate is usable, the inter-layer video decoding apparatus 20 adds the inter-view motion compensation merge candidate to the merge list.

Meanwhile, the number of merge candidates addable to the merge candidate list may be limited. Accordingly, the inter-layer video decoding apparatus 20 may add usable merge candidates according to the priority of the merge candidates, and when a space to add a merge candidate is not sufficient in the merge candidate list, may not add a merge candidate to the merge candidate list.

Meanwhile, the inter-layer video decoding apparatus 20 obtains a merge index. Here, the merge index denotes an index indicating one of the merge candidates added to the merge candidate list.

The inter-layer video decoding apparatus 20 determines a candidate block to be used in vector prediction, from the merge list by using the merge index.

When the merge candidate determined by using the merge index is the inter-view motion compensation merge candidate IvMC, the inter-layer video decoding apparatus 20 performs inter-view motion compensation by using the motion vector candidate, the reference picture index, and the prediction direction information, which are determined via the inter-view motion vector prediction.

The inter-layer video decoding apparatus 20 performs the inter-view motion compensation to generate a prediction sample value regarding a current prediction unit. In detail, an inter-layer video decoding apparatus 40 predicts the motion vector of the current prediction unit by using the motion vector candidate, and determines a block by using the predicted motion vector. The inter-layer video decoding apparatus 40 generates the prediction sample value of the current prediction unit by using the determined block.

Meanwhile, the inter-layer video decoding apparatus 20 according to various embodiments may determine a subblock-based inter-view motion vector candidate when a partition type of a current coding unit is a 2N×2N type while determining the inter-view motion vector candidate.

The subblock-based inter-view motion vector candidate denotes a motion vector candidate that is determined regarding a sub-prediction unit included in the current prediction unit by using motion information of a subblock located in another view point by splitting the current prediction unit of one viewpoint into sub-prediction units and determining the sub-prediction unit located in the other viewpoint in sub-prediction units.

On the other hand, when the partition type is not a 2N×2N type, the inter-layer video decoding apparatus 20 may not determine the subblock-based inter-view motion vector candidate.

When the partition type of the current coding unit according to an embodiment of the present disclosure is 2N×2N type (PartMode==PART_2N×2N), the inter-layer video decoding apparatus 20 may determine that the motion information of the current prediction unit has motion accuracy of the subblock size. In other words, the inter-layer video decoding apparatus 20 may generate the prediction sample value of the current prediction unit by performing the inter-view motion compensation based on subblocks.

On the other hand, when the partition type of the current coding unit is not a 2N×2N type, the inter-layer video decoding apparatus 20 may determine that the motion information of the current prediction unit does not have motion accuracy of the subblock size.

In this case, the inter-layer video decoding apparatus 20 may not perform the subblock-based inter-view motion compensation.

Figure 1D:
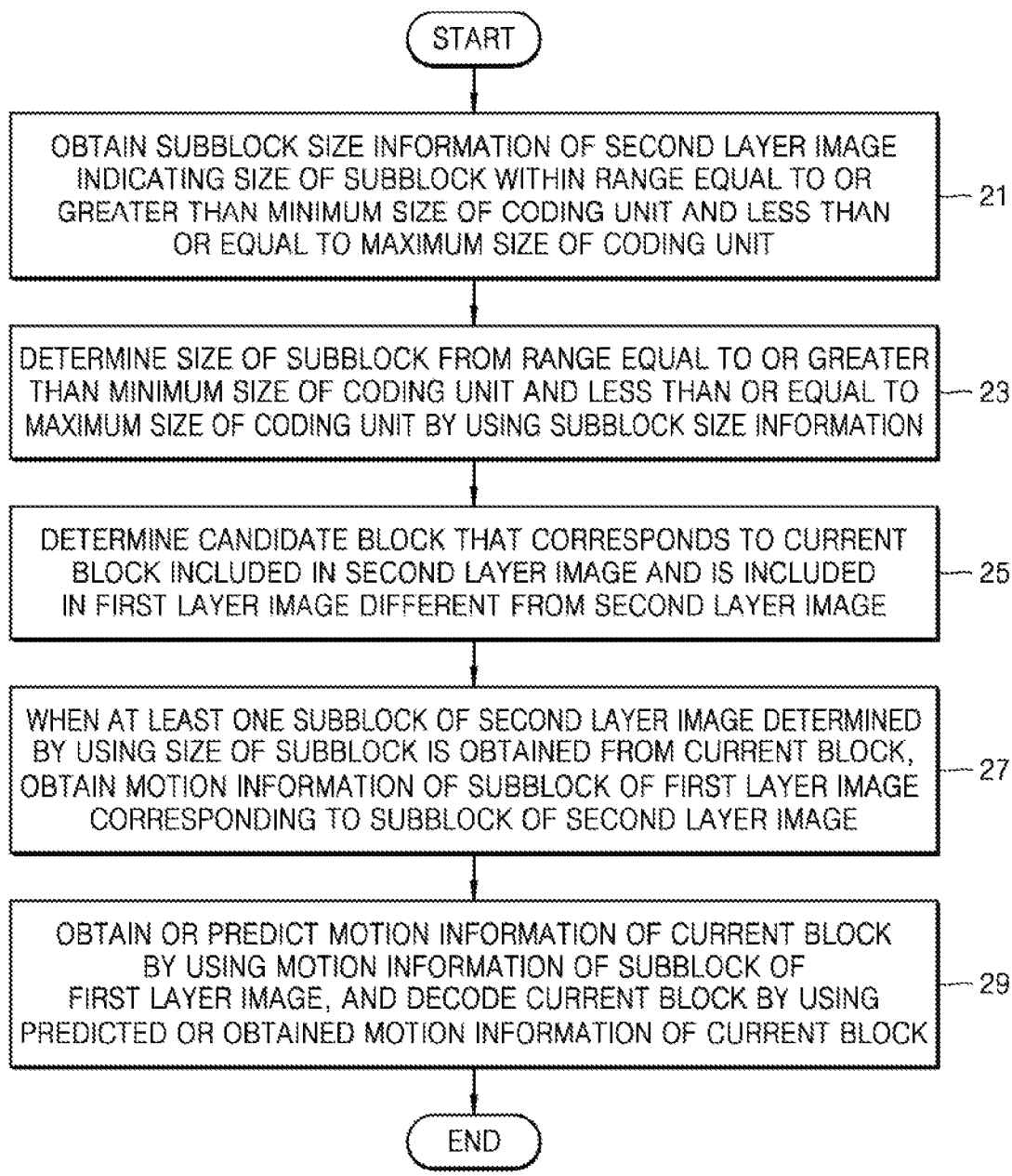
FIG. 1D is a flowchart of an inter-layer video decoding method according to various embodiments.

FIG. 1D is a flowchart of an inter-layer video decoding method according to various embodiments.

In operation 21, the inter-layer video decoding apparatus 20 obtains the subblock size information of the second layer image. Here, the subblock size information indicates the size of the subblock within a range equal to or greater than the minimum size of the coding unit and less than or equal to the maximum size of the coding unit.

In operation 23, the inter-layer video decoding apparatus 23 determines the size of the subblock from the range equal to or greater than the minimum size of the coding unit and less than or equal to the maximum size of the coding unit by using the subblock size information.

In operation 25, the inter-layer video decoding apparatus 20 determines the candidate block that corresponds to the current block included in the second layer image and is included in the first layer image different from the second layer image.

For example, the inter-layer video decoding apparatus 20 obtains the disparity vector pointing to the candidate block included in the first layer image different from the second layer image from the current block included in the second layer image. Here, the inter-layer video decoding apparatus 20 may determine the candidate block by using the obtained disparity vector.

Meanwhile, the inter-layer video decoding apparatus 20 may determine the candidate block included in the first layer image, which is co-located with the current block included in the second layer image.

In operation 27, when at least one subblock of the second layer image determined by using the size of the subblock is obtained from the current block, the inter-layer video decoding apparatus 20 obtains the motion information of the subblock of the first layer image corresponding to the subblock of the second layer image. Here, the subblock of the first layer image may be determined to be located in a region inside the candidate block.

In operation 29, the inter-layer video decoding apparatus 20 obtains or predicts the motion information of the current block by using the motion information of the subblock of the first layer image, and decodes the current block by using the predicted or obtained motion information of the current block.

Figure 2A:
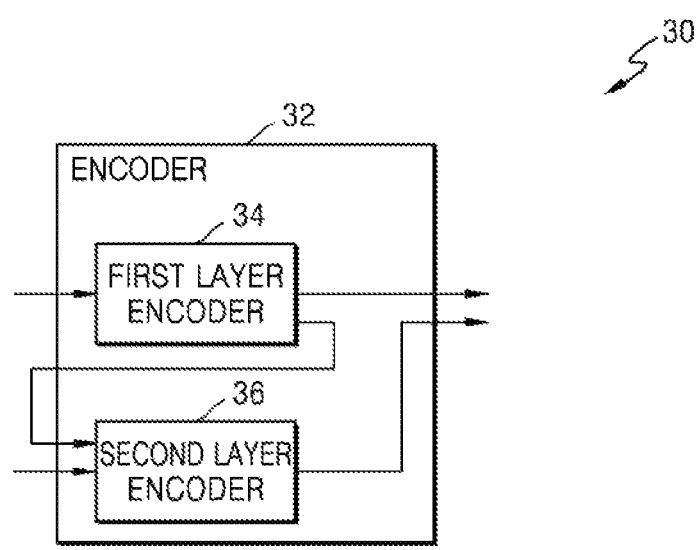
FIG. 2A is a block diagram of an inter-layer video encoding apparatus according to various embodiments.

FIG. 2A is a block diagram of an inter-layer video encoding apparatus according to another embodiment.

An inter-layer video encoding apparatus 30 may include an encoder 32.

The encoder 32 may include a first layer encoder 34 and a second layer encoder 36. Meanwhile, the encoder 32 may perform some of functions performed by the encoder 12 as long as functions do not confront each other.

The first layer encoder 34 may encode an encoded first layer image.

The second layer encoder 36 may determine a candidate block of the first layer image, which corresponds to a current block included in a second layer image.

For example, the second layer encoder 36 may obtain a disparity vector pointing to the candidate block included in the first layer image by using the current block included in the second layer image as a start point.

Meanwhile, the second layer encoder 36 may determine the candidate block included in the first layer image and co-located with the current block included in the second layer image.

The second layer encoder 36 may determine at least one subblock to be included in the current block so as to split the current block into at least one subblock.

When a size of the current block is not an integer multiple of a predetermined size of a subblock, the second layer encoder determines a block having a size that is not the predetermined size as a subblock. In particular, cases which are not the integer multiple include i) when the size of the current block is greater than the predetermined size (for example, 1.5 times), ii) when the size of the current block is less than the predetermined size (for example, 0.5 times), and iii) when one of a width and a height of the current block is equal to or greater than a predetermined width or width, and the other one of the width and the height of the current block is less than the certain width or width (excluding a case in which the width and the height of the current block are the same with each other). The current embodiment particularly premises i).

According to an embodiment of the present disclosure, when the block having the size that is not the predetermined size is determined, the second layer encoder 36 may determine a block having the same size as the current block as a subblock. For example, when the size of the current block is 16×12 and a certain block size is 8×8, since the height (i.e., 12) of the current block is not an integer multiple of a certain block height (i.e., 8) but is 1.5 times greater, a block (16×12) having the same size as the current block may be determined as a subblock.

The second layer encoder 36 no longer determines another subblock (for example, a second subblock described later), and may determine a subblock having the same size as the current block as the subblock to be included in the current block.

According to another embodiment of the present disclosure, when the size of the current block is not the integer multiple of the predetermined size of the subblock, the second layer encoder 36 may determine at least one block having the same size as the predetermined block size as a first subblock.

For example, when the size of the current block is 12×8 and the predetermined block size is 8×8, the second layer encoder 36 may determine a block having the same size as the predetermined block size (8×8) as the first subblock since the width of the current block is not an integer multiple of the certain block width.

Here, when the size of the current block is not an integer multiple of the predetermined size of the subblock, the second layer encoder 36 may determine a second subblock aside from the first subblock. Here, the second subblock denotes a block in which at least one of a width and a height is less than the predetermined block width and the predetermined block height.

For example, when the size of the current block is 12×8 and the predetermined block size is 8×8, a block having the same size as the predetermined block size may be determined as the first subblock. Here, when the first subblock is suitably located in the current block (located at the leftmost or rightmost of the current block), a space having a 4×8 size is left. When the block having the same size as the predetermined block size is to be located in the space having the 4×8 size, the block having the same size as the predetermined block size does not fit the space.

Accordingly, the second layer encoder 36 may determine a block having a smaller width (i.e., 4) than the predetermined block width, which fits the space, as the second subblock to be included in the current block. The second subblock is a block having a size different from the predetermined size.

For example, the size of the second subblock may be 4×8 or 8×4. Since the size of the second subblock is an allowed size of a prediction unit, even when the block having the same size as the predetermined size is not determined to be a subblock, the second subblock may be used during interview motion prediction.

In detail, the second layer encoder 36 may split the current block into at least one subblock according to a split boundary having a predetermined width or height in a width or height direction from an uppermost left pixel of the current block.

For example, when the width of the current block is 12 and the predetermined size is 8×8, the split boundary may be every 8 pixels in the width direction from the uppermost left pixel. Also, when the height of the current block is 12 and the predetermined size is 8×8, the split boundary may be every 8 pixels in the height direction from the uppermost left pixel.

Some of blocks obtained by splitting the current block according to the split boundary are blocks having the same height and width as the predetermined height and width, and the blocks may be determined as the first subblock.

Meanwhile, when the width or the height of the current block is not an integer multiple of the predetermined width or the predetermined height while determining the split boundary, only blocks having a width or a height less than the predetermined width or the predetermined height fit a right space of the split boundary at the rightmost of the current block and a bottom space of the split boundary at the bottom of the current block.

Accordingly, the block in which at least one of the width and the height is less than the predetermined width and the predetermined height may be located in a region inside the current block at the right space of the split boundary at the rightmost and the bottom space of the split boundary at the bottom of the current block.

Here, the block in which at least one of the width and the height is less than the predetermined width and the predetermined height may be determined as the second subblock.

However, an embodiment is not limited thereto, and the second layer encoder 36 may determine the split boundary via any one of various methods, and determine the subblock to be included in the current block according to the split boundary.

For example, when the width of the current block is 12 and the predetermined block size is 8×8, the split boundary may be every 8 pixels in the width direction (left direction) from the uppermost right pixel. When the height of the current block is 12 and the certain block size is 8×8, the split boundary may be every 8 pixels in the height direction from the uppermost right pixel. Most blocks obtained by being split according to the split boundary are blocks having the predetermined height and the predetermined width, and the blocks having the predetermined height and the predetermined width may be determined as the first subblock.

Meanwhile, when the width or the height of the current block is not the integer multiple of the predetermined width or the predetermined height while determining the split boundary, only blocks in which at least one of a width and a height is less than the predetermined width and the predetermined height may be located at a left space of the split boundary at the leftmost of the current block and a bottom space of the split boundary at the bottom of the current block.

Accordingly, the block in which at least one of the width and the height is less than the predetermined width and the predetermined height may be located in the current block at the left space of the split boundary at the leftmost and the bottom space of the split boundary at the bottom of the current block.

Here, the block in which at least one of the width and the height is less than the predetermined width and the predetermined height may be determined as the second subblock.

When the subblock is determined, the second layer encoder 36 may obtain motion information of the subblock of the first layer image corresponding to the subblock of the second layer image.

Here, the subblock of the first layer image may be determined to be located in a region inside the candidate block. The subblock of the first layer image corresponding to the subblock of the second layer image may denote a subblock of the first layer image co-located with the subblock of the second layer image.

The second layer encoder 36 may predict or obtain motion information of the current block by using the motio information of the subblock of the first layer image, and encode the current block by using the predicted or obtained motion information of the current block.

The inter-layer video encoding apparatus 30 may further include a bitstream generator (not shown). The bitstream generator (not shown) may generate a bitstream including the encoded second layer image including the encoded current block, and the encoded first layer image.

Meanwhile, the inter-layer video encoding apparatus 30 may perform some of the functions performed by the inter-layer video encoding apparatus 10 described with reference to FIG. 1A. In detail, the encoder 32 may perform some of the functions performed by the encoder 12. Similarly, the bitstream generator (not shown) may perform some of the functions performed by the bitstream generator 18.

Figure 2B:
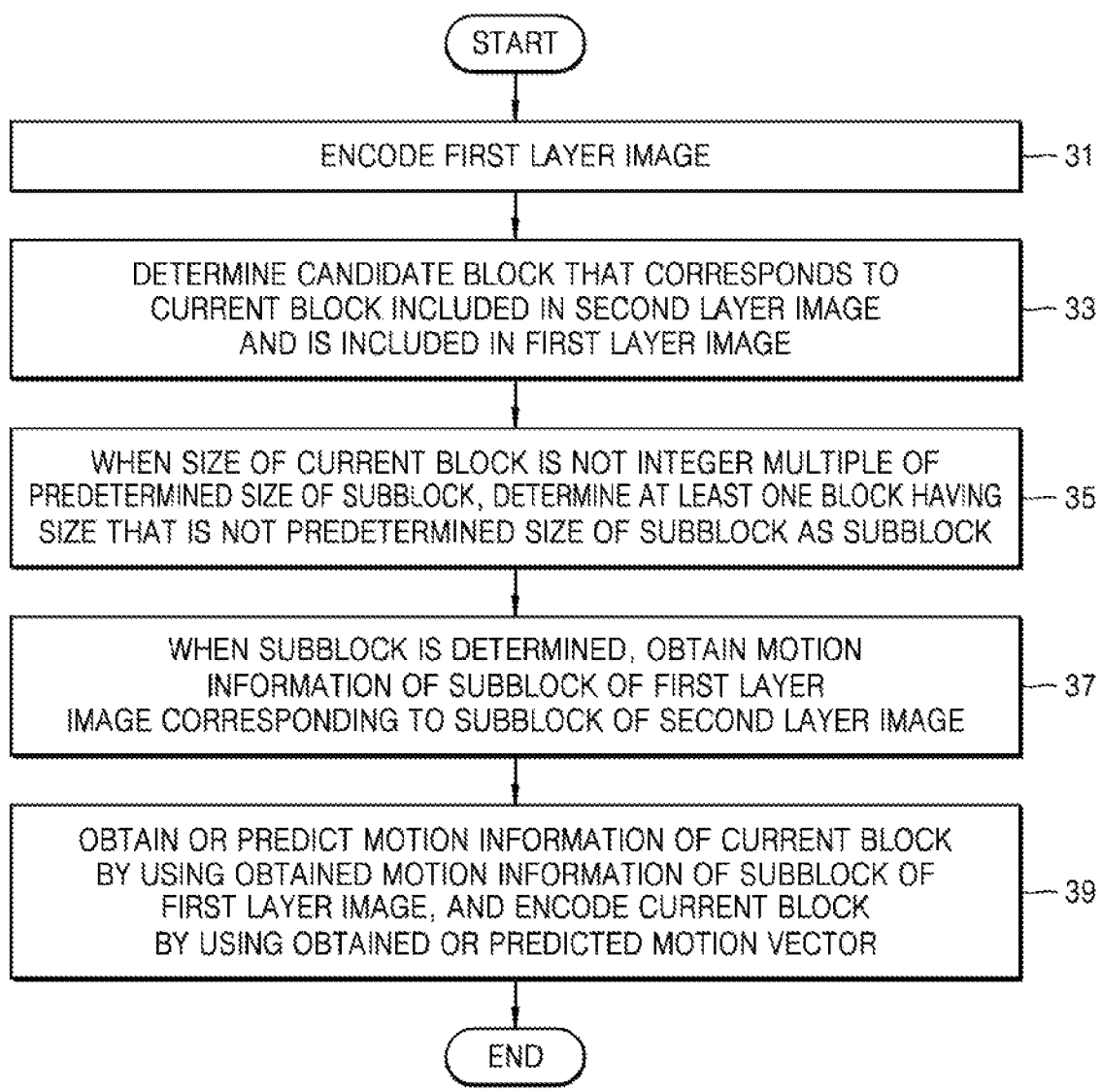
FIG. 2B is a flowchart of an inter-layer video encoding method according to various embodiments.

FIG. 2B is a flowchart of an inter-layer video encoding method according to various embodiments.

In operation 31, the inter-layer video encoding apparatus 30 may encode a first layer image.

In operation 33, the inter-layer video encoding apparatus 30 may determine a candidate block that corresponds to a current block included in a second layer image and is included in the first layer image.

For example, the inter-layer video encoding apparatus 30 may obtain a disparity vector pointing to the candidate block included in the first layer image from the current block included in the second layer image. The inter-layer video encoding apparatus 30 may search for the candidate block included in the first layer image by using the obtained disparity vector.

In operation 35, when a size of the current block is not an integer multiple of a predetermined size of a subblock, the inter-layer video encoding apparatus 30 may determine at least one block having a size that is not the predetermined size of the subblock as a subblock.

In operation 37, when the subblock is determined, the inter-layer video encoding apparatus 30 may obtain motion information of the subblock of the first layer image corresponding to the subblock of the second layer image. Here, the subblock of the first layer image may be determined to be located in a region inside the candidate block.

In operation 39, the inter-layer video encoding apparatus 30 may obtain or predict the motion information of the subblock of the first layer image, and encode the current block by using the obtained or predicted motion information of the current block.

Figure 2C:
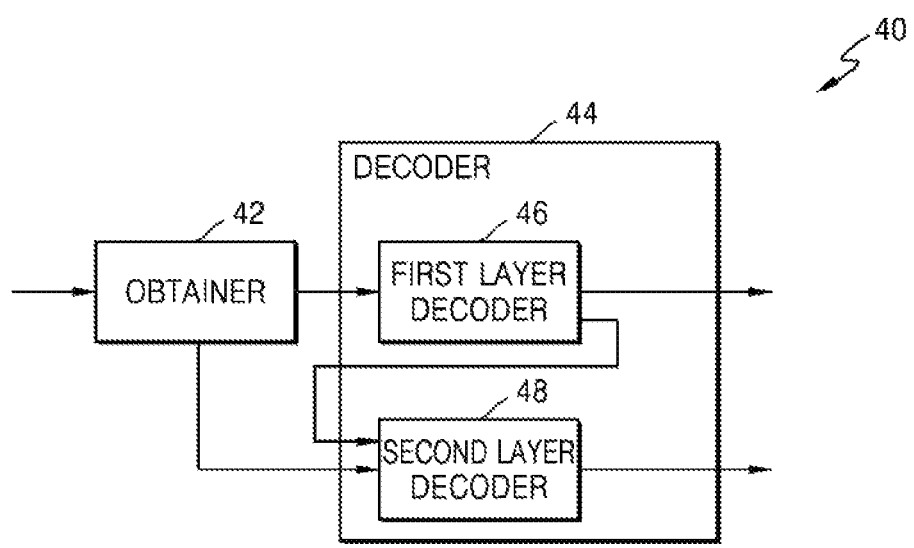
FIG. 2C is a block diagram of an inter-layer video decoding apparatus according to various embodiments.

FIG. 2C is a block diagram of an inter-layer video decoding apparatus according to another embodiment of the present disclosure.

The inter-layer video decoding apparatus 40 may include an obtainer 42 and a decoder 44.

The decoder 44 may include a first layer decoder 46 and a second layer decoder 48. Meanwhile, the decoder 44 may perform some of the functions performed by the decoder 24 as long as the functions do not confront with each other.

The first layer decoder 46 may encode an encoded first layer image.

The second layer decoder 48 may determine a candidate block that corresponds to a current block included in a second layer image and is included in the first layer image.

For example, the second layer decoder 48 may obtain a disparity vector pointing to the candidate block included in the first layer image from the current block included in the second layer image. The second layer decoder 48 may determine the candidate block included in the first layer image by using the disparity vector.

Meanwhile, the second layer decoder 48 may determine the candidate block included in the first layer image and co-located with the current block included in the second layer image.

When a size of the current block is not an integer multiple of a predetermined size of a subblock, the second layer decoder 48 determines a block having a size that is not the predetermined size as a subblock.

According to an embodiment of the present disclosure, when the block having the size that is not the predetermined size is determined, the second layer decoder 48 may determine a block having the same size as the current block as a subblock. For example, when the size of the current block is 12×8 and a predetermined block size is 8×8, since the width (i.e., 12) of the current block is not an integer multiple of a predetermined block width (i.e., 8) but is 1.5 times greater, a block (12×8) having the same size as the current block may be determined as a first subblock.

The second layer decoder 48 no longer determines another subblock (for example, a second subblock described later), and may determine the first subblock having the same size as the current block as the subblock to be included in the current block.

According to another embodiment of the present disclosure, when the size of the current block is not the integer multiple of the predetermined size of the subblock, the second layer decoder 48 may first determine at least one block having the same size as the predetermined block size as the first subblock.

For example, when the size of the current block is 12×8 and the predetermined block size is 8×8, the second layer decoder 48 may determine a block having the same size as the predetermined block size (8×8) as the first subblock since the width of the current block is not an integer multiple of the predetermined block width.

Here, when the size of the current block is not an integer multiple of the predetermined size of the subblock, the second layer decoder 48 may determine a second subblock aside from the first subblock. Here, the second subblock denotes a block in which at least one of a width and a height is less than the predetermined block width and the predetermined block height.

For example, when the size of the current block is 12×8 and the predetermined block size is 8×8, a block having the same size as the certain block size may be determined as the first subblock. Here, when the first subblock is suitably located in the current block (located at the leftmost or rightmost of the current block), a space having a 4×8 size is left. When the block having the same size as the predetermined block size is to be located in the space having the 4×8 size, the block having the same size as the predetermined block size does not fit the space.

Accordingly, the second layer decoder 48 may determine a block having a smaller width (i.e., 4) than the predetermined block width, which fits the space, as the second subblock to be included in the current block.

For example, the size of the second subblock may be 4×8 or 8×4. Since the size of the second subblock is an allowed size of a prediction unit, even when the block having the same size as the predetermined size is not determined to be a subblock, the second subblock may be used during inter-view motion prediction.

In detail, the second layer decoder 48 may split the current block into at least one subblock according to a split boundary having a predetermined width or height in a width or height direction from an uppermost left pixel of the current block.

For example, when the width of the current block is 12 and the predetermined size is 8×8, the split boundary may be every 8 pixels in the width direction from the uppermost left pixel. Also, when the height of the current block is 12 and the predetermined size is 8×8, the split boundary may be every 8 pixels in the height direction from the uppermost left pixel.

Most blocks obtained by splitting the current block according to the split boundary are blocks having the predetermined height and width, and the blocks having the predetermined height and width may be determined as the first subblock.

Meanwhile, when the width or the height of the current block is not an integer multiple of the predetermined width or the predetermined height while determining the split boundary, only blocks having a width or a height less than the predetermined width or the predetermined height fit a right space of the split boundary at the rightmost of the current block and a bottom space of the split boundary at the bottom of the current block.

Accordingly, the block in which at least one of the width and the height is less than the predetermined width and the predetermined height may be located in a region inside the current block at the right space of the split boundary at the rightmost and the bottom space of the split boundary at the bottom of the current block.

Here, the block in which at least one of the width and the height is less than the predetermined width and the predetermined height may be determined as the second subblock.

However, an embodiment is not limited thereto, and the second layer decoder 48 may determine the split boundary via any one of various methods, and determine the subblock to be included in the current block according to the split boundary.

For example, when the width of the current block is 12 and the predetermined block size is 8×8, the split boundary may be every 8 pixels in the width direction (left direction) from the uppermost right pixel. When the height of the current block is 12 and the predetermined block size is 8×8, the split boundary may be every 8 pixels in the height direction from the uppermost right pixel. Most blocks obtained by being split according to the split boundary are blocks having the predetermined height and the predetermined width, and the blocks having the predetermined height and the predetermined width may be determined as the first subblock.

Meanwhile, when the width or the height of the current block is not the integer multiple of the predetermined width or the predetermined height while determining the split boundary, only blocks in which at least one of a width and a height is less than the predetermined width and the predetermined height may be located at a left space of the split boundary at the leftmost of the current block and a bottom space of the split boundary at the bottom of the current block.

Accordingly, the block in which at least one of the width and the height is less than the predetermined width and the predetermined height may be located in the current block at the left space of the split boundary at the leftmost and the bottom space of the split boundary at the bottom of the current block. Here, the block in which at least one of the width and the height is less than the predetermined width and the predetermined height may be determined as the second subblock.

When the subblock is determined, the second layer decoder 48 may obtain motion information of the subblock of the first layer image corresponding to the subblock of the second layer image. Here, the subblock of the first layer image may be determined to be located in a region inside the candidate block.

The subblock of the first layer image corresponding to the subblock of the second layer image may denote a subblock of the first layer image co-located with the subblock of the second layer image.

The second layer decoder 48 may predict or obtain motion information of the current block by using the motion information of the subblock of the first layer image, and encode the current block by using the predicted or obtained motion information of the current block.

Meanwhile, the inter-layer video decoding apparatus 40 may perform some of the functions performed by the inter-layer video decoding apparatus 20 described with reference to FIG. 1B. In detail, the decoder 44 may perform some of the functions performed by the decoder 24. Similarly, the obtainer 42 may perform some of the functions performed by the obtainer 22.

Figure 2D:
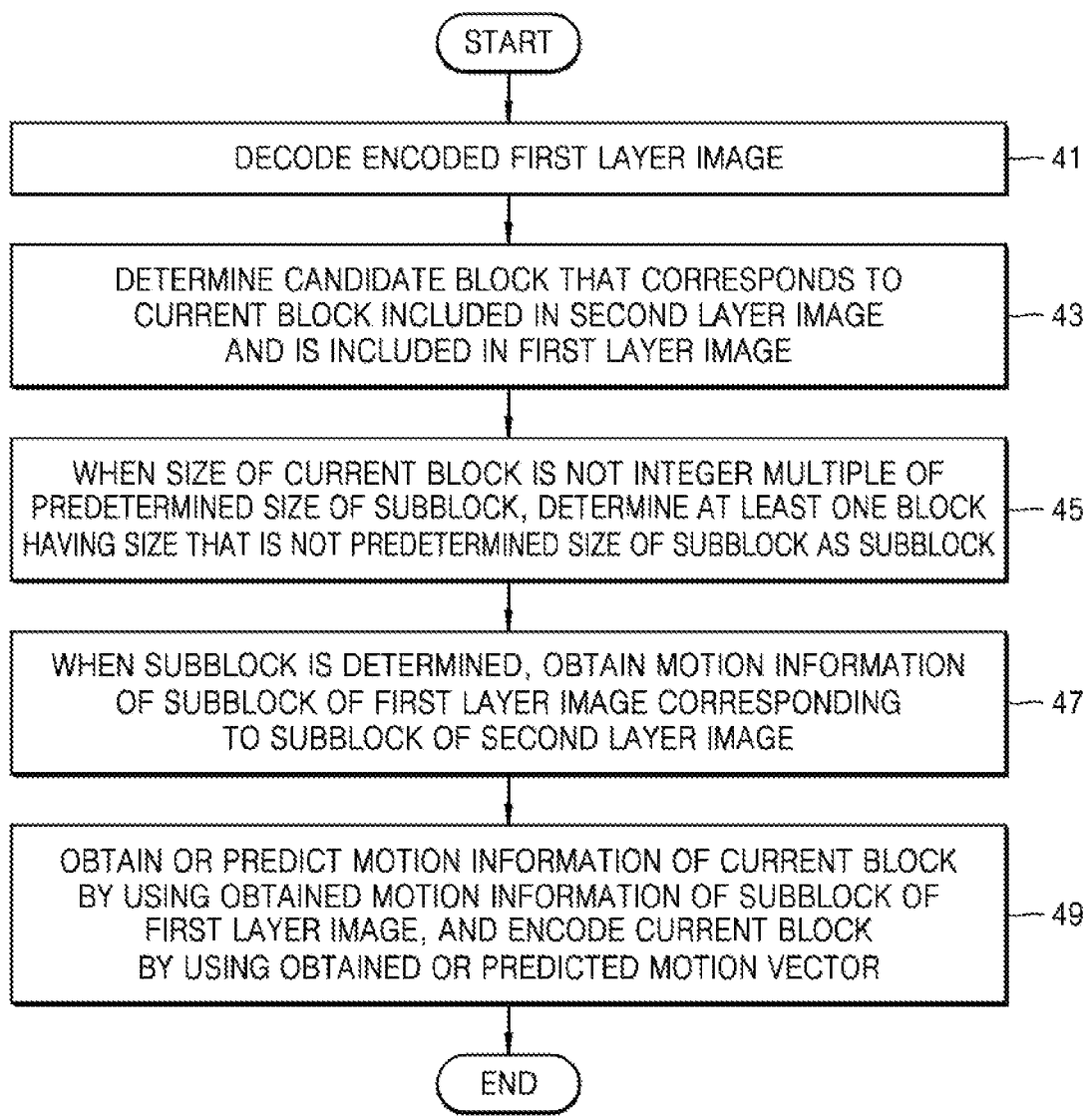
FIG. 2D is a flowchart of an inter-layer video decoding method according to various embodiments.

FIG. 2D is a flowchart of an inter-layer video decoding method according to another embodiment of the present disclosure.

In operation 41, the inter-layer video decoding apparatus 40 may decode an encoded first layer image.

In operation 43, the inter-layer video decoding apparatus 40 may determine a candidate block that corresponds to a current block included in a second layer image and is included in the first layer image.

For example, the inter-layer video decoding apparatus 40 may obtain a disparity vector pointing to the candidate block included in the first layer image from the current block included in the second layer image. The inter-layer video decoding apparatus 40 may search for the candidate block included in the first layer image by using the obtained disparity vector.

In operation 45, when a size of the current block is not an integer multiple of a predetermined size of a subblock, the inter-layer video decoding apparatus 40 may determine at least one block having a size that is not the predetermined size of the subblock as a subblock.

In operation 47, when the subblock is determined, the inter-layer video decoding apparatus 40 may obtain motion information of the subblock of the first layer image corresponding to the subblock of the second layer image. Here, the subblock of the first layer image may be determined to be located in a region inside the candidate block.

In operation 49, the inter-layer video decoding apparatus 40 may obtain or predict motion information of the current block by using the obtained motion information of the subblock of the first layer image, and encode the current block by using the obtained or predicted motion information of the current block.

Hereinafter, an inter-layer prediction structure that may be performed in the inter-layer video encoding apparatus 10 according to various embodiments will be described with reference to FIG. 3A.

Figure 3A:
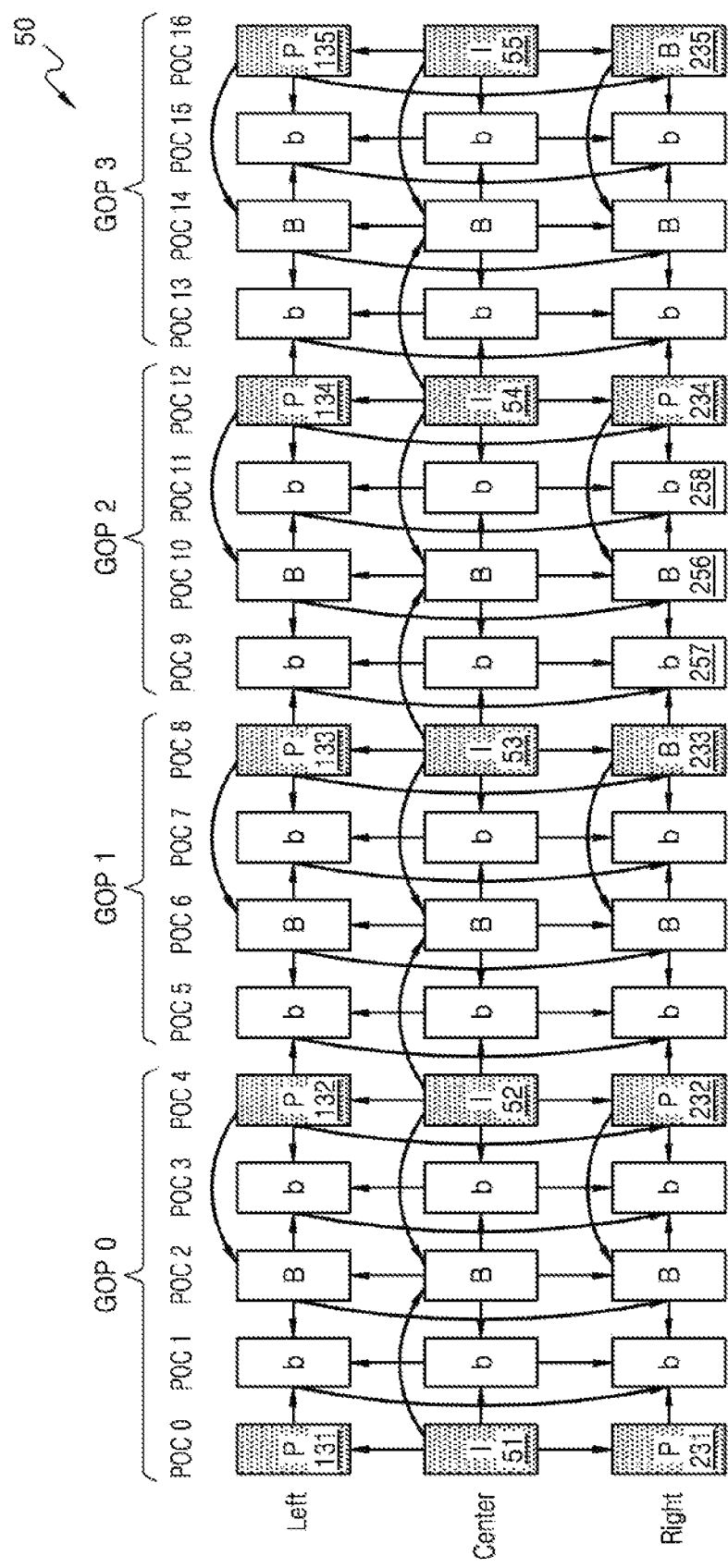
FIG. 3A is a diagram of an inter-layer prediction structure according to various embodiments.

FIG. 3A is a diagram of an inter-layer prediction structure according to various embodiments.

The inter-layer video encoding apparatus 10 according to an embodiment may prediction-encode base view images, left view images, and right view images according to a reproduction order 50 of a multiview video prediction structure of FIG. 3A.

According to the reproduction order 50 of the multiview video prediction structure according to a related technology, images of the same view are arranged in a horizontal direction. Accordingly, the left view images indicated by 'Left' are arranged in the horizontal direction in a row, the base view images indicated by 'Center' are arranged in the horizontal direction in a row, and the right view images indicated by 'Right' are arranged in the horizontal direction in a row. Compared to the left/right view images, the base view images may be central view images.

Also, images having the same POC order are arranged in a vertical direction. A POC order of images indicates a reproduction order of images forming a video. 'POC X' indicated in the reproduction order 50 of the multiview video prediction structure indicates a relative reproduction order of images in a corresponding column, wherein a reproduction order is in front when a value of X is low, and is behind when the value of X is high.

Thus, according to the reproduction order 50 of the multiview video prediction structure according to the related technology, the left view images indicated by 'Left' are arranged in the horizontal direction according to the POC order (reproduction order), the base view images indicated by 'Center' are arranged in the horizontal direction according to the POC order (reproduction order), and the right view images indicated by 'Right' are arranged in the horizontal direction according to the POC order (reproduction order). Also, the left view image and the right view image located on the same column as the base view image have different views but the same POC order (reproduction order).

Four consecutive images form one group of pictures (GOP) according to views. Each GOP includes images between consecutive anchor pictures, and one anchor picture (key picture).

An anchor picture is a random access point, and when a reproduction location is arbitrarily selected from images arranged according to a reproduction order, i.e., a POC order, while reproducing a video, an anchor picture closest to the reproduction location according to the POC order is reproduced. The base layer images include base layer anchor pictures 51 through 55, the left view images include left view anchor pictures 131 through 135, and the right view images include right view anchor pictures 231 through 235.

Multiview images may be reproduced and predicted (reconstructed) according to a GOP order. First, according to the reproduction order 50 of the multiview video prediction structure, images included in GOP 0 may be reproduced, and then images included in GOP 1 may be reproduced, according to views. In other words, images included in each GOP may be reproduced in an order of GOP 0, GOP 1, GOP 2, and GOP 3. Also, according to a coding order of the multiview video prediction structure, the images included in GOP 1 may be predicted (reconstructed), and then the images included in GOP 1 may be predicted (reconstructed), according to views. In other words, the images included in each GOP may be predicted (reconstructed) in an order of GOP 0, GOP 1, GOP 2, and GOP 3.

According to the reproduction order 50 of the multiview video prediction structure, inter-view prediction (inter-layer prediction) and inter prediction are performed on images. In the multiview video prediction structure, an image where an arrow starts is a reference image, and an image where an arrow ends is an image predicted by using a reference image.

A prediction result of base view images may be encoded and then output in a form of a base view image stream, and a prediction result of additional view images may be encoded and then output in a form of a layer bitstream. Also, a prediction encoding result of left view images may be output as a first layer bitstream, and a prediction encoding result of right view images may be output as a second layer bitstream.

Only inter-prediction is performed on base view images. In other words, the base layer anchor pictures 51 through 55 of an I-picture type do not refer to other images, but remaining images of B- and b-picture types are predicted by referring to other base view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction (inter-layer prediction) that references different view images, and inter prediction that references same view images are performed on each of left view images and right view images.

Inter-view prediction (inter-layer prediction) may be performed on the left view anchor pictures 131 through 135 by respectively referring to the base view anchor pictures 51 through 55 having the same POC order. Inter-view prediction may be performed on the right view anchor pictures 231 through 235 by respectively referring to the base view anchor pictures 51 through 55 or the left view anchor pictures 131 through 135 having the same POC order. Also, inter-view prediction (inter-layer prediction) may be performed on remaining images other than the left view images 131 through 135 and the right view images 231 through 235 by referring to other view images having the same POC.

Remaining images other than the anchor pictures 131 through 135 and 231 through 235 from among left view images and right view images are predicted by referring to the same view images.

However, each of the left view images and the right view images may not be predicted by referring to an anchor picture that has a preceding reproduction order from among additional view images of the same view. In other words, in order to perform inter prediction on a current left view image, left view images excluding a left view anchor picture that precedes the current left view image in a reproduction order may be referenced. Similarly, in order to perform inter prediction on a current right view image, right view images excluding a right view anchor picture that precedes the current right view image in a reproduction order may be referenced.

Also, in order to perform inter prediction on a current left view image, prediction may be performed by referring to a left view image that belongs to a current GOP but is to be reconstructed before the current left view image, instead of referring to a left view image that belongs to a GOP before the current GOP of the current left view image. The same is applied to a right view image.

The inter-layer video decoding apparatus 20 according to various embodiments may reconstruct base view images, left view images, and right view images according to the reproduction order 50 of the multiview video prediction structure of FIG. 3A.

Left view images may be reconstructed via inter-view disparity compensation that references base view images and inter motion compensation that references left view images. Right view images may be reconstructed via inter-view disparity compensation that references base view images and left view images, and inter motion compensation that references right view images. Reference images may be reconstructed first for disparity compensation and motion compensation of left view images and right view images.

For inter motion compensation of a left view image, left view images may be reconstructed via inter motion compensation that references a reconstructed left view reference image. For inter motion compensation of a right view image, right view images may be reconstructed via inter motion compensation that references a reconstructed right view reference image.

Also, for inter motion compensation of a current left view image, only a left view image that belongs to a current GOP of the current left view image but is to be reconstructed before the current left view image may be referenced, and a left view image that belongs to a GOP before the current GOP is not referenced. The same is applied to a right view image.

Also, the inter-layer video decoding apparatus 20 according to various embodiments may not only perform disparity compensation (or inter-layer prediction compensation) to encode or decode a multiview image, but also perform motion compensation between images (or inter-layer motion prediction compensation) via inter-view motion vector prediction.

Figure 3B:
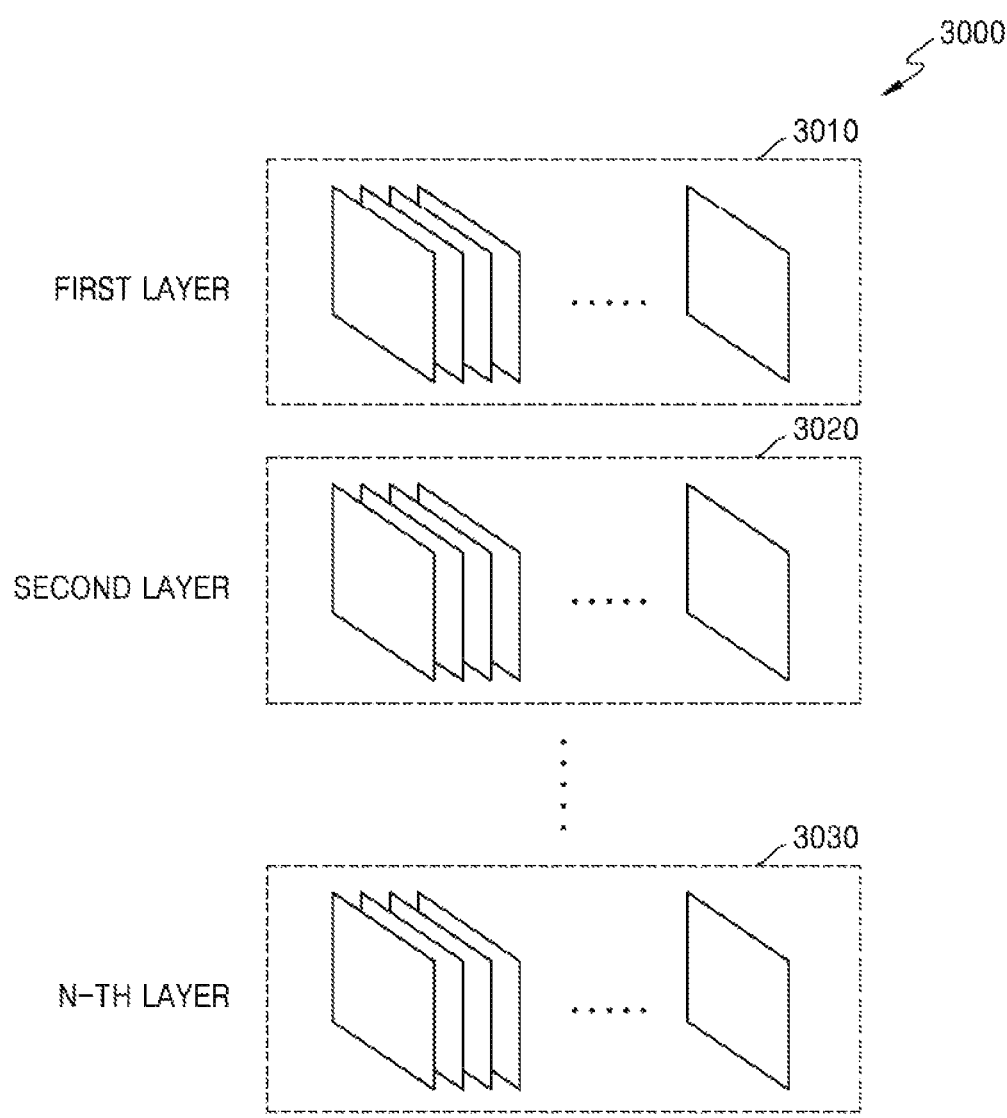
FIG. 3B is a diagram of a multilayer video according to various embodiments.

FIG. 3B is a diagram of a multilayer video according to various embodiments.

In order to provide an optimum service in various network environments and various terminals, the inter-layer video apparatus 10 may output a scalable bitstream by encoding multilayer image sequences having various spatial resolutions, various qualities, various frame rates, and different viewpoints. In other words, the multilayer video encoding apparatus 10 may generate and output a scalable video bitstream by encoding an input image according to various scalability types. Scalability includes temporal, spatial, quality, and multiview scalabilities, and a combination thereof. Such scalabilities may be classified according to types. Also, the scalabilities may be classified as a dimension identifier in each type.

For example, the scalability has the same scalability type as the temporal, spatial, quality, and multiview scalability. Also, the scalability may be classified into scalability dimension identifier according to types. For example, when the scalabilities are different, the scalabilities may have different dimension identifiers. For example, a high scalability dimension may be assigned to a high-dimensional scalability with respect to the scalability type.

When a bitstream is dividable into valid sub-streams, the bitstream is scalable. A spatial scalable bitstream includes sub-streams of various resolutions. In order to distinguish different scalabilities in the same scalability type, a scalability dimension is used. The scalability dimension may be expressed by a scalability dimension identifier.

For example, the spatial scalable bitstream may be divided into sub-streams having different resolutions, such as QVGA, VGA, and WVGA. For example, layers having different resolutions may be distinguished by using a dimension identifier. For example, the QVGA sub-stream may have 0 as a spatial scalability dimension identifier value, the VGA sub-stream may have 1 as a spatial scalability dimension identifier value, and the WVGA sub-stream may have 2 as a spatial scalability dimension identifier value.

A temporal scalable bitstream includes sub-streams having various frame rates. For example, the temporal scalable bitstream may be divided into sub-streams having a frame rate of 7.5 Hz, a frame rate of 15 Hz, a frame rate of 30 Hz, and a frame rate of 60 Hz. A quality scalable bitstream may be divided into sub-streams having different qualities according to a coarse-grained scalability (CGS) method, a medium-grained scalability (MGS) method, and a fine-grained scalability (FGS) method. The temporal scalability may also be distinguished according to different dimensions according to different frame rates, and the quality scalability may also be distinguished according to different dimensions according to different methods.

A multiview scalable bitstream includes sub-streams of different viewpoints in one bitstream. For example, in a stereoscopic image, a bitstream includes a left image and a right image. Also, a scalable bitstream may include sub-streams related to a multiview image and encoded data of a depth map. The viewpoint scalability may also be distinguished according to different dimensions according to different viewpoints.

Different scalable expansion types may be combined with each other. In other words, a scalable video bitstream may include sub-streams in which image sequences of a multilayer including images, wherein at least one of temporal, spatial, quality, and multiview scalabilities are different from each other, are encoded.

FIG. 3B illustrates image sequences 3010 through 3030 having different scalable expansion types. The image sequence 3010 of a first layer, the image sequence 3020 of a second layer, and an image sequence 3030 of an n-th layer (n is an integer) may be image sequences in which at least one of resolutions, qualities, and viewpoints are different from each other. Also, one of the image sequence 3010 of the first layer, the image sequence 3020 of the second layer, and the image sequence 3030 of the n-th layer may be an image sequence of a base layer and the other image sequences may be image sequences of an enhancement layer.

For example, the image sequence 3010 of the first layer may include images of a first viewpoint, the image sequence 3020 of the second layer may include images of a second viewpoint, and the image sequence 3030 of the n-th layer may include images of an n-th viewpoint. As another example, the image sequence 3010 of the first layer may be a left-view image of a base layer, the image sequence 3020 of the second layer may be a right-view image of the base layer, and the image sequence 3030 of the n-th layer may be a right-view image of an enhancement layer. However, an embodiment is not limited thereto, and the image sequences 3010 through 3030 having different scalable expansion types may be image sequences having different image attributes.

FIG. 3C is a diagram of NAL units including encoded data of a multilayer video, according to various embodiments.

As described above, the bitstream generator 18 outputs NAL units including encoded multilayer video data and additional information. A video parameter set (VPS) includes information applied to multilayer image sequences 3120 through 3140 included in the multilayer video. The NAL unit including information about the VPS is referred to as a VPS NAL unit 3110.

The VPS NAL unit 3110 includes a common syntax element shared by the multilayer image sequences 3120 through 3140, information about an operation point to stop transmission of unnecessary information, and essential information about an operation point required during session negotiation, such as a profile or a level. In particular, the VPS NAL unit 3110 according to an embodiment includes scalability information related to a scalability identifier for realizing scalability in a multilayer video. The scalability information is information for determining scalability applied to the multilayer image sequences 3120 through 3140 included in the multilayer video.

The scalability information includes information about a scalability type and a scalability dimension applied to the multilayer image sequences 3120 through 3140 included in the multilayer video. In encoding and decoding methods according to a first embodiment of the present disclosure, the scalability information may be directly obtained from a value of a hierarchical identifier included in a NAL unit header. The hierarchical identifier is an identifier for distinguishing a plurality of layers included in a VPS. The VPS may signal the hierarchical identifier of each layer through VPS extension. The layer identifier of each layer of the VPS may be signaled by being included in the VPS NAL unit. For example, the hierarchical identifier of the NAL units belong to a certain layer of the VPS may be included in the VPS NAL unit. For example, the hierarchical identifier of the NAL unit belonging to the VPS may be signaled through the VPS extension. Accordingly, in encoding and decoding methods according to various embodiments, the scalability information about a layer of the NAL units belonging to the VPS may be obtained by using the hierarchical identifier value of the NAL units.

Hereinafter, inter-layer disparity compensation and inter-layer motion prediction will be described with reference to FIG. 4A.

Figure 4A:
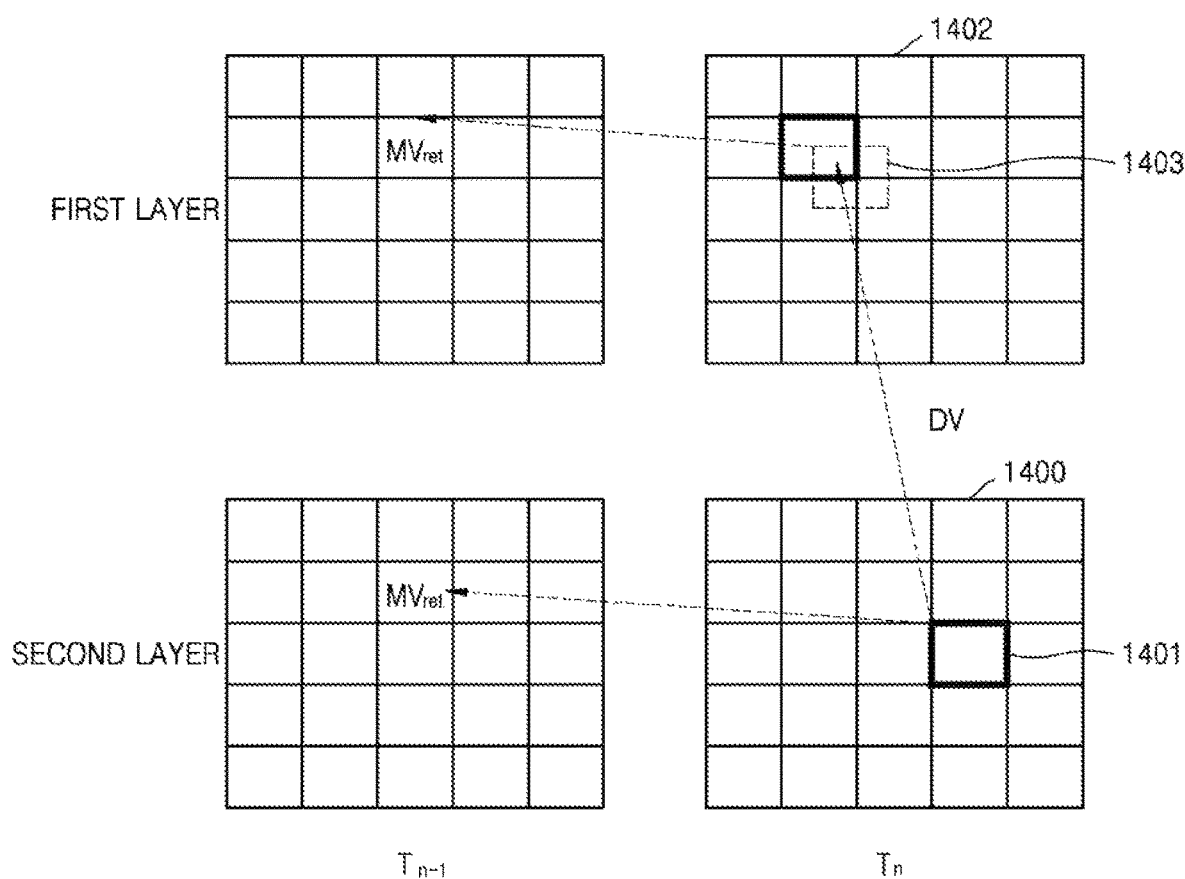
FIG. 4A is a diagram for describing a disparity vector for inter-layer prediction, according to various embodiments.

FIG. 4A is a diagram for describing a disparity vector for inter-layer prediction, according to various embodiments.

Referring to FIG. 4A, the inter-layer video decoding apparatus 20 according to various embodiments may perform inter-layer prediction to find a first layer reference block 1403 included in a first layer reference picture 1402, which corresponds to a current block 1401 included in a second layer current picture 1400, by using a disparity vector DV, and perform disparity compensation by using the first layer reference block 1403.

Also, the inter-layer video decoding apparatus 20 according to various embodiments may, for inter-layer motion prediction, obtain a reference motion vector mv_ref of the first layer reference block 1403 indicated by the disparity vector DV from the second layer current block 1401 and predict a motion vector mv_cur of the current block 1401 by using the obtained reference motion vector mv_ref. In this case, the inter-layer video decoding apparatus 20 may perform motion compensation between second layer images by using the predicted motion vector mv_cur.

Here, a reference location may be a location indicated by the disparity vector DV from a center pixel of the current block 1401, or a location indicated by the disparity vector DV from an upper left pixel of the current block 1401.

As described above, in order to perform prediction by referring to different view images, a disparity vector is required. A disparity vector may be transmitted from an encoding apparatus to a decoding apparatus through a bitstream as separate information, or may be predicted based on a depth image or a neighboring block of a current block. In other words, a predicted disparity vector may be a neighboring blocks disparity vector (NBDV) and a depth oriented NBDV (DoNBDV).

First, when a disparity vector (a motion vector in an inter-layer direction) is obtained from neighboring block candidates, the NBDV denotes a disparity vector of a current block predicted by using the obtained disparity vector.

Meanwhile, when a depth image is encoded and decoded from among different layer images, a depth block corresponding to a current block may be determined by using the NBDV. Here, a representative depth value is determined from among depth values included in the determined depth block, and the determined depth value is converted to a disparity vector by using a camera parameter. The DoNBDV denotes a disparity vector predicted by using the disparity vector converted from the depth value.

Figure 4B:
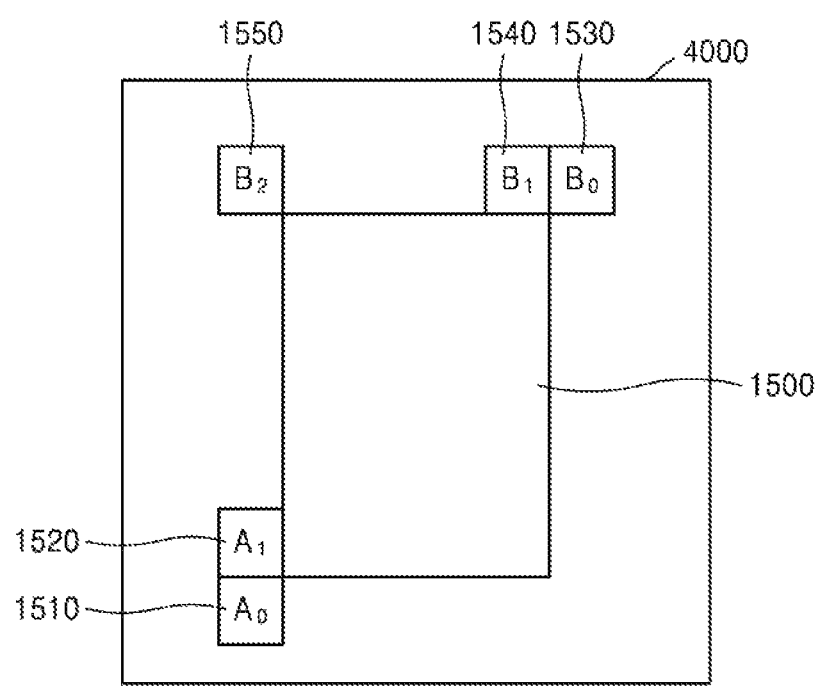
FIG. 4B is a diagram for describing spatial neighboring block candidates for predicting a disparity vector, according to various embodiments.

FIG. 4B is a diagram for describing spatial neighboring block candidates for predicting a disparity vector, according to various embodiments.

Referring to FIG. 4B, the inter-layer video decoding apparatus 20 according to an embodiment of the present disclosure may search spatial neighboring block candidates in a predetermined searching order (for example, z-scan or raster scan) in order to predict a disparity vector of a current block 1500 in a current picture 4000. Here, found neighboring block candidates may be prediction units temporally or spatially adjacent to the current block 1500.

Alternatively, For example, in the inter-layer video decoding apparatus 20 according to another embodiment, a neighboring block A0 1510 located at the left bottom of the current block 1500, a neighboring block A1 1520 located at the left of the current block 1500, a neighboring block B0 1530 located at right top of the current block 1500, a neighboring block B1 1540 located at the top of the current block 1500, and a neighboring block B2 1550 located at the left top of the current block 1500 may be spatial neighboring block candidates for obtaining a disparity vector. In order to obtain a disparity vector, neighboring blocks at predetermined locations may be searched in an order of neighboring block candidates A1 1520, B1 1540, B0 1530, A0 1510, and B2 1550.

Figure 4C:
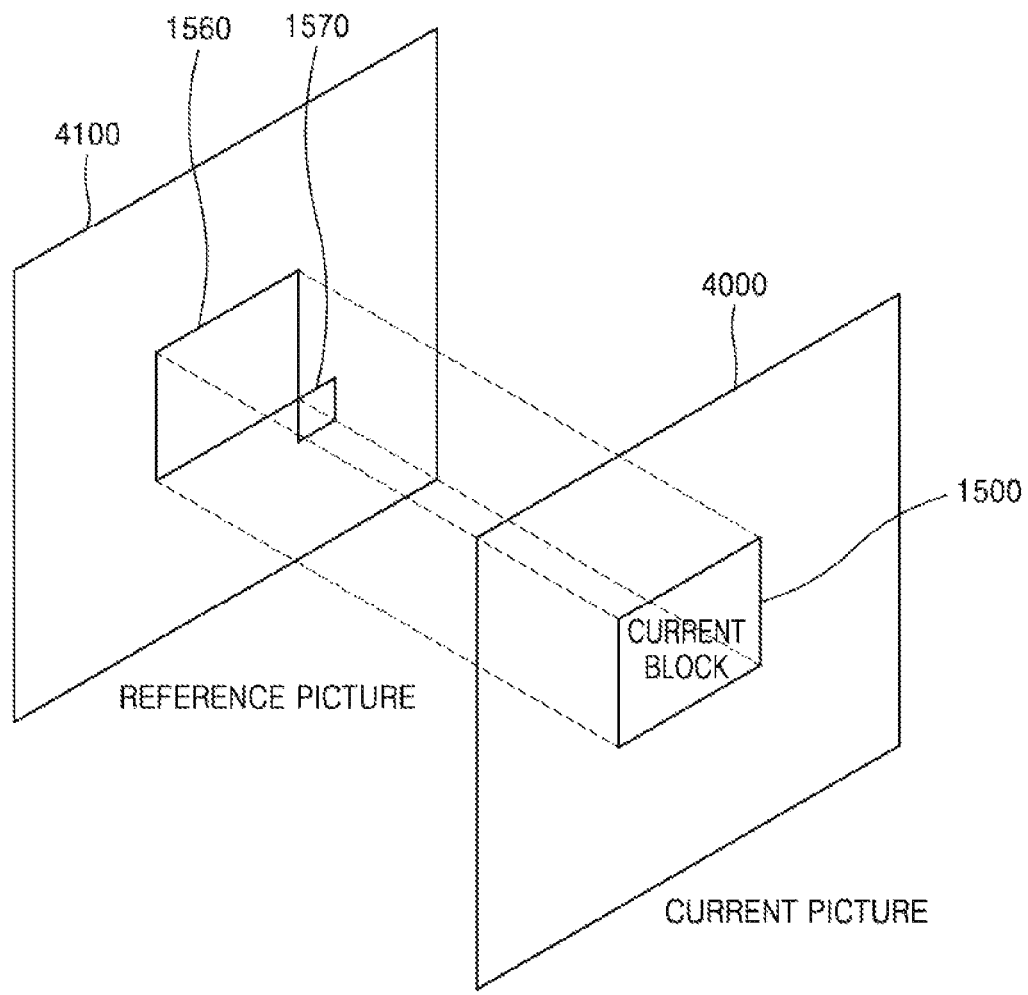
FIG. 4C is a diagram for describing a temporal neighboring block candidate for predicting a disparity vector, according to various embodiments.

FIG. 4C is a diagram for describing a temporal neighboring block candidate for predicting a disparity vector, according to various embodiments.

Referring to FIG. 4C, in order for the inter-layer video decoding apparatus 20 to perform inter prediction on the current block 1500 included in the current picture 4000, at least one of a block Col 1560 that is included in a reference picture 4100 and is co-located with the current block 1500 and an adjacent block of the co-located block 1560 may be included in a temporal neighboring block candidate. For example, a right bottom block BR 1570 of the co-located block Col 1560 may be included in a temporal prediction candidate. Meanwhile, a block used for temporal prediction candidate determination may be a coding unit or a prediction unit.

Figure 5:
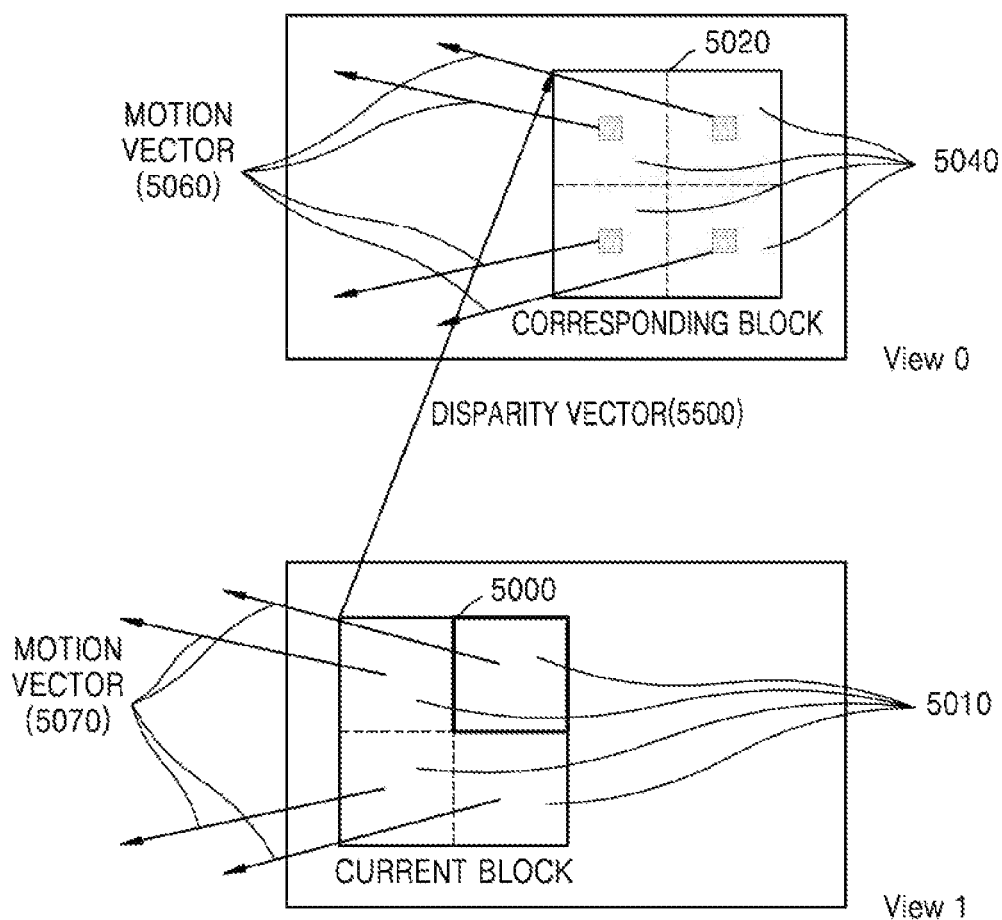
FIG. 5 is a diagram for describing subblock-based interview motion prediction according to various embodiments.

FIG. 5 is a diagram for describing subblock-based inter-view motion prediction according to various embodiments.

The inter-layer video decoding apparatus 20 may determine a disparity vector of a current block 5000. Here, the determined disparity vector may be a vector determined by using information about a disparity vector obtained from a bitstream, or a disparity vector derived from a neighboring block. Here, a current block may be a prediction unit.

The inter-layer video decoding apparatus 20 may determine a corresponding block 5020 in an image of a current viewpoint View 1 and another viewpoint View 0 by using the determined disparity vector. Here, a size of the corresponding block 5020 may be the same as a size of the current block 5000, and a corresponding block may be a co-located block with a current block.

Meanwhile, the inter-layer video decoding apparatus 20 may split the current block into at least one subblock.

The inter-layer video decoding apparatus 20 may equally split the current block into subblocks having a predetermined size. For example, when the size of the current block 5000 is 16×16 and a size of subblocks 5010 is 8×8, the inter-layer video decoding apparatus 20 may split the current block 5000 into four subblocks 5010.

Meanwhile, the inter-layer video decoding apparatus 20 may determine subblocks 5040 in the block 5020 of the other viewpoint View 0 different from the current viewpoint, which respectively correspond to the four subblocks 5010 in the current block.

Here, the inter-layer video decoding apparatus 20 may obtain motion vectors of the subblocks 5040 and predict a motion vector of each of the subblocks 5010 by using the obtained motion vectors.

The inter-layer video decoding apparatus 20 may determine one of blocks included in one picture from among pictures in a reference list in the same viewpoint View1 as the current viewpoint as a reference block by using the predicted motion vector of each of the subblocks 5010.

The inter-layer video decoding apparatus 20 may perform motion compensation by using the reference block.

Meanwhile, the inter-layer video decoding apparatus 20 may signal information about a subblock size according to layer images. For example, the inter-layer video decoding apparatus 20 may receive, from a bitstream, information about a size of a subblock regarding a layer image of View 1.

When a size of a subblock determined by using the information about the size of the subblock is greater than a current prediction unit, the inter-layer video decoding apparatus 20 may change and determine the size of the subblock to a size of the current prediction unit.

For example, when the size of the subblock is determined to be 16×16 by using the information about the size of the subblock, and the current prediction unit is 8×8, the inter-layer video decoding apparatus 20 may change and determine the size of the subblock to a size (8×8) of the current prediction unit. Accordingly, the inter-layer video decoding apparatus 20 determines the size of the subblock by using the information about the size of the subblock, but the size of the subblock determined by using the information about the size of the subblock is not limited, and may be changed and determined to the size of the current prediction unit according to conditions.

Meanwhile, the inter-layer video decoding apparatus signals the information about the size of the subblock per layer image without considering a minimum size of a coding unit and a maximum size of a coding unit.

Hereinafter, reasons why the inter-layer video decoding apparatus 20 determines a size of a subblock of a second layer image within a range less than or equal to a maximum size of a coding unit will be described.

A prediction unit is less than or equal to a maximum size of a coding unit. When an inter-layer video decoding apparatus signals information about a size of a subblock without considering the maximum size of the coding unit, the inter-layer video decoding apparatus may determine a subblock greater than the maximum size of the coding unit while determining a size of a subblock of the signaled size of the subblock.

Accordingly, the inter-layer video decoding apparatus 20 according to another embodiment of the present disclosure may determine a size of a subblock by using information about a size of a subblock within a range less than or equal to a maximum size of a coding unit. Accordingly, realization/operation complexity of encoding and decoding apparatuses may be reduced.

Hereinafter, reasons why the inter-layer video decoding apparatus 20 determines a size of a subblock of a second layer image within a range equal to or greater than a minimum size of a coding unit will be described.

Here, it is assumed that a current coding unit has a minimum size of a coding unit and has a partition type other than 2N×2N, and thus a prediction unit included in the current coding unit is determined to be less than the minimum unit of the current coding unit.

Here, when the inter-layer video decoding apparatus 20 obtains subblock size information indicating a size less than the minimum size of the coding unit from an inter-layer video encoding apparatus, the inter-layer video decoding apparatus 20 may determine a size of a subblock less than the minimum size of the coding unit by using the subblock size information.

However, when the size of the subblock determined by using the subblock size information is greater than a size of a prediction unit, the size of the subblock may be changed to the size of the prediction unit as described above.

Accordingly, it is efficient that the size of the subblock is determined according to the prediction unit when it is less than the minimum size of the coding unit. Accordingly, the subblock size information may be signaled only when the size of the subblock is equal to or greater than the minimum size of the coding unit, thereby reducing realization/operation complexity of encoding and decoding apparatuses.

Accordingly, the inter-layer video decoding apparatus 20 may determine the size of the subblock by using information about the size of the subblock within the range equal to or greater than the minimum size of the coding. Accordingly, realization/operation complexity of the encoding and decoding apparatuses may be reduced.

Meanwhile, an inter-layer video decoding apparatus signals subblock size information indicating a size of a subblock, which may include information about a 4×4 size, even by considering a prediction unit having a 4×4 size that is not allowed in an existing codec as a size of a subblock.

The inter-layer video decoding apparatus 20 according to another embodiment of the present disclosure may signal subblock size information indicating a size of a subblock excluding a prediction unit having a size that is not allowed. The information indicating the size of the subblock may be signaled without unnecessarily wasting bit numbers required to indicate a prediction unit having a size that is not allowed.

Meanwhile, a viewpoint 0 (View 0) image and a viewpoint 1 (View 1) image may be color images having different viewpoints. However, an embodiment is not limited thereto, and the viewpoint 0 (View 0) image and the viewpoint 1 (View 1) image may be depth images having different viewpoints. Here, subblock-based inter-view motion prediction may be performed in the same manner when the viewpoint 1 (View 0) image and the viewpoint 1 (View 1) image are color images and depth images, but sizes of subblocks may be differently determined. For example, when they are color images, a size of a subblock may be determined according to subblock size information parsed from a bitstream, but when they are depth images, a size of a subblock may be determined to be a maximum size of a coding unit.

Hereinabove, subblock-based inter-view motion prediction has been described with reference to FIG. 5. Similarly to the subblock-based inter-view motion prediction, inter-layer prediction may be performed by using a motion parameter inheritance (MPI) encoding and decoding tool.

The MPI encoding and decoding tool denotes a tool that intactly obtains motion information or disparity information of a block co-located with a current block in a color image of the same viewpoint while encoding and decoding a depth image, and performs encoding and decoding by using the motion information or the disparity information of the current block. In other words, even when the MPI encoding and decoding tool is used, a block co-located with a current block in an image different from a current image is found like when inter-view motion prediction is performed, and motion information (or disparity information) is obtained according to subblocks.

Accordingly, even when the MPI encoding and decoding tool is used, the inter-layer video decoding apparatus 20 may obtain size information of a subblock for MPI encoding and decoding, and determine a size of a subblock for MPI encoding and decoding by deriving a process of determining a size of a subblock during inter-view motion prediction even during a process of determining a size of a subblock for MPI encoding and decoding by using the size information of a subblock.

In detail, a process of determining, by the inter-layer video decoding apparatus 20, a size of a subblock by using subblock size information will be described later with reference to FIG. 7B.

Figure 6A:
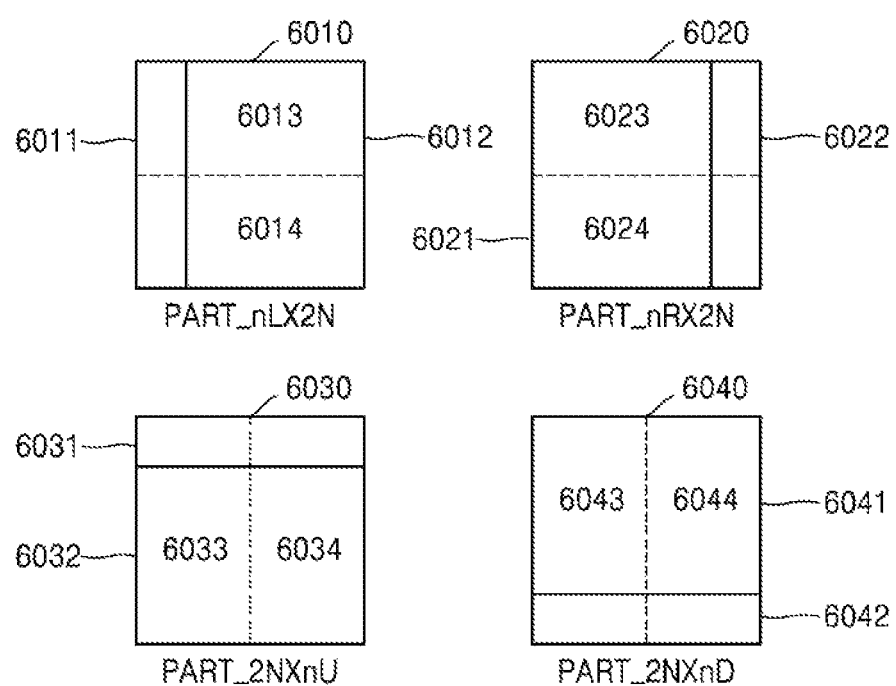
FIGS. 6A through 6C are diagrams for describing processes of determining a size of a subblock, according to various embodiments.
Figure 6B:
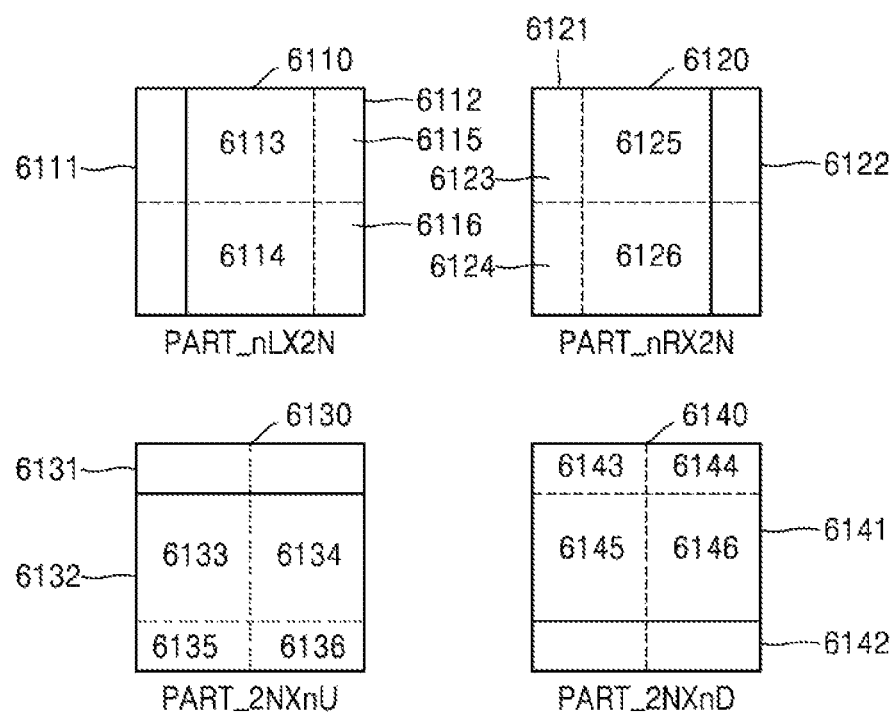
Figure 6C:
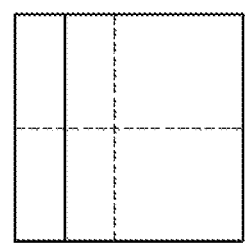
Figure 6C:
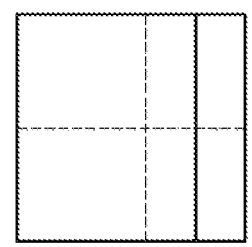
Figure 6C:
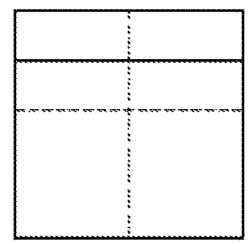
Figure 6C:
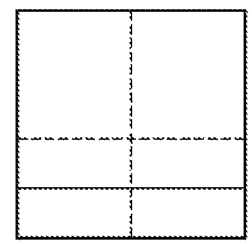

FIGS. 6A through 6C are diagrams for describing processes of determining a size of a subblock, according to various embodiments.

Referring to FIG. 6A, according to a partition type of a coding unit, the inter-layer video decoding apparatus 40 may split a coding unit 6010 asymmetrically into prediction units 6011 and 6012 (partition type PART_nL×2N), a coding unit 6020 asymmetrically into prediction units 6021 and 6022 (partition type PART_nR×2N), a coding unit 6030 asymmetrically into prediction units 6031 and 6032 (partition type PART_2N×nU), or a coding unit 6040 asymmetrically into prediction units 6041 and 6042 (partition type PART_2N×nD).

Referring to FIG. 6A, the inter-layer video decoding apparatus 40 may split the prediction units 6011, 6012, 6021, 6022, 6031, 6032, 6041 and 6042 in a direction perpendicular to a split direction while splitting the coding units 6010, 6020, 6030 and 6040 into prediction units, in order to split the prediction units 6011, 6012, 6021, 6022, 6031, 6032, 6041 and 6042 into at least one subblock.

The inter-layer video decoding apparatus 40 may split the prediction units 6011, 6012, 6021, 6022, 6031, 6032, 6041 and 6042 into subblocks to perform subblock-based inter-layer prediction. When a size of the prediction units 6011, 6012, 6021, 6022, 6031, 6032, 6041 and 6042 is not an integer multiple of a certain size pre-determined to be a size of a subblock, the inter-layer video decoding apparatus 40 may not determine a block having the predetermined size as a subblock.

Here, when a size of the coding units 6010 through 6040 is 16×16, blocks 6013, 6014, 6023, and 6024 may be 12×8 and blocks 6033, 6034, 6043, and 6044 may be 8×12. Meanwhile, subblocks having sizes of 12×8 and 8×12 may not be prediction units generally allowed in a codec.

Accordingly, when a size of a subblock is not an allowable unit, the inter-layer video decoding apparatus 40 according to an embodiment may perform prediction on a coding unit by matching the size of the subblock and a size of a prediction unit.

Referring to FIG. 6B, the inter-layer video decoding apparatus 40 determines a block having the same size as a predetermined size of a prediction unit as a first subblock, and the inter-layer video decoding apparatus 40 determines a block in which at least one of a width and a height is less than a predetermined width and a predetermined height as a second subblock.

Accordingly, the inter-layer video decoding apparatus 40 may split a prediction unit 6112 into first subblocks 6113 and 6114 and second subblocks 6115 and 6116. For example, the inter-layer video decoding apparatus 40 may split prediction units 6110 and 6120 into the first subblocks 6113 and 6114 having the same size as a predetermined size (8×8). Also, the inter-layer video decoding apparatus 40 may split the prediction unit 6110 into the second subblocks 6115 and 6116 in which at least one of a width and a height is less than the predetermined width and the height.

Similarly, the inter-layer video decoding apparatus 40 may split remaining prediction units 6121, 6132, and 6141 in the similar manner.

Accordingly, the inter-layer video decoding apparatus 40 may split a prediction unit having a size (12×8 or 8×12) that is not allowed into subblocks having a size of 8×8, 8×4, or 4×8 that is allowed.

Meanwhile, referring to FIG. 6C, as described in detail in relation to FIG. 6B, the inter-layer video decoding apparatus 40 determines a block having the same size as a predetermined size of a prediction unit into a first subblock, and the inter-layer video decoding apparatus 40 determines a block in which at least one of a width or a height is less than a predetermined width or a predetermined height as a second subblock.

However, unlike shown in FIG. 6B, the inter-layer video decoding apparatus 40 may vary a split boundary to vary and split a location of a first subblock and a location of a second subblock in a prediction unit. In other words, the inter-layer video decoding apparatus 40 may determine a split boundary via any one of various methods while splitting a prediction unit into subblocks, and thus types of subblocks and the number of subblocks according to types may be the same but locations of the subblocks may vary according to the split boundary.

Meanwhile, the inter-layer video decoding apparatus 40 may determine a width and a height (nSbW, nSbH) of a subblock by using information indicating a size of a subblock according to layers while determining a subblock.

Meanwhile, the inter-layer video decoding apparatus 40 determines, from among subblocks included in a current prediction unit, a width direction index (xBlk) regarding a certain subblock from a leftmost top subblock, and a height direction index (yBlk) regarding a certain subblock from the leftmost top subblock. A range of the height direction index may be determined to be from 0 to yBlkr. yBlkr may be determined according to Equation 1 below.

$$yBlkr = nPbH/nSbH - 1 + (nPb \% nSbH ? 1:0) \quad \text{[Equation 1]}$$

Here, nPbH denotes a height of a prediction unit and nSbH denotes a height of a subblock.

Meanwhile, when locations of certain subblocks in a height direction from topmost subblocks from among subblocks included in a current prediction unit is outside an edge of a prediction unit, the inter-layer video decoding apparatus 40 may determine an actual height (nRealSbH) of the subblocks by subtracting a height (yBlk*nSbH) from the topmost subblocks to blocks located adjacent to the top of the certain subblocks from a height (nPbH) of the prediction unit.

Meanwhile, a range of the width direction index may be determined to be from 0 to xBlkr. xBlkr may be determined according to Equation 2 below.

$$xBlkr = nPbW/nSbW - 1 + (nPbW\% \, onSbW ? 1:0) \quad \text{[Equation 2]}$$

Here, nPbW denotes a width of a prediction unit and nSbW denotes a width of a subblock.

When certain subblocks from among subblocks included in a current prediction unit are outside an edge of a prediction unit, the inter-layer video decoding apparatus 40 may determine an actual width of the subblocks by subtracting a width (xBlk*nSbW) from topmost subblocks to subblocks adjacent to the left of the subblocks from a width (nPbW) of the prediction unit.

The inter-layer video decoding apparatus 40 determines which one of an L0 prediction list and an L1 prediction list regarding a subblock is to be used by using a disparity vector (mvDisp) and a reference viewpoint index (refViewIdx) according to subblocks.

Also, the inter-layer video decoding apparatus 40 may determine a motion vector predicted in an L0 prediction direction and a motion vector predicted in an L1 prediction direction according to subblocks. Also, the inter-layer video decoding apparatus 40 may determine a prediction direction according to subblocks.

Meanwhile, when the inter-layer video decoding apparatus 40 determined an inter-view motion compensation merge candidate regarding a current prediction unit to be a merge candidate, the inter-layer video decoding apparatus 40 may determine an a location, an actual height, and an actual width of a subblock included in the current prediction unit by using a location, an actual height, and an actual width of a subblock determined from the inter-view motion vector prediction candidate.

When it is determined that inter-view motion compensation is performed by using the inter-view motion vector prediction candidate, the inter-layer video decoding apparatus 40 may perform motion compensation according to subblocks by using a motion vector candidate, a reference picture index, and a prediction direction according to subblocks determined in relation to the inter-view motion compensation merge candidate, and determine a prediction sample value according to subblocks.

Also, when a prediction sample value of subblocks included in a prediction unit is determined, a prediction sample value according to prediction units may be determined.

Meanwhile, the inter-layer video decoding apparatus 40 according to another embodiment of the present disclosure may determine a width (nSbW) of a subblock and a height (nSbW) of a subblock used while determining an inter-view motion vector candidate as follows.

The inter-layer video decoding apparatus 40 determines a size (SubPbSize) of a subblock by using subblock size information according to layers. Here, it is assumed that a subblock is a square. Accordingly, the size (SubPbSize) of the subblock may denote a height or a width of the subblock.

When the remainder obtained by dividing a width (nPbW) of a prediction unit by the size (SubPbSize) of the subblock is not 0, the inter-layer video decoding apparatus 40 may determine a width (nSbW) of the subblock to be the width (nPbW) of the original prediction unit.

Alternatively, when the remainder obtained by dividing the height (nPbH) of the prediction unit by the size (sub-PbSize) of the subblock is not 0, the inter-layer video decoding apparatus 40 may determine the width (nSbW) of the subblock to be the width (nPbW) of the original prediction unit.

Similarly, when the remainder obtained by dividing the width (nPbW) of the prediction unit by the size (SubPbSize) of the subblock is not 0, the inter-layer video decoding apparatus 40 may determine the height (nSbH) of the subblock to be the height (nPbH) of the original prediction unit.

Alternatively, when the remainder obtained by dividing the height (nPbH) of the prediction unit by the size (Sub-PbSize) of the subblock is not 0, the inter-layer video decoding apparatus 40 may determine the height (nSbH) of the subblock to be the width (nPbW) of the original prediction unit.

Meanwhile, when the remainder obtained by dividing the height (nPbH) of the prediction unit by the size (SubPbSize) of the subblock is 0 and the remainder obtained by dividing the width (nPbW) of the prediction unit by the size (Sub-PbSize) of the subblock is 0, the inter-layer video decoding apparatus 40 may determine the height (nSbH) and the width (nSbW) of the subblock to be the size (subPbSize) of the subblock.

For example, when a prediction unit is 16×12 or 16×4, the inter-layer video decoding apparatus 40 may determine a size of a subblock to be 16×12 or 16×4.

FIG. 7A is a diagram illustrating a VPS extension syntax according to various embodiments.

Referring to FIG. 7A, the inter-layer video decoding apparatus 20 or 40 obtains a syntax element log 2_sub_pb_size_minus3[layerId] 71 in case of a layer other than a base layer (layerId!=0). Here, log 2_sub_pb_size_minus3[layerId] denotes a size of a subblock regarding a layer having a layer identifier of layerId.

The inter-layer video decoding apparatus 20 may determine a size (SubPbSize[layerId]) of a subblock by using the syntax element log 2_sub_pb_size_minus3[layerId].

The syntax element log 2_sub_pb_size_minus3[layerId] denotes a size of a subblock used in a prediction unit using an inter-view merge candidate. In other words, the syntax element log 2_sub_pb_size_minus3[layerId] denotes a value obtained by adding log 2 to a size of a square subblock of the layer having the layer identifier of layerId, and then subtracting 3 from the result value of adding log 2.

Here, the syntax element log 2_sub_pb_size_minus3[layerId] may be a value obtained by adding a log of 2 to the size (SubPbSize) of the subblock and then subtracting 3 from the result value such that information about a prediction unit having a 4×4 size that is not allowed as a size of a subblock is not unnecessarily signaled.

Meanwhile, an allowed range of a value of a syntax element log 2_sub_pb_size_minus3 may be from MinCb Log 2SizeY-3 to CtbLog 2SizeY-3.

Here, MinCb Log 2SizeY denotes a minimum size of a coding unit and CtbLog 2 SizeY denotes a maximum size of a coding unit.

MinCb Log 2SizeY may be a value obtained by adding 3 to a syntax element log 2_min_luma_coding_block_size_minus3. The syntax element log 2_min_luma_coding_block_size_minus3 is a value obtained by adding log 2 to a minimum size of a coding unit and then subtracting 3 from the result value.

Also, CtbLog 2SizeY may be a value obtained by adding a syntax element log 2_diff_max_min_luma_coding_block_size to MinCb Log 2SizeY.

Here, the syntax element log 2_diff_max_min_luma_coding_block_size denotes a difference between a value obtained by adding log 2 to a maximum size of a coding unit and a value obtained by adding log 2 to a minimum size of the coding unit.

Such syntax elements log 2_diff_max_min_luma_coding_block_size and log 2_min_luma_coding_block_size_minus3 may be parsed from a bitstream.

For example, the syntax elements log 2_diff_max_min_luma_coding_block_size and log 2_min_luma_coding_block_size_minus3 may be obtained from a VPS NAL unit or a SPS NAL unit included in the bitstream.

Meanwhile, the size (SubPbSize[layerId]) of the subblock regarding the certain layer may be determined according to a flag VpsDepthFlag(layerId). The flag VpsDepthFlag(layerId) denotes a flag indicating whether the layer having the layer identifier layered is a depth map.

When the certain layer is a depth map, the size (SubPbSize[layerId]) of the subblock may be determined to be a maximum size (CtbLog 2SizeY) of a coding unit.

Meanwhile, when the size (SubPbSize[layerId]) of the subblock regarding the certain layer is not a depth map, the size (SubPbSize[layerId]) of the subblock may be determined according to Equation 3 below.

$$SubPbSize[layerId]=1<<\log 2\_sub\_pb\_size\_minus3[layerId]+3 \quad \text{[Equation 3]}$$

Meanwhile, referring to FIG. 7A, the inter-layer video decoding apparatus 20 may obtain the syntax element log 2_sub_pb_size_minus3[layerId] indicating the size of the subblock from the bitstream through a VPS extension syntax.

In other words, the syntax element log 2_sub_pb_size_minus3[layerId] indicating the size of the subblock regarding the certain layer is obtained from the VPS NAL unit included in the bitstream.

Meanwhile, the inter-layer video decoding apparatus 20 may obtain a syntax element indicating a size of a subblock from a SPS NAL unit included in a bitstream.

FIG. 7B is a diagram illustrating a SPS extension syntax according to various embodiments.

Referring to FIG. 7B, the inter-layer video decoding apparatus 20 or 40 may obtain a syntax element log 2_sub_pb_size_minus3[0] 72 from a bitstream. Here, a syntax element log 2_sub_pb_size_minus3[0] indicates a size of a subblock when a layer image is not a depth image.

The inter-layer video decoding apparatus 20 or 40 obtains a SPS NAL unit from the bitstream, and obtain the syntax element log 2_sub_pb_size_minus3[0] 72 from the obtained SPS NAL unit.

Here, different SPS NAL units exist according to layer images, and the syntax element 72 may be obtained according to layer images from the SPS NAL units.

The inter-layer video decoding apparatus 20 or 40 does not parse a syntax element log 2_sub_pb_size_minus3[1] from the bitstream.

Here, the syntax element log 2_sub_pb_size_minus[1] denotes a size of a subblock when the layer image is a depth image.

In other words, only the syntax element log 2_sub_pb_size_minus[0] is parsed from the bitstream and the log 2_sub_pb_size_minus[1] is not parsed from the bitstream from among syntax elements log 2_sub_pb_size_minus3[d].

The syntax element log 2_sub_pb_size_minus3[d] is used to determine a size (SubPbSize) of a subblock according to layers using an inter-layer merge candidate.

The syntax element log 2_sub_pb_size_minus3[d] denotes a size of a subblock according to layers using an inter-layer merge candidate. In detail, the log 2_sub_pb_size_minus3[0] may denote a value obtained by adding log 2 to a size of a subblock regarding a color image and then subtracting 3 from the result value, and the log 2_sub_pb_size_minus3[1] may denote a value obtained by adding log 2 to a size of a subblock regarding a depth image and then subtracting 3 from the result value.

Meanwhile, when the syntax element log 2_sub_pb_size_minus3[d] does not exist, a value obtained by adding log 2 to a maximum size of a coding unit and then subtracting 3 from the result value (CtbLog 2SizeY) may be derived.

Accordingly, the syntax element log 2_sub_pb_size_minus3[1] may be a value obtained by subtracting 3 from the CtbLog 2SizeY.

Meanwhile, the syntax element log 2_sub_pb_size_minus3[d] may be a value within a range equal to or greater than a value obtained by subtracting 3 from a value (MinCb Log 2SizeY) of adding log 2 to a minimum size of a coding unit and equal to or less than a value obtained by subtracting 3 from a value (MaxCb Log 2SizeY) of adding log 2 to a maximum size of a coding unit.

Meanwhile, the subblock size (SubPbSize) of the certain layer may be determined according to Equation 4 below.

$$\text{SubPbSize}=1<<(\log 2\_\text{sub}\_\text{pb}\_\text{size}\_\text{minus3}[\text{DepthFlag}]+3) \quad \text{[Equation 4]}$$

Here, DepthFlag denotes a flag indicating whether a certain layer image is a depth image.

The inter-layer video decoding apparatus 20 or 40 may determine a subblock-based inter-layer motion vector candidate by using locations (xPb, yPb) of a current prediction unit, a width and a height (nPbW and nPbH) of the current prediction unit, a reference viewpoint index (refViewIdx), and a disparity vector (mvDisp).

Here, before determining the inter-layer motion vector candidate according to subblocks, a vertical component of the disparity vector (mvDisp) is changed to 0, and the subblock-based inter-layer motion vector candidate may be determined by using the changed disparity vector.

Meanwhile, it is a premise that operations described with reference to FIGS. 5 through 7B are performed by the inter-layer video decoding apparatus 20 or 40, but it would be obvious to one of ordinary skill in the art that the same operations may also be performed by the inter-layer video encoding apparatus 10 or 30.

Referring to FIG. 7B, the inter-layer video decoding apparatus 20 or 40 may obtain a syntax element log 2_mpi_sub_pb_size_minus3[1] 73 from a bitstream.

The syntax element log 2_mpi_sub_pb_size_minus3[1] denotes a size of a subblock when a layer image is a depth image. The syntax element log 2_mpi_sub_pb_size_minus3[1] may be used to determine a size of a subblock for MPI encoding and decoding.

The inter-layer video decoding apparatus 20 or 40 obtains a SPS NAL unit from the bitstream, and obtain the syntax element 72 from the SPS NAL unit.

Here, different SPS NAL units exist according to layer images, and the syntax element 73 may be obtained according to layer images from the SPS NAL units.

The inter-layer video decoding apparatus 20 or 40 does not parse a syntax element log 2_mpi_sub_pb_size_minus3[0] from the bitstream. The syntax element log 2_mpi_sub_pb_size_minus3[0] denotes a size of a subblock when a layer image is not a depth image. The syntax element log 2_mpi_sub_pb_size_minus3[0] may be used to determine a size of a subblock for MPI encoding and decoding.

Meanwhile, only the syntax element log 2_mpi_sub_pb_size_minus[1] from among the syntax elements log 2_mpi_sub_pb_size_minus3[d] is parsed from the bitstream, and the log 2_mpi_sub_pb_size_minus[0] is not parsed from the bitstream. Meanwhile, the syntax element log 2_mpi_sub_pb_size_minus3[d] may be used to determine a size (MpiSubPbSize) of a subblock according to layers using an inter-layer merge candidate.

The syntax element log 2_mpi_sub_pb_size_minus3[d] denotes a size of a subblock according to layers using an inter-layer merge candidate. In detail, the log 2_mpi_sub_pb_size_minus3[0] may be a value obtained by subtracting 3 from a value of adding log 2 to a size of a subblock regarding a color image, and the log 2_mpi_sub_pb_size_minus3[1] may be a value obtained by subtracting 3 from a value of adding log 2 to a size of a subblock regarding a depth image.

The inter-layer video decoding apparatus 20 or 40 may determine the size (MpiSubPbSize) of the subblock according to layers by using the syntax element sub_pb_size_minus[1] according to Equation 5 below.

$$Mpi\text{SubPbSize}=1<<(\log 2\_mpi\_\text{sub}\_\text{pb}\_\text{size}\_\text{minus3}[\text{DepthFlag}]+3) \quad \text{[Equation 5]}$$

Here, a flag DepthFlag is a flag indicating whether a layer image is a depth image.

As described above, the inter-layer video encoding apparatus 10 according to various embodiments and the inter-layer video decoding apparatus 20 according to various embodiments may spilt blocks of video data into coding units having a tree structure, and coding units, prediction units, and transformation units may be used for inter-layer prediction or inter prediction of coding units. Hereinafter, a video encoding method, a video encoding apparatus, a video decoding method, and a video decoding apparatus based on coding units having a tree structure and transformation units, according to various embodiments, will be described with reference to FIGS. 8 through 20.

In principle, during encoding and decoding processes for a multi-layer video, encoding and decoding processes for first layer images and encoding and decoding processes for second layer images are separately performed. In other words, when inter-layer prediction is performed on a multi-layer video, encoding and decoding results of single-layer videos may be mutually referred to, but separate encoding and decoding processes are performed according to single-layer videos.

Accordingly, since video encoding and decoding processes based on coding units having a tree structure as described below with reference to FIGS. 8 through 20 for convenience of description are video encoding and decoding processes for processing a single-layer video, only inter prediction and motion compensation are performed. However, as described above with reference to FIGS. 1A through 7B, in order to encode and decode a video stream, inter-layer prediction and compensation are performed on base layer images and second layer images.

Figure 8:
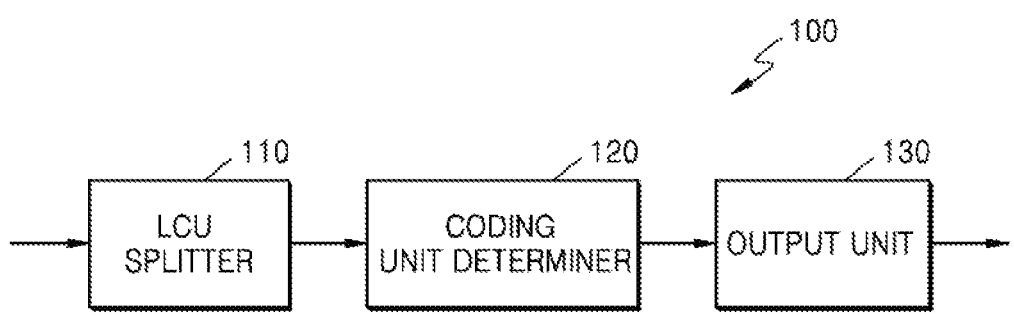
FIG. 8 is a block diagram of a video encoding apparatus based on coding units according to a tree structure, according to an embodiment.

Accordingly, in order for the encoder 12 of the inter-layer video encoding apparatus 10 according to various embodiments to encode a multi-layer video based on coding units having a tree structure, the inter-layer video encoding apparatus 10 may include as many video encoding apparatuses 100 of FIG. 8 as the number of layers of the multi-layer video so as to perform video encoding according to each single-layer video, thereby controlling each video encoding apparatus 100 to encode an assigned single-layer video. Also, the inter-layer video encoding apparatus 10 may perform inter-view prediction by using encoding results of individual single viewpoints of each video encoding apparatus 100. Accordingly, the encoder 12 of the inter-layer video encoding apparatus 10 may generate a base view video stream and a second layer video stream, which include encoding results according to layers.

Figure 9:
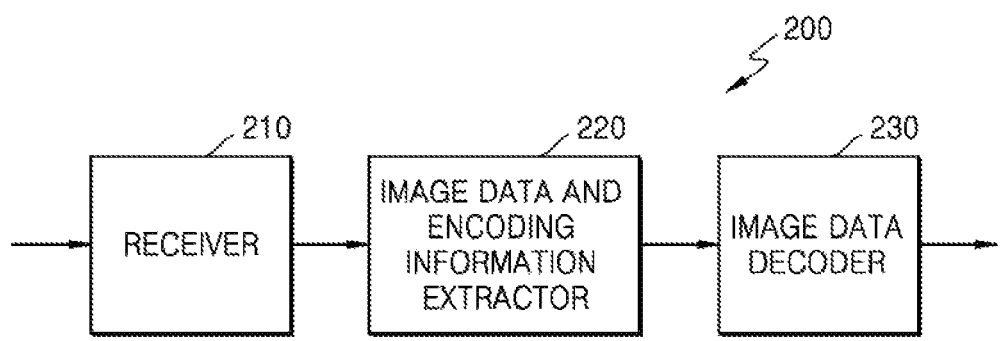
FIG. 9 is a block diagram of a video decoding apparatus based on coding units according to a tree structure, according to an embodiment.

Similarly, in order for the decoder 26 of the inter-layer video decoding apparatus 20 according to various embodiments to decode a multi-layer video based on coding units having a tree structure, the inter-layer video decoding apparatus 20 may include as many video decoding apparatuses 200 of FIG. 9 as the number of layers of the multi-layer video so as to perform video decoding according to layers with respect to a received first layer video stream and a received second layer video stream, thereby controlling each video decoding apparatus 200 to decode an assigned single-layer video. Also, the inter-layer video decoding apparatus 200 may perform inter-layer compensation by using a decoding result of an individual single layer of each video decoding apparatus 200. Accordingly, the decoder 26 of the inter-layer video decoding apparatus 20 may generate first layer images and second layer images, which are reconstructed according to layers.

FIG. 8 is a block diagram of the video encoding apparatus 100 based on coding units according to a tree structure, according to an embodiment of the present disclosure.

The video encoding apparatus 100 according to an embodiment involving video prediction based on coding units according to a tree structure includes a coding unit determiner 120 and an output unit 130. Hereinafter, for convenience of description, the video encoding apparatus 10 according to an embodiment involving video prediction based on coding units according to a tree structure will be abbreviated to the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to various embodiments may be a data unit having a size of 32×32, 64×64, 128×128, 256×256, etc., wherein a shape of the data unit is a square having a width and length in squares of 2.

A coding unit according to various embodiments may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to various embodiments is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a final depth by encoding the image data in the deeper coding units according to depths, according to the largest coding unit largest coding unit of the current picture, and selecting a depth having the least encoding error. The determined final depth and the encoded image data according to the determined coded depth are output to the output unit 130.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to various embodiments may determine coding units having a tree structure included in the largest coding unit. The 'coding units having a tree structure' according to various embodiments include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to various embodiments is an index related to the number of splitting times from a largest coding unit to a minimum coding unit. A first maximum depth according to various embodiments may denote the total number of splitting times from the largest coding unit to the minimum coding unit. A second maximum depth according to various embodiments may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the minimum coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 100 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to various embodiments, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to various embodiments include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to various embodiments may also perform the transformation on the image data in a coding unit based not only on the coding unit for encoding the image data, but also based on a data unit that is different from the coding unit. In order to perform the transformation in the coding unit, the transformation may be performed based on a transformation unit having a size less than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to various embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to various embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth, but also about information related to prediction encoding and transformation. Accordingly, the coding unit determiner 120 not only determines a depth having a least encoding error, but also determines a partition mode of splitting a prediction unit into a partition, a prediction mode according to prediction units, and a size of a transformation unit for transformation.

Coding units according to a tree structure in a largest coding unit and methods of determining a prediction unit/partition, and a transformation unit, according to various embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one depth determined by the coding unit determiner 120, and split information according to the depth, in bitstreams.

The encoded image data may be obtained by encoding residual data of an image.

The split information according to depth may include information about the depth, about the partition mode in the prediction unit, about the prediction mode, and about split of the transformation unit.

The information about the final depth may be defined by using split information according to depths, which indicates whether encoding is performed on coding units of a lower depth instead of a current depth. If the current depth of the current coding unit is a depth, the current coding unit is encoded, and thus the split information may be defined not to split the current coding unit to a lower depth. Alternatively, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and split information is determined for a coding unit of a depth, at least one piece of split information may be determined for one largest coding unit. Also, a depth of the image data of the largest coding unit may be different according to locations since the image data is hierarchically split according to depths, and thus a depth and split information may be set for the image data.

Accordingly, the output unit 130 according to various embodiments may assign a corresponding depth and encoding information about an encoding mode to at least one of the coding unit, the prediction unit, and a minimum unit included in the largest coding unit.

The minimum unit according to various embodiments is a square data unit obtained by splitting the minimum coding unit constituting the lowermost depth by 4. Alternatively, the minimum unit according to various embodiments may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information.

In the video encoding apparatus 100 according to the simplest embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include as many video encoding apparatuses 100 as the number of layers, in order to encode single-layer images according to layers of a multi-layer video. For example, the first layer encoder 12 may include one video encoding apparatus 100 and the second layer encoder 16 may include as many video encoding apparatuses 100 as the number of second layers.

When the video encoding apparatus 100 encodes first layer images, the coding unit determiner 120 may determine, for each largest coding unit, a prediction unit for inter-prediction according to coding units having a tree structure, and perform inter-prediction according to prediction units.

Even when the video encoding apparatus 100 encodes second layer images, the coding unit determiner 120 may determine, for each largest coding unit, coding units and prediction units having a tree structure, and perform inter-prediction according to prediction units.

The video encoding apparatus 100 may encode a luminance difference to compensate for a luminance difference between a first layer image and a second layer image. However, whether to perform luminance may be determined according to an encoding mode of a coding unit. For example, luminance compensation may be performed only on a prediction unit having a size of 2N×2N.

FIG. 9 is a block diagram of the video decoding apparatus 200 based on coding units according to a tree structure, according to various embodiments of the present disclosure.

The video decoding apparatus 200 according to an embodiment that involves video prediction based on coding units having a tree structure includes a receiver 210, an image data and encoding information extractor 220, and an image data decoder 230. For convenience of description, the video decoding apparatus 200 according to an embodiment that involves video prediction based on coding units having a tree structure will be abbreviated to the 'video decoding apparatus 200'.

Definitions of various terms, such as a coding unit, a depth, a prediction unit, a transformation unit, and various split information, for decoding operations of the video decoding apparatus 200 according to various embodiments are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each largest coding unit, from the parsed bitstream. The extracted final depth and split information are output to the image data decoder 230. In other words, the image data in a bit stream is split into the largest coding unit so that the image data decoder 230 decodes the image data for each largest coding unit.

A depth and split information according to the largest coding unit may be set for at least one piece of depth information, and split information may include information about a partition mode of a corresponding coding unit, about a prediction mode, and about split of a transformation unit. Also, split information according to depths may be extracted as the information about a depth.

The depth and the split information according to each largest coding unit extracted by the image data and encoding information extractor 220 is a depth and split information determined to generate a minimum encoding error when an encoder, such as the video encoding apparatus 100 according to various embodiments, repeatedly performs encoding for each deeper coding unit according to depths according to each largest coding unit. Accordingly, the video decoding apparatus 200 may reconstruct an image by decoding the image data according to a coded depth and an encoding mode that generates the minimum encoding error.

Since encoding information according to various embodiments about a depth and an encoding mode may be assigned to a predetermined data unit from among a corresponding coding unit, a prediction unit, and a minimum unit, the image data and encoding information extractor 220 may extract the depth and the split information according to the predetermined data units. If the depth and the split information of a corresponding largest coding unit is recorded according to predetermined data units, the predetermined data units to which the same depth and the same split information is assigned may be inferred to be the data units included in the same largest coding unit.

The image data decoder 230 may reconstruct the current picture by decoding the image data in each largest coding unit based on the depth and the split information according to the largest coding units. In other words, the image data decoder 230 may decode the encoded image data based on the extracted information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial region of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode encoded data in the current largest coding unit by using the information about the partition mode of the prediction unit, the prediction mode, and the size of the transformation unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The inter-layer video decoding apparatus 20 described above with reference to FIG. 2A may include the number of video decoding apparatuses 200 as much as the number of viewpoints, so as to reconstruct first layer images and second layer images by decoding a received first layer image stream and a received second layer image stream.

When the first layer image stream is received, the image data decoder 230 of the video decoding apparatus 200 may split samples of first layer images extracted from the first layer image stream by the image data and encoding information extractor 220 into coding units having a tree structure. The image data decoder 230 may reconstruct the first layer images by performing motion compensation according to prediction units for inter prediction, on the coding units having the tree structure obtained by splitting the samples of the first layer images.

When the second layer image stream is received, the image data decoder 230 of the video decoding apparatus 200 may split samples of second layer images extracted from the second layer image stream by the image data and encoding information extractor 220 into coding units having a tree structure. The image data decoder 230 may reconstruct the second layer images by performing motion compensation according to prediction units for inter prediction, on the coding units obtained by splitting the samples of the second layer images.

The extractor 220 may obtain information related to a luminance error from a bitstream so as to compensate for a luminance difference between a first layer image and a second layer image. However, whether to perform luminance may be determined according to an encoding mode of a coding unit. For example, luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. In other words, the coding units having the tree structure determined to be the optimum coding units in each largest coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

Figure 10:
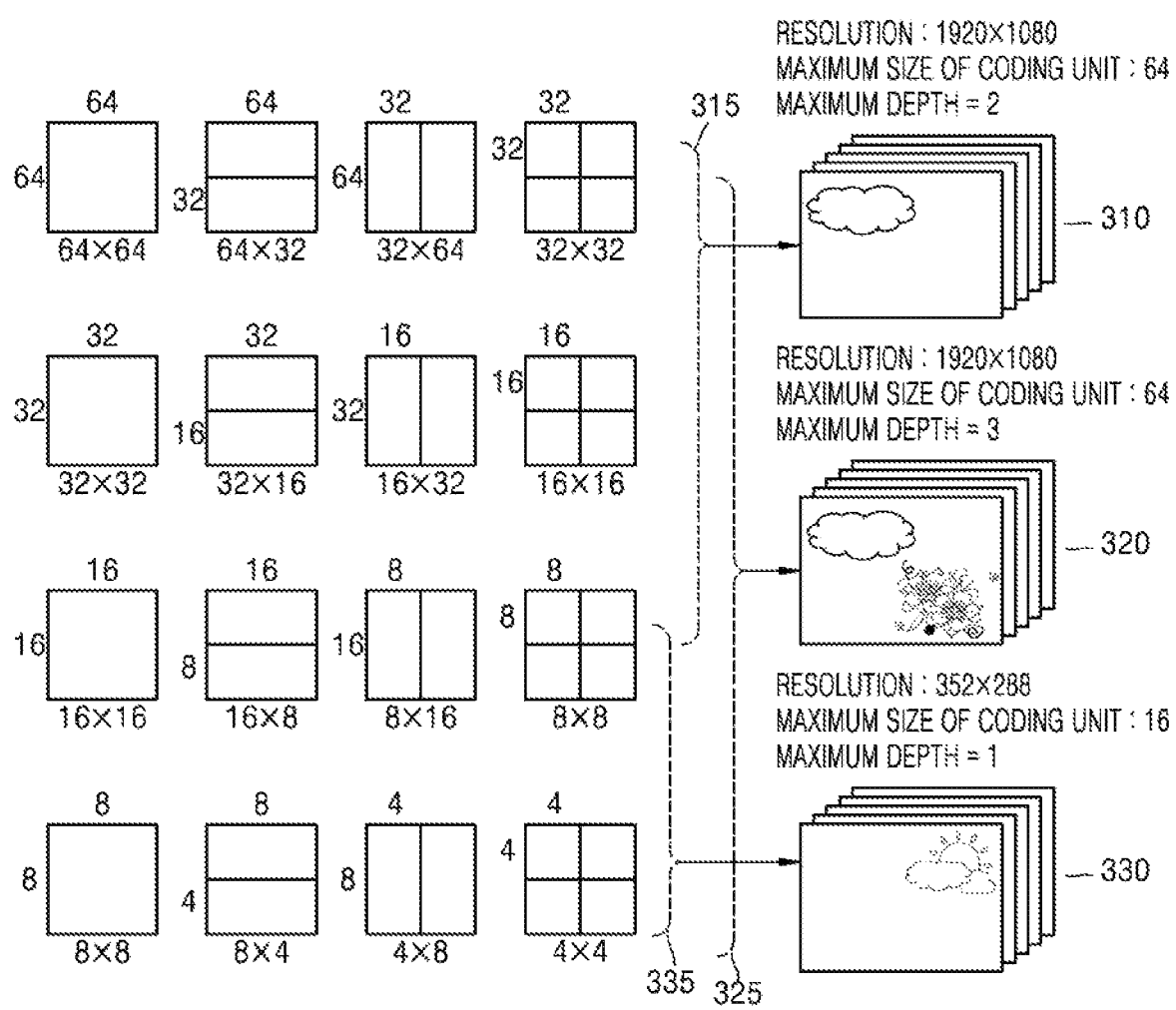
FIG. 10 is a diagram for describing a concept of coding units according to various embodiments of the present disclosure.

FIG. 10 is a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a largest coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
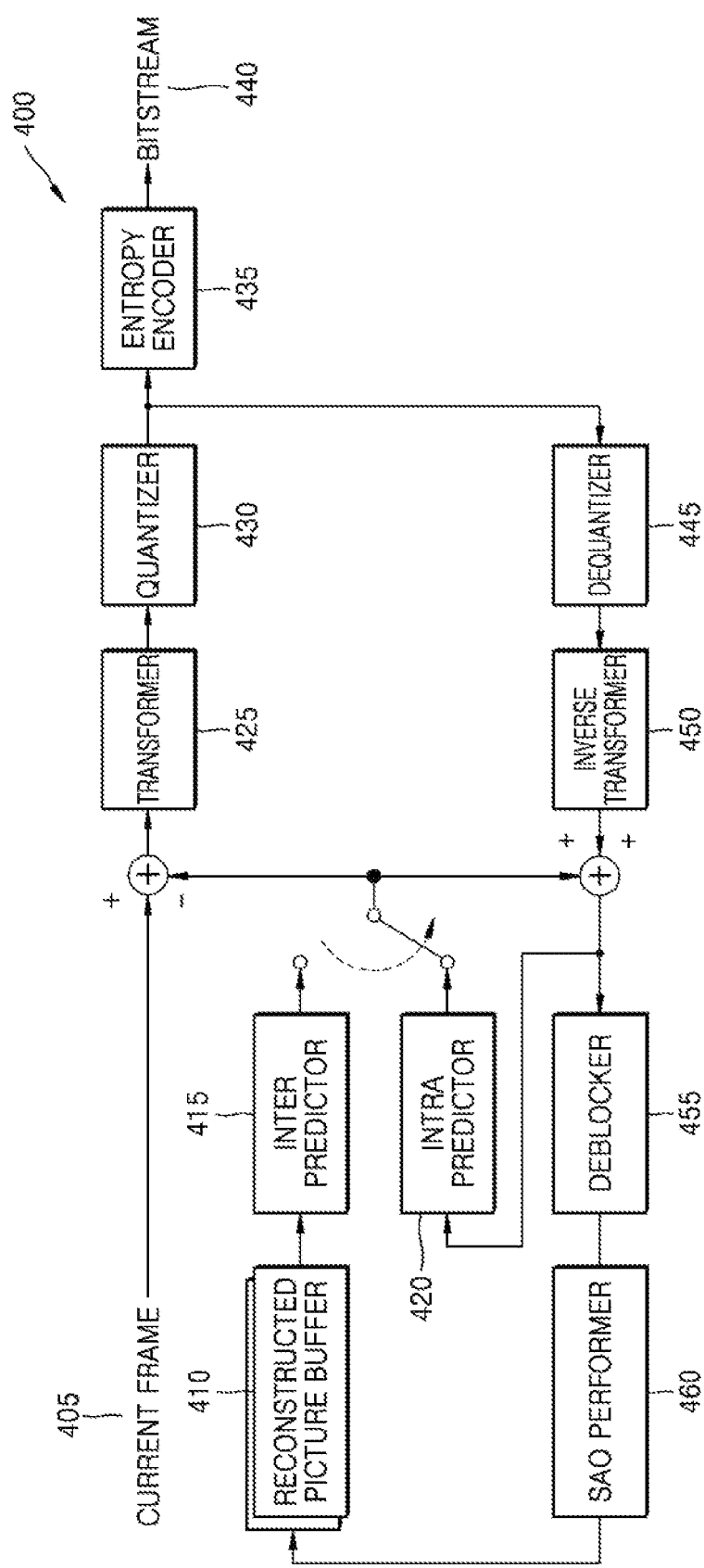
FIG. 11 is a block diagram of an image encoder based on coding units, according to various embodiments of the present disclosure.

FIG. 11 is a block diagram of an image encoder 400 based on coding units, according to various embodiments.

The image encoder 400 according to some embodiments performs operations of the coding unit determiner 120 of the video encoding apparatus 100 to encode image data. In other words, an intra predictor 420 performs intra prediction on coding units in an intra mode, from among a current frame 405, per prediction unit, and an inter predictor 415 performs inter prediction on coding units in an inter mode by using the current image 405 and a reference image obtained by a restored picture buffer 410, per prediction unit. The current picture 405 may be split into largest coding units, and then the largest coding units may be sequentially encoded. Here, the encoding may be performed on coding units split in a tree structure from the largest coding unit.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is restored to residual data in a spatial domain through an inverse quantizer 445 and an inverse transformer 450. The residual data in the spatial domain is added to the prediction data of the coding unit of each mode output from the intra predictor 420 or the inter predictor 415 to be restored as data in a spatial domain of the coding unit of the current image 405. The data in the spatial domain passes through a deblocker 455 and a sample adaptive offset (SAO) performer 460 and thus a restored image is generated. The restored image is stored in the restored picture buffer 410. Restored images stored in the restored picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 according to some embodiments to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per largest coding unit.

Specifically, the intra predictor 420 and the inter predictor 415 determine partitions and a prediction mode of each coding unit from among the coding units having a tree structure while considering the maximum size and the maximum depth of a current largest coding unit, and the transformer 425 may determine whether to split a transformation unit according to a quad-tree in each coding unit from among the coding units having the tree structure.

Figure 12:
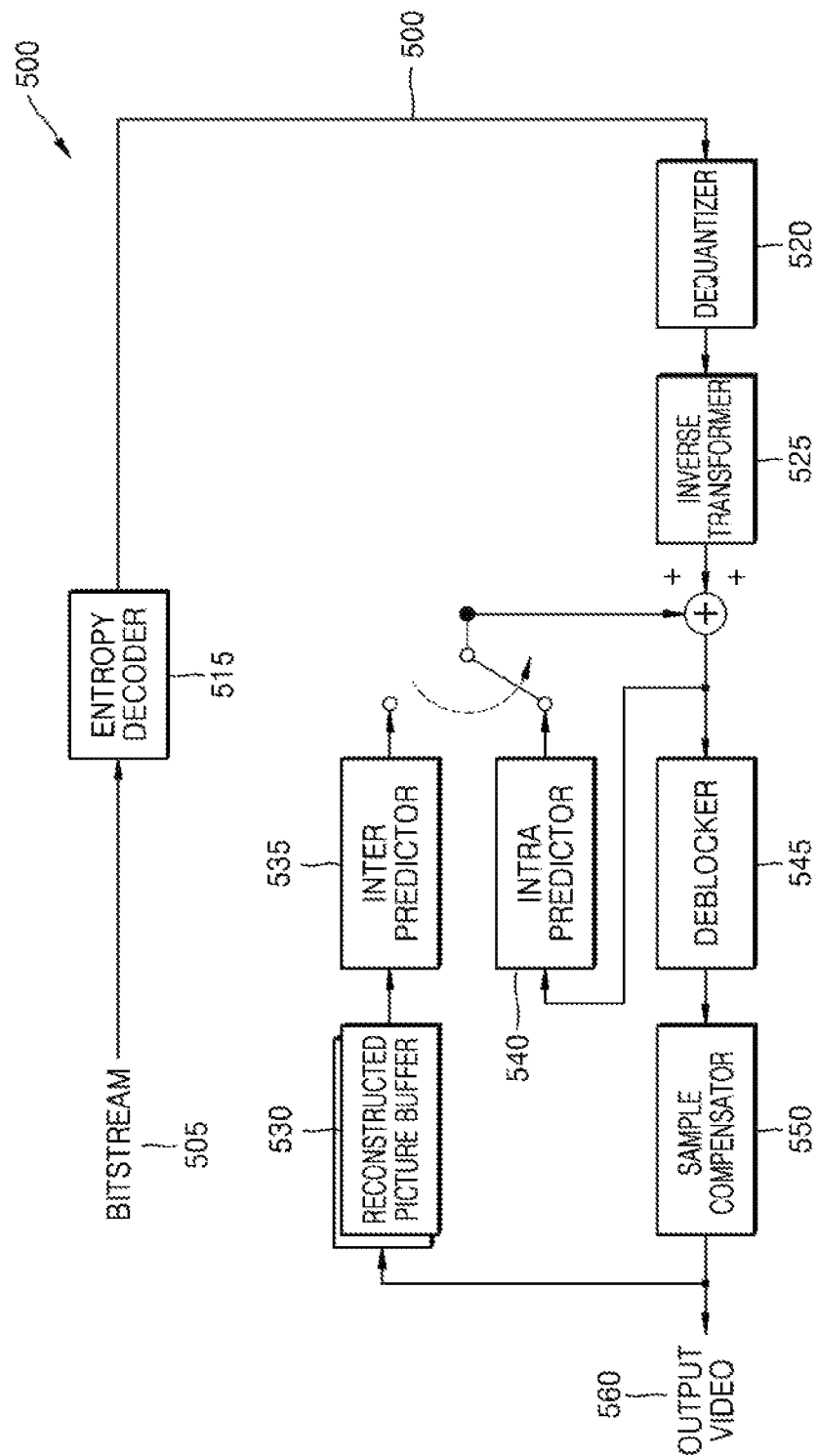
FIG. 12 is a block diagram of an image decoder based on coding units, according to various embodiments of the present disclosure.

FIG. 12 is a block diagram of an image decoder 500 based on coding units according to some embodiments.

An entropy decoder 515 parses encoded image data that is to be decoded and encoding information required for decoding from a bitstream 505. The encoded image data is a quantized transformation coefficient, and an inverse quantizer 520 and an inverse transformer 525 restores residual data from the quantized transformation coefficient.

An intra predictor 540 performs intra prediction on a coding unit in an intra mode according to prediction units. An inter predictor performs inter prediction on a coding unit in an inter mode from a current image according to prediction units, by using a reference image obtained by a restored picture buffer 530.

Data in a spatial domain of coding units of the current image is restored by adding the residual data and the prediction data of a coding unit of each mode through the intra predictor and the inter predictor 535, and the data in the spatial domain may be output as a restored image through a deblocking unit 545 and an SAO performer 550. Also, restored images stored in the restored picture buffer 530 may be output as reference images.

In order to decode the image data in the image data decoder 230 of the video decoding apparatus 200, operations after the entropy decoder 515 of the image decoder 500 according to some embodiments may be performed.

In order for the image decoder 500 to be applied in the video decoding apparatus 200 according to some embodiments, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each largest coding unit.

Specifically, the intra prediction 540 and the inter predictor 535 determine a partition mode and a prediction mode according to each of coding units having a tree structure, and the inverse transformer 525 may determine whether to split a transformation unit according to a quad-tree structure per coding unit.

An encoding operation of FIG. 10 and a decoding operation of FIG. 11 are respectively a video stream encoding operation and a video stream decoding operation in a single layer. Accordingly, when the encoder 16 of FIG. 1A encodes a video stream of at least two layers, the video encoding apparatus 100 of FIG. 1A may include as many image encoder 400 as the number of layers. Similarly, when the decoder 22 of FIG. 2A decodes a video stream of at least two layers, the video decoding apparatus 200 of FIG. 2A may include as many image decoders 500 as the number of layers.

Figure 13:
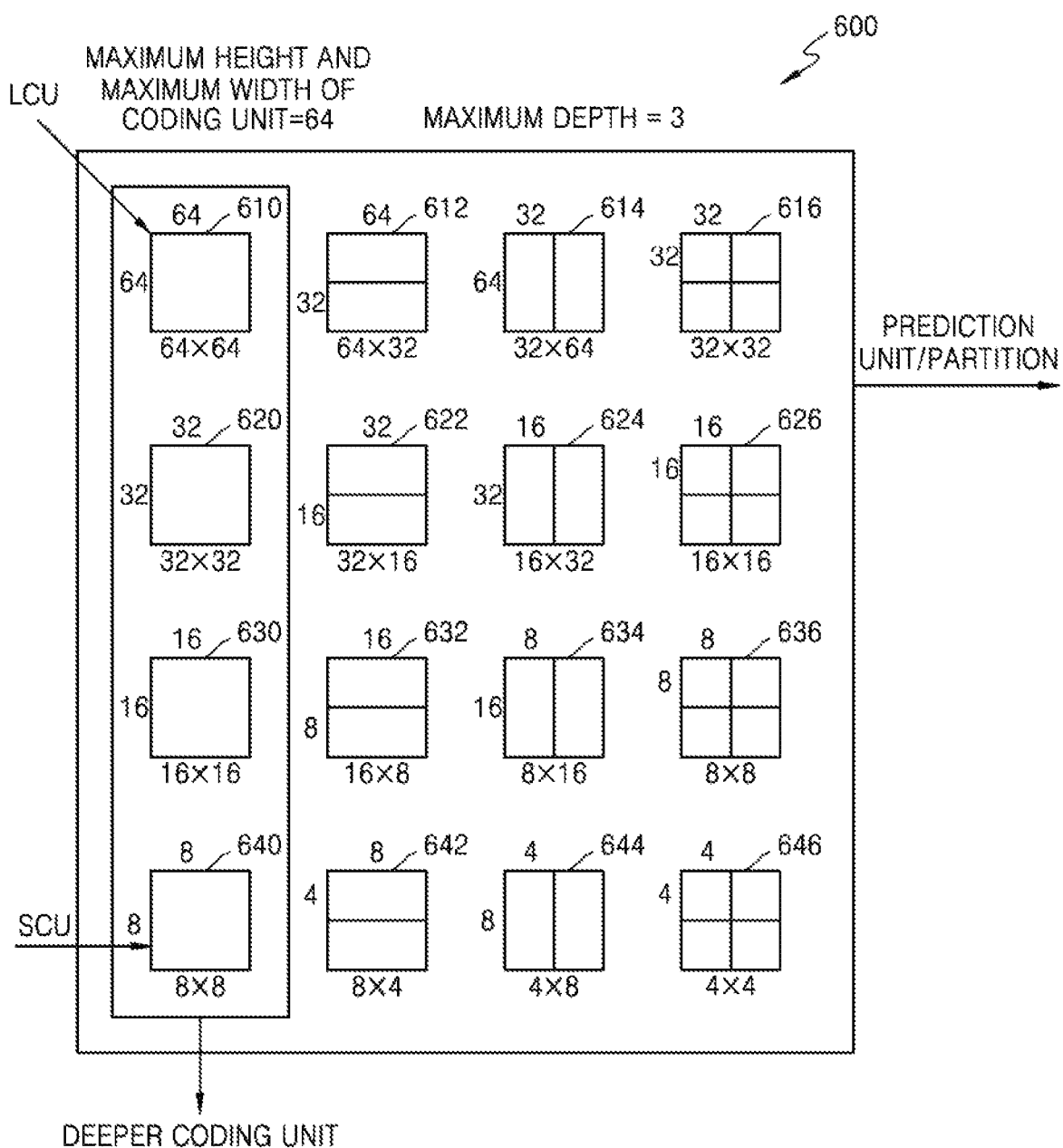
FIG. 13 is a diagram illustrating coding units and partitions, according to various embodiments of the present disclosure.

FIG. 13 is a diagram illustrating coding units and partitions, according to various embodiments of the present disclosure.

The video encoding apparatus 100 according to various embodiments and the video decoding apparatus 200 according to various embodiments use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to various embodiments, the maximum height and the maximum width of the coding units are each 64, and the maximum depth is 3. In this case, the maximum depth refers to a total number of times the coding unit is split from the largest coding unit to the minimum coding unit. Since a depth deepens along a vertical axis of the hierarchical structure 600 of coding units according to various embodiments, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the depth of the largest coding unit 610, the coding unit determiner 120 of the video encoding apparatus 100 according to various embodiments performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the largest coding unit 610 may be selected as the depth and a partition mode of the largest coding unit 610.

Figure 14:
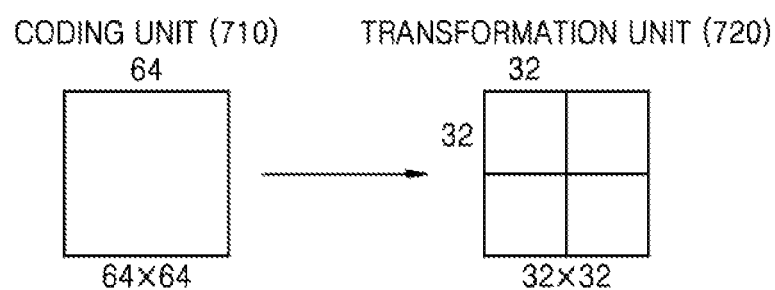
FIG. 14 is a diagram for describing a relationship between a coding unit and transformation units, according to various embodiments of the present disclosure.

FIG. 14 is a diagram for describing a relationship between a coding unit and transformation units, according to some embodiments of the present disclosure.

The video encoding apparatus 100 according to various embodiments or the video decoding apparatus 200 according to various embodiments encodes or decodes an image according to coding units having sizes less than or equal to a largest coding unit for each largest coding unit. Sizes of transformation units for transformation during encoding may be selected based on data units that are not larger than a corresponding coding unit.

For example, in the video encoding apparatus 100 according to various embodiments or the video decoding apparatus 200 according to various embodiments, if a size of a coding unit 710 is 64×64, transformation may be performed by using a transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
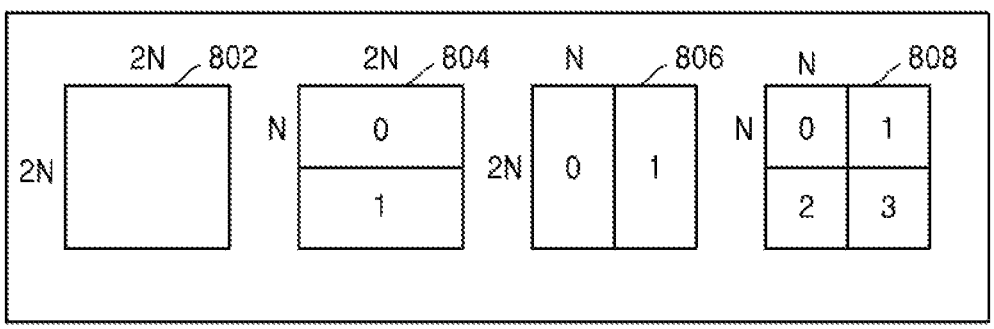
FIG. 15 is a diagram for describing encoding information according to an embodiment of the present disclosure.
Figure 15:
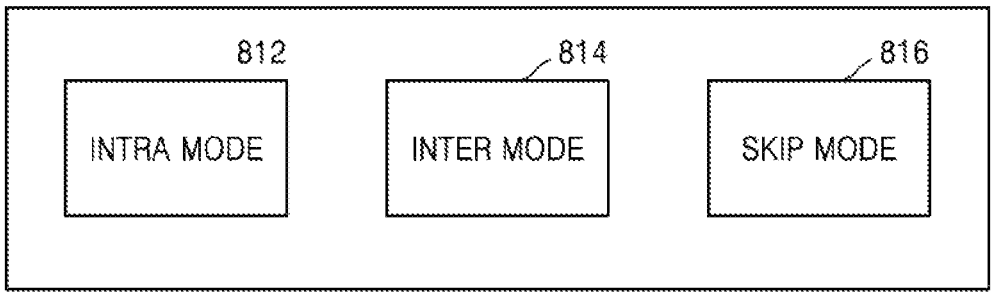
Figure 15:
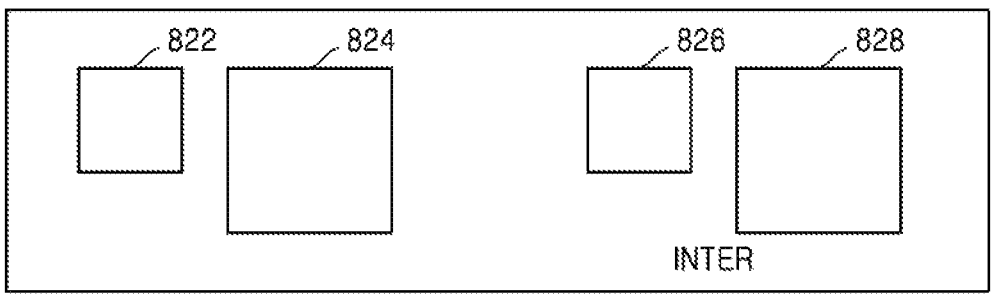

FIG. 15 is a diagram for describing encoding information according to various embodiments.

The output unit 130 of the video encoding apparatus 100 according to various embodiments may encode and transmit information 800 about a partition mode, information 810 about a prediction mode, and information 820 about a size of a transformation unit for each coding unit corresponding to a depth, as split information.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 according to various embodiments may extract and use the information 800, 810, and 820 for decoding, according to each deeper coding unit.

Figure 16:
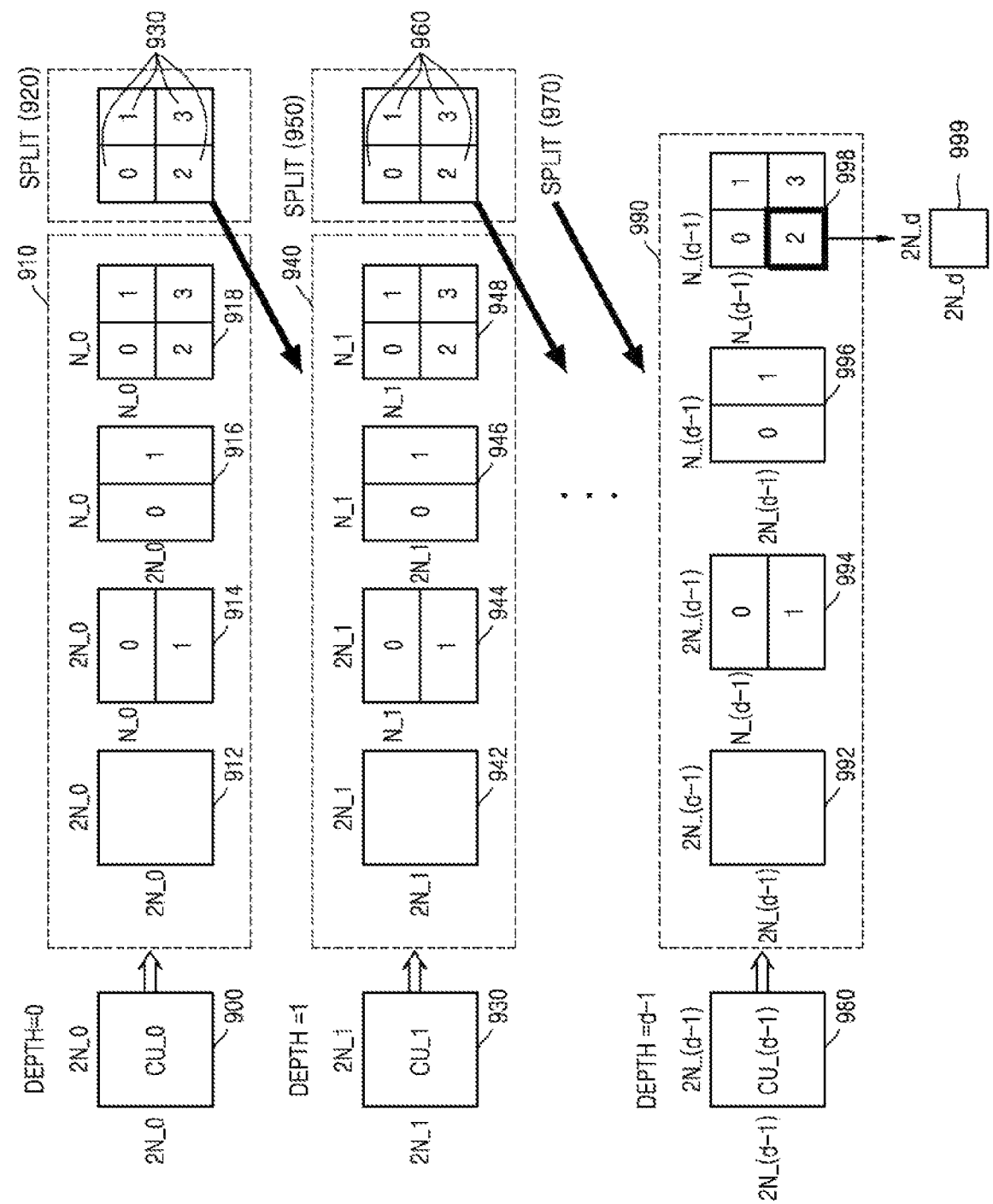
FIG. 16 is a diagram of coding units according to various embodiments of the present disclosure.

FIG. 16 is a diagram of deeper coding units according to depths, according to various embodiments.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. FIG. 9 only illustrates the partitions 912 through 918 which are obtained by symmetrically splitting the prediction unit, but a partition mode is not limited thereto, and the partitions of the prediction unit may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes to search for a partition mode having a minimum encoding error.

Even when the partition mode 998 has the minimum encoding error, since a maximum depth is d, a coding unit CU_(d−1) having a depth of d−1 is no longer split to a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to various embodiments may be a square data unit obtained by splitting a minimum coding unit having a lowermost depth by 4. By performing the encoding repeatedly, the video encoding apparatus 100 according to various embodiments may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a d depth. The depth, the partition mode of the prediction unit, and the prediction mode may be encoded and transmitted as split information. Also, since a coding unit is split from a depth of 0 to a depth, only split information of the depth is set to 0, and split information of depths excluding the depth is set to 1.

The image data and encoding information extractor 220 of the video decoding apparatus 200 according to various embodiments may extract and use the information about the depth and the prediction unit of the coding unit 900 to decode the partition 912. The video decoding apparatus 200 according to various embodiments may determine a depth, in which split information is 0, as a depth by using split information according to depths, and use split information of the corresponding depth for decoding.

Figure 17:
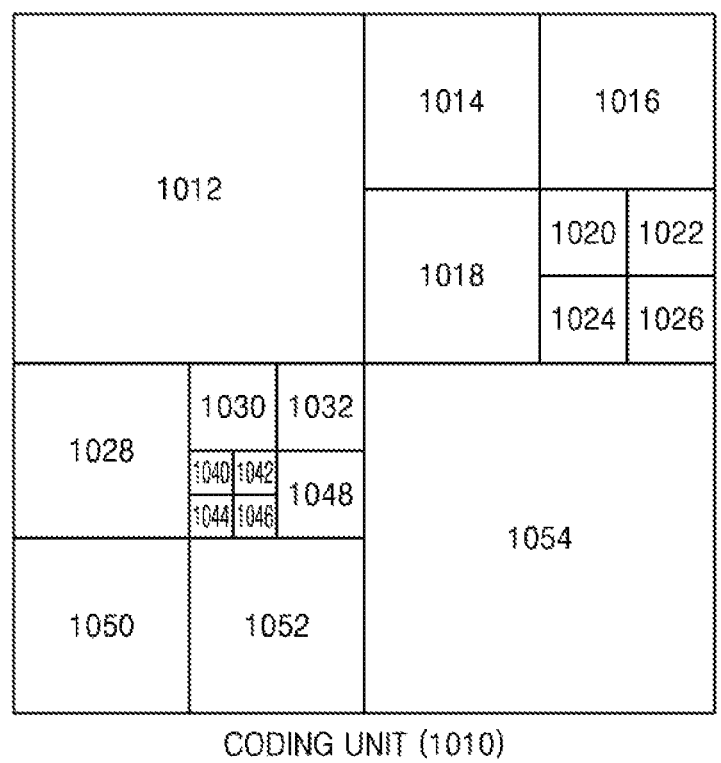
FIGS. 17 through 19 are diagrams for describing a relationship between coding units, prediction units, and transformation units, according to various embodiments of the present disclosure.
Figure 18:
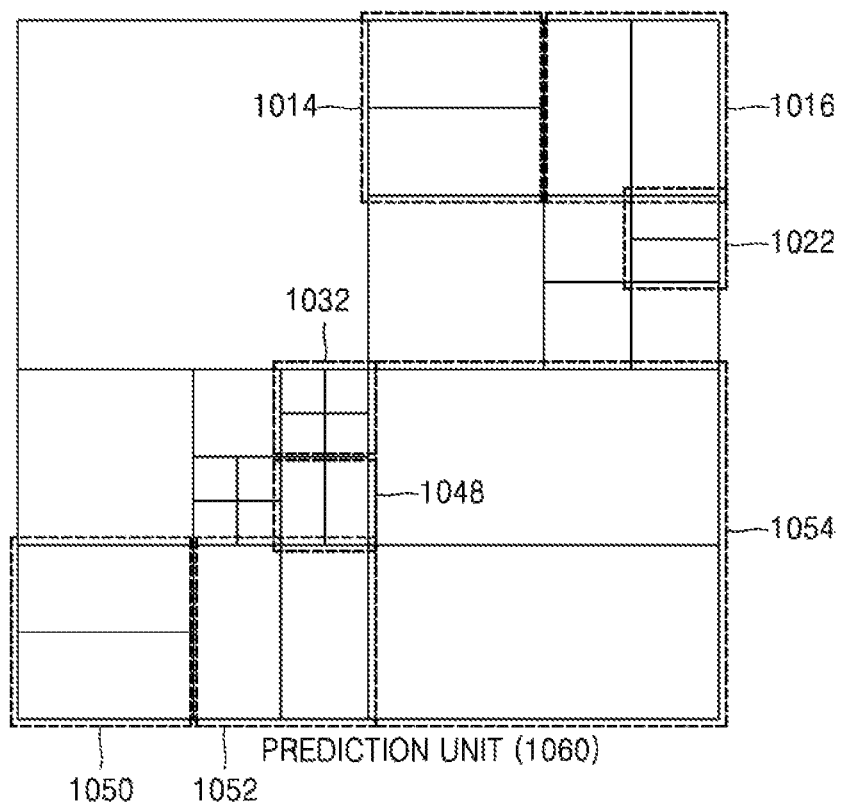
Figure 19:
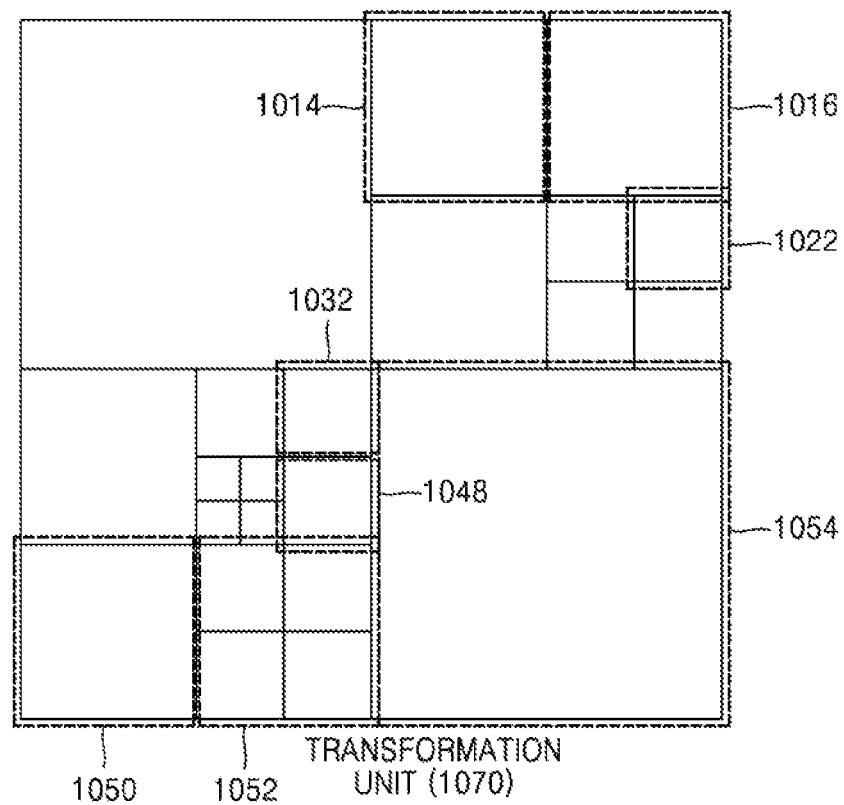

FIGS. 17 through 19 are diagrams for describing a relationship between coding units, prediction units, and transformation units, according to various embodiments.

Coding units 1010 are coding units having a tree structure, according to depths determined by the video encoding apparatus 100 according to various embodiments, in a largest coding unit. Prediction units 1060 are partitions of prediction units of each of coding units according to depths, and transformation units 1070 are transformation units of each of coding units according to depths.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition modes in the coding units 1014, 1022, 1050, and 1054 have a size of 2N×N, partition modes in the coding units 1016, 1048, and 1052 have a size of N×2N, and a partition modes of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 according to various embodiments may perform intra prediction, motion estimation, motion compensation, transformation, and inverse transformation individually on a data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transformation unit. Table 1 shows the encoding information that may be set by the video encoding and decoding apparatuses 100 and 200 according to various exemplary embodiments.

embodiments may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition type of the current coding unit is an asymmetrical partition mode, the size of the transformation unit may be N/2×N/2.

TABLE 1

Split Information 0
(Encoding on Coding Unit having Size of 2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 according to various embodiments may output the encoding information about the coding units having a tree structure, and the image data and encoding information extractor 220 of the video decoding apparatus 200 according to various The encoding information about coding units having a tree structure, according to various embodiments, may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
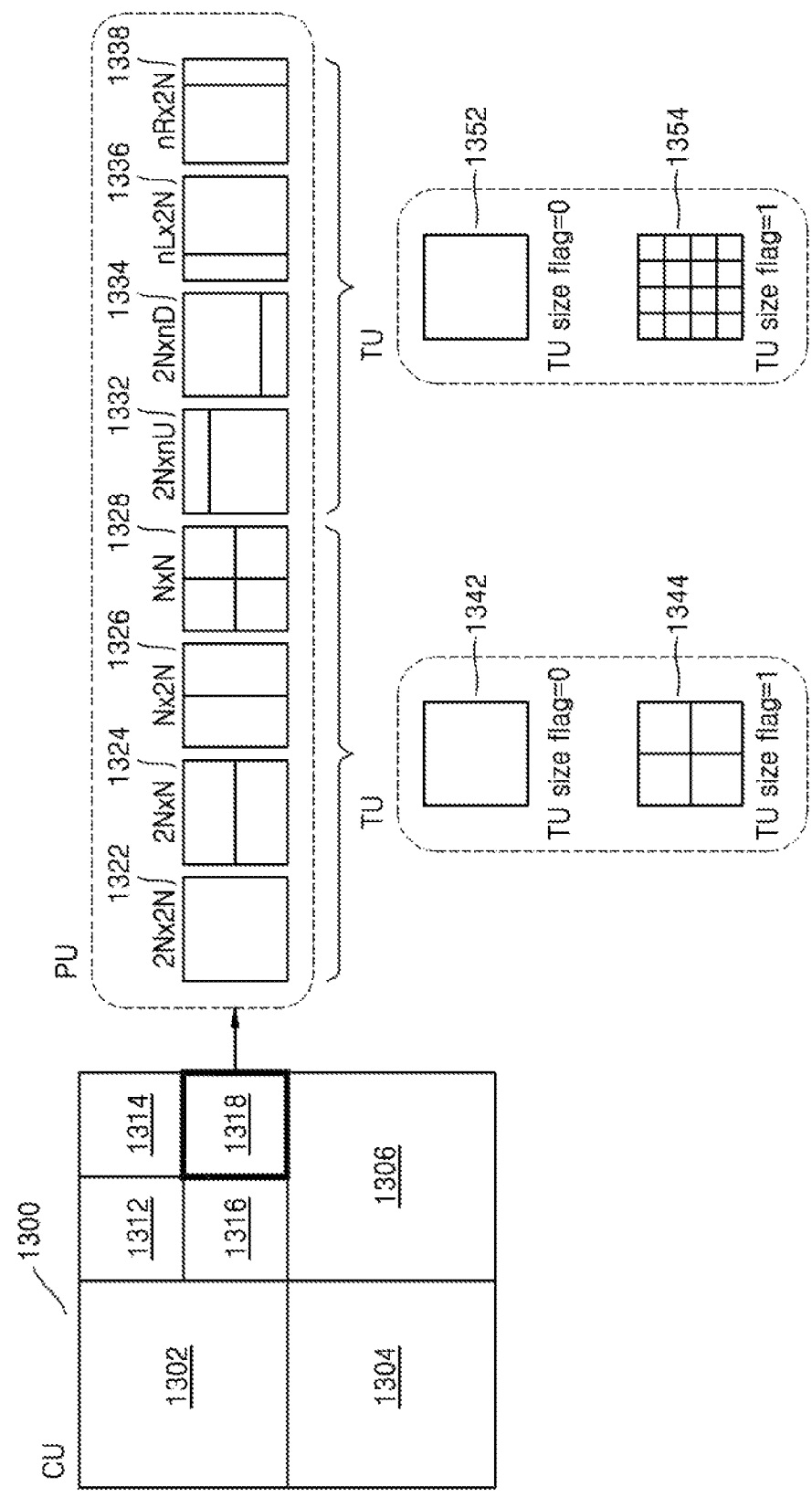
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Split information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag according to some exemplar embodiments is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to various embodiments, together with a maximum size and minimum size of the transformation unit. The video encoding apparatus 100 according to various embodiments is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 according to various embodiments may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to various embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each largest coding unit to reconstruct image data of a spatial region. Thus, a picture and a video that is a picture sequence may be reconstructed. The reconstructed video may be reproduced by a reproducing apparatus, stored in a storage medium, or transmitted through a network.

The embodiments according to the present disclosure may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the inter-layer video encoding method and/or the video encoding method described above with reference to FIGS. 1A through 20 will be collectively referred to as a 'video encoding method of the present disclosure'. In addition, the inter-layer video decoding method and/or the video decoding method described above with reference to FIGS. 1A through 20 will be referred to as a 'video decoding method of the present disclosure'.

Also, a video encoding apparatus including the inter-layer video encoding apparatus 10, the video encoding apparatus 100, or the image encoder 400, which has been described with reference to FIGS. 1A through 20, will be referred to as a 'video encoding apparatus of the present disclosure'. In addition, a video decoding apparatus including the interi-layer video decoding apparatus 20, the video decoding apparatus 200, or the image decoder 500, which has been descried with reference to FIGS. 1A through 20, will be referred to as a 'video decoding apparatus of the present disclosure'.

A computer-readable recording medium storing a program, e.g., a disc 26000, according to various embodiments will now be described in detail.

Figure 21:
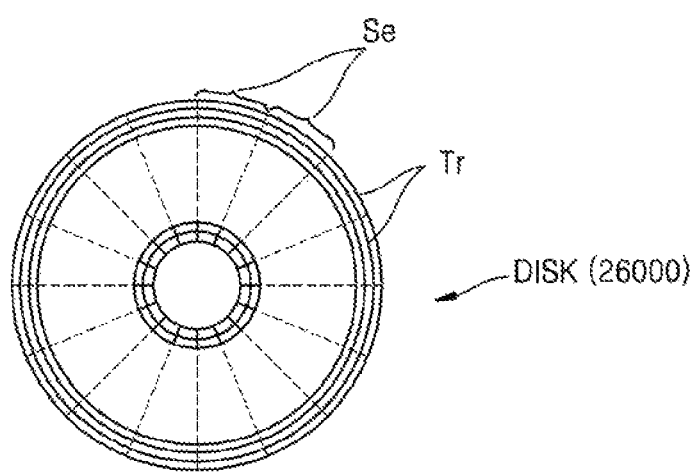
FIG. 21 is a diagram of a physical structure of a disc in which a program is stored, according to various embodiments.

FIG. 21 is a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to the various embodiments, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
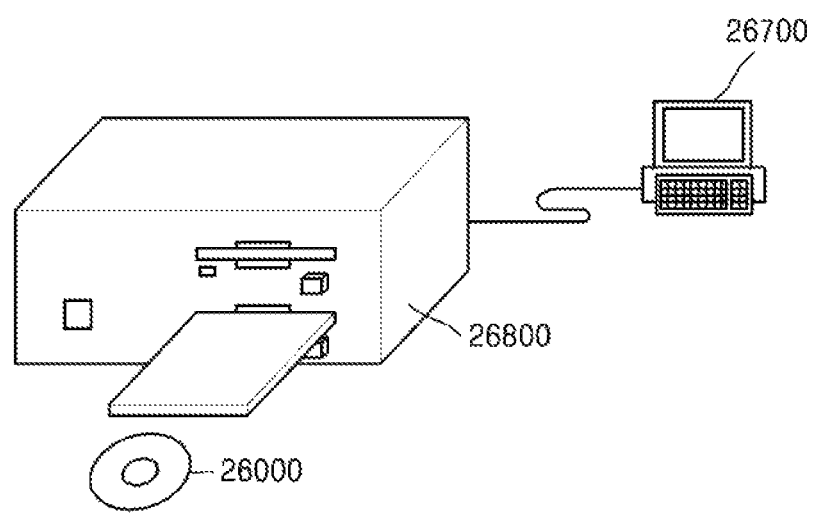
FIG. 22 is a diagram of a disc drive for recording and reading a program by using a disc.

FIG. 22 is a diagram of a disc drive 26800 for recording and reading a program by using the disc 26000. A computer system 27000 may store a program that executes at least one of a video encoding method and a video decoding method of the present disclosure, in the disc 26000 via the disc drive 26800. To run the program stored in the disc 26000 in the computer system 27000, the program may be read from the disc 26000 and be transmitted to the computer system 26700 by using the disc drive 27000.

The program that executes at least one of a video encoding method and a video decoding method of the present disclosure may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
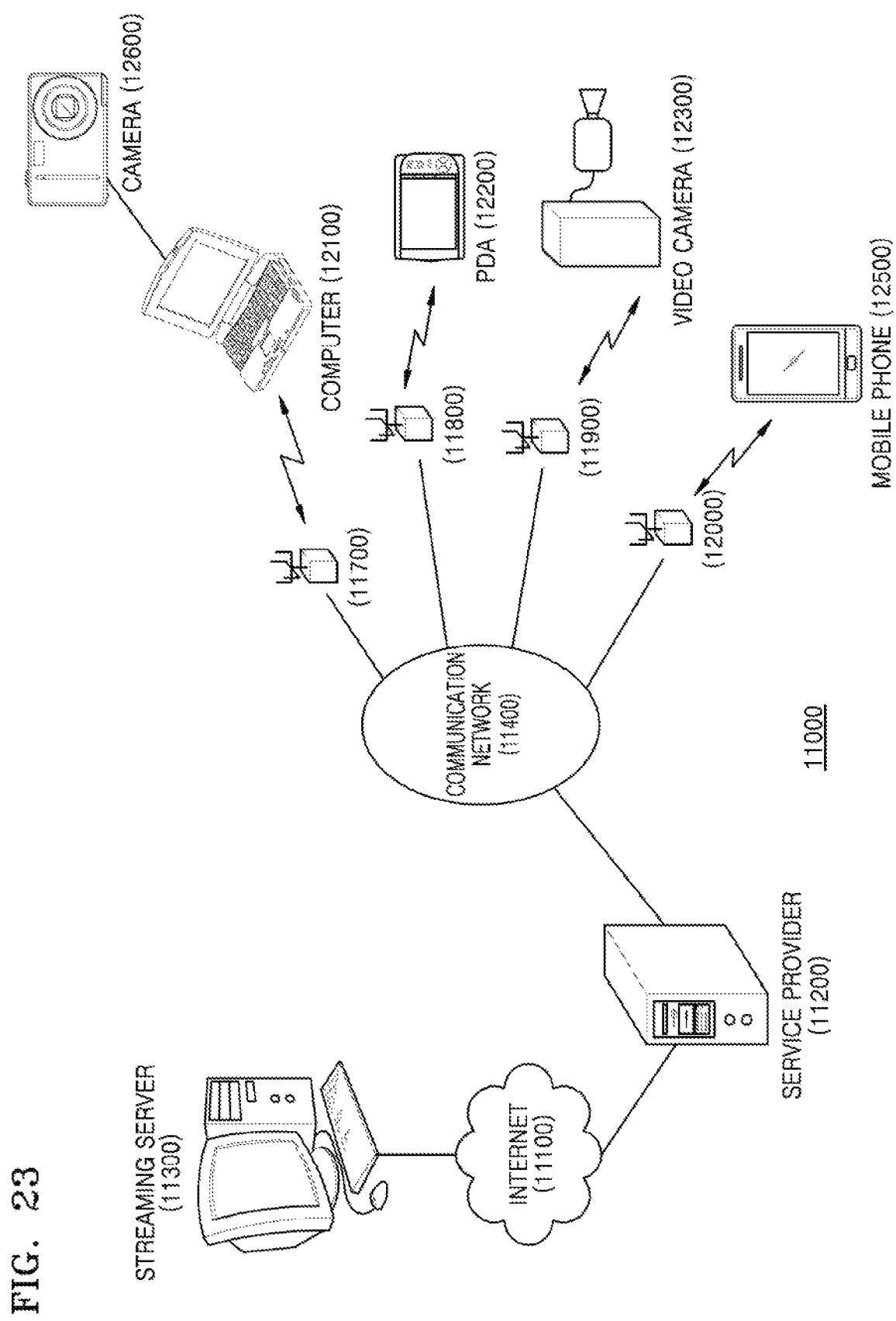
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
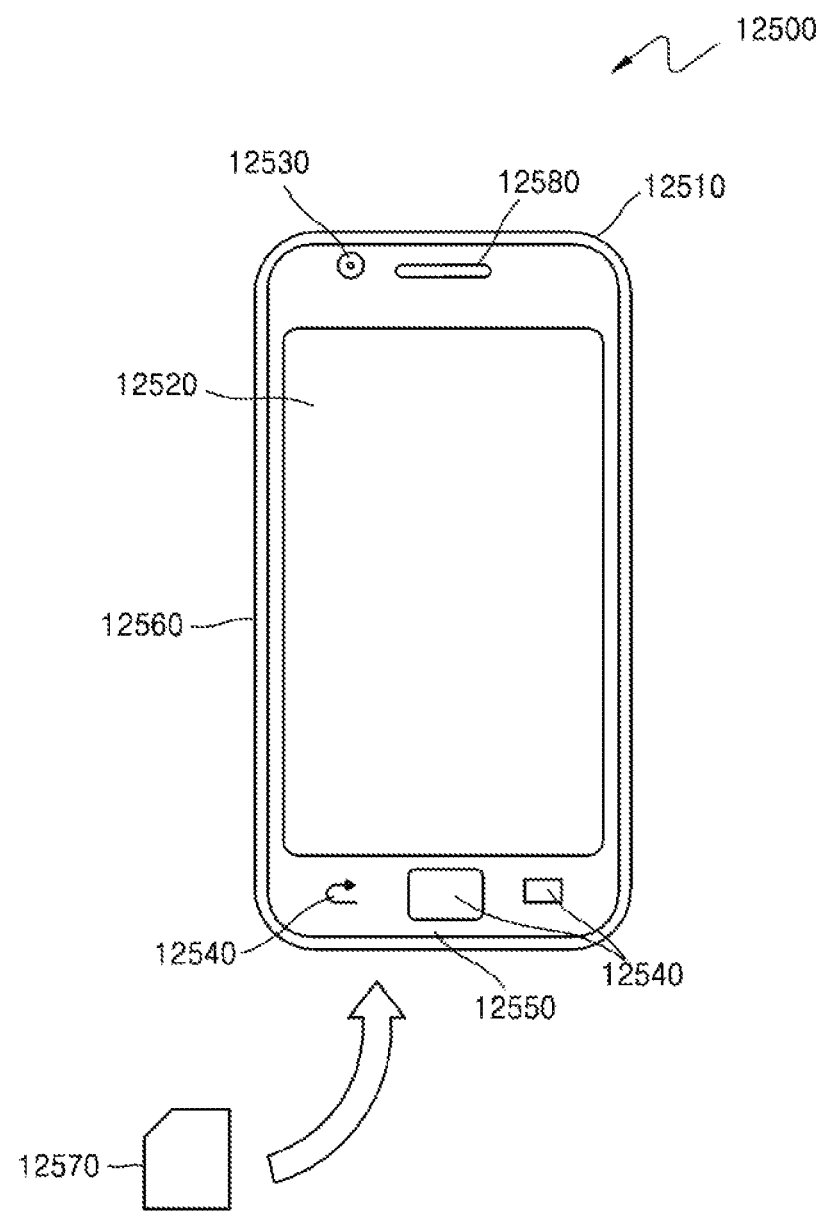
FIGS. 24 and 25 are diagrams respectively of an external structure and an internal structure of a mobile phone to which a video encoding method and a video decoding method are applied, according to various embodiments.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to various embodiments may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus of the present disclosure.

The mobile phone 12500 included in the content supply system 11000 according to an embodiment will now be described in greater detail with referring to FIGS. 24 and 25.

FIG. 24 illustrates an external structure of the mobile phone 12500 to which a video encoding method and a video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
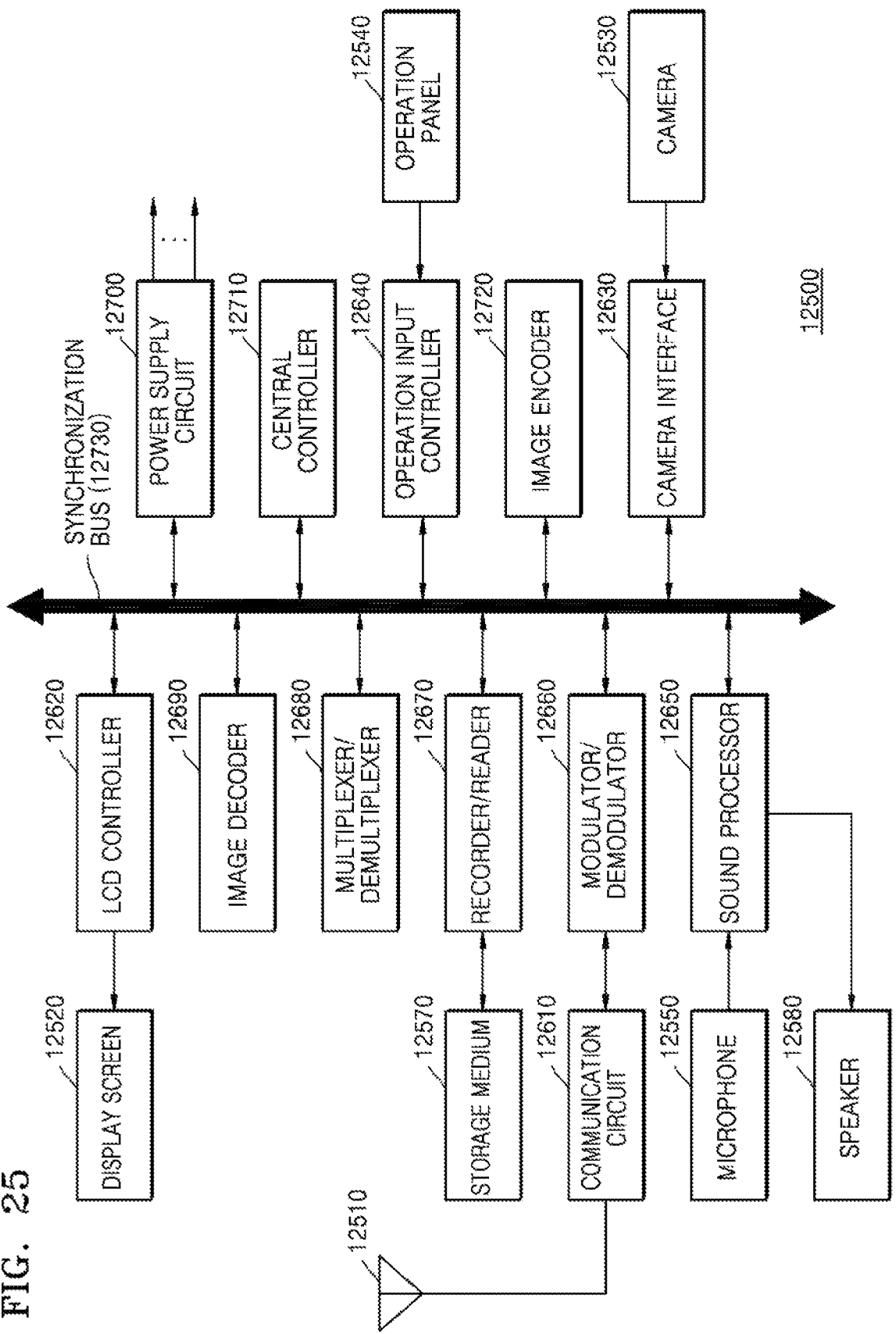

FIG. 25 illustrates an internal structure of the mobile phone 12500. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain reconstructed video data and provide the reconstructed video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus of the present disclosure, may be a transceiving terminal including only the video encoding apparatus, or may be a transceiving terminal including only the video decoding apparatus.

Figure 26:
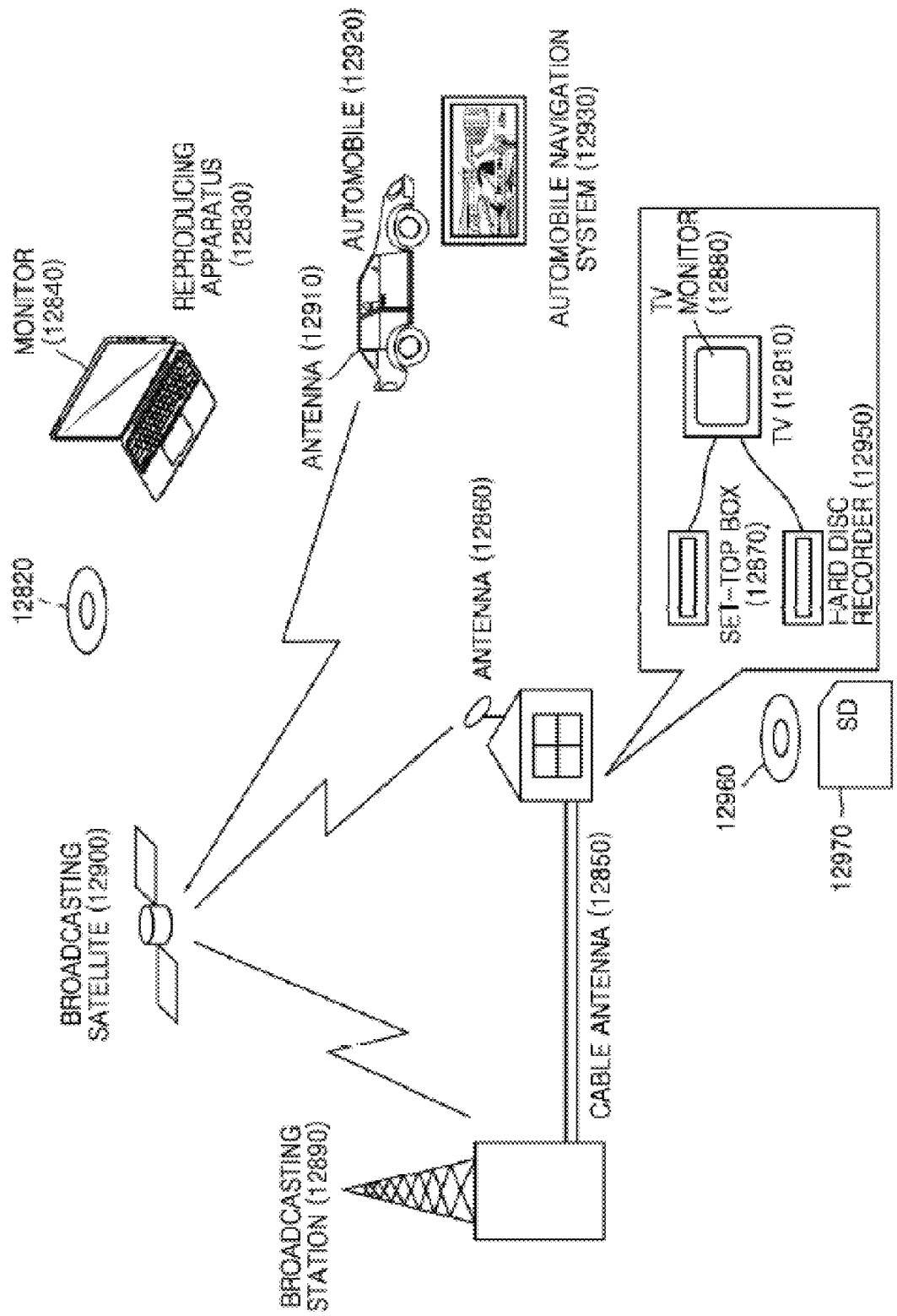
FIG. 26 is a diagram of a digital broadcast system to which a communication system is applied, according to the present disclosure.

A communication system according to the present disclosure is not limited to the communication system described above with reference to FIG. 24. For example, FIG. 26 illustrates a digital broadcasting system employing a communication system, according to various embodiments. The digital broadcasting system of FIG. 26 according to various embodiments may receive a digital broadcast transmitted via a satellite or a terrestrial network by using a video encoding apparatus and a video decoding apparatus of the present disclosure.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus of the present disclosure may be installed.

Data output from the set-top box 12870 may also be reproduced on a TV monitor 12880.

As another example, a video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus of the present disclosure and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus of the present disclosure according to various embodiments, a video signal recorded on the DVD disc 12960, the SD card 12970, or another storage medium may be reproduced on the TV monitor 12880. The automobile navigation system 12930 may not include the camera 12530, the camera interface 12630, and the image encoding unit 12720 of FIG. 26. For example, the computer 12100 and the TV receiver 12810 may not be included in the camera 12530, the camera interface 12630, and the image encoding unit 12720 of FIG. 26.

Figure 27:
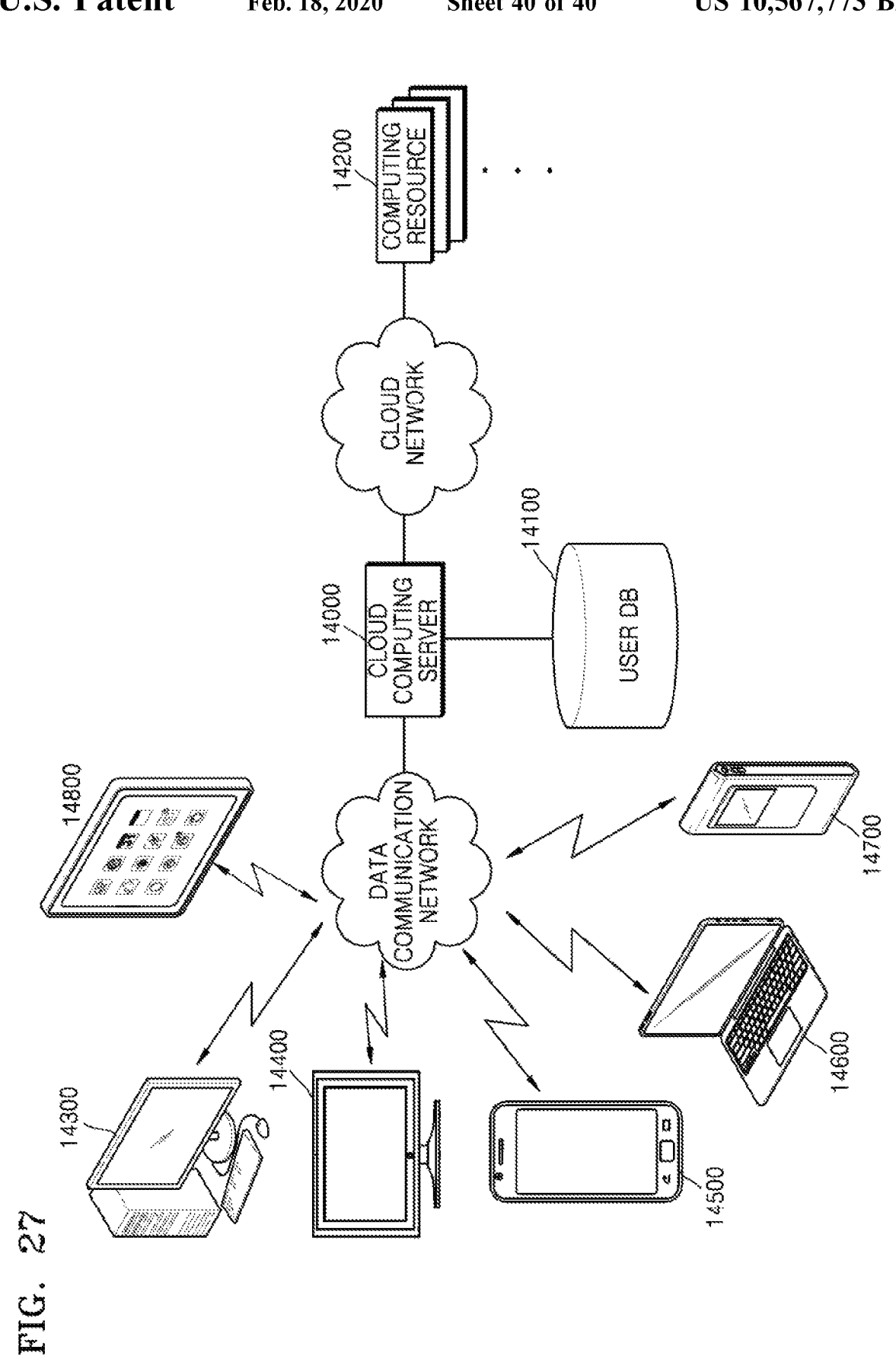
FIG. 27 is a diagram illustrating a network structure of a cloud computing system using a video encoding apparatus and a video decoding apparatus, according to various embodiments of the present disclosure.

FIG. 27 is a diagram illustrating a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus of the present disclosure as described above with reference to FIGS. 1A to 20. As another example, the user terminal may include a video encoding apparatus of the present disclosure as described above with reference to FIGS. 1A to 20. Alternatively, the user terminal may include both the video decoding apparatus and the video encoding apparatus of the present disclosure as described above with reference to FIGS. 1A to 20.

Various applications of a video encoding method, a video decoding method, a video encoding apparatus, and a video decoding apparatus according to various embodiments described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to various embodiments, are not limited to the embodiments described above with reference to FIGS. 21 to 27.

It will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present disclosure.

The invention claimed is:

1. An inter-layer video decoding method comprising:
   obtaining, from a bitstream, subblock size information of a second layer image, which indicates a value about base-2 logarithm of a size of a subblock within a range that is equal to or greater than base-2 logarithm of a minimum size of a coding unit minus 3 and is less than or equal to base-2 logarithm of a maximum size of the coding unit minus 3, wherein the base-2 logarithm of the minimum size of the coding unit is determined based on information indicating the minimum size of the coding obtained from the bitstream and the base-2 logarithm of the maximum size of the coding unit is determined based on the information indicating the minimum size of the coding unit and information indicating a difference between the maximum size of the coding unit and the minimum size of the coding unit obtained from the bitstream;
   determining a size of a subblock from a range that is equal to or greater than the minimum size of the coding unit and is less than or equal to the maximum size of the coding unit, by using the subblock size information obtained from the bitstream;
   determining a candidate block that corresponds to a current block included in the second layer image and is included in a first layer image different from the second layer image, wherein at least one subblock of the first layer is determined from the candidate block based on the size of the subblock and at least one subblock of the second layer is determined from the current block based on the size of the subblock;
   obtaining motion information of the at least one subblock included in the candidate block of the first layer image corresponding to the at least one subblock included in the current block of the second layer image; and
   obtaining or predicting motion information of the current block by using the motion information of the at least one subblock of the first layer image, and decoding the current block by using the obtained or predicted motion information of the current block.

2. The inter-layer video decoding method of claim 1, wherein the determining of the candidate block that corresponds to the current block included in the second layer image and is included in the first layer image different from the second layer image comprises obtaining, from the current block included in the second layer image, a disparity vector pointing to the candidate block included in the first layer image different from the second layer image, wherein a vertical component of the obtained disparity vector is 0.

3. The inter-layer video decoding method of claim 1, wherein the current block is one of one or more prediction units generated as a coding unit of the second layer image is split, and the subblock is a block smaller than or equal to the prediction unit.

4. The inter-layer video decoding method of claim 1, wherein a video parameter set network abstraction layer (VPS NAL) unit or a sequence parameter set network abstraction layer (SPS NAL) unit, which includes the subblock size information, is obtained from a bitstream, and the subblock size information of the second layer image is obtained from the VPS NAL unit or the SPS NAL unit.

5. An inter-layer video encoding method comprising:
determining a size of a subblock of a second layer image from a range that is equal to or greater than a minimum size of a coding unit and less than or equal to a maximum size of the coding unit;
determining a candidate block that corresponds to a current block included in the second layer image and is included in a first layer image different from the second layer image, wherein at least one subblock of the first layer is determined from the candidate block based on the size of the subblock and at least one subblock of the second layer is determined from the current block based on the size of the subblock;
obtaining motion information of the at least one subblock included in the candidate block of the first layer image corresponding to the at least one subblock included in the current block of the second layer image;
obtaining or predicting motion information of the current block by using the obtained motion information of the at least one subblock of the first layer image, and encoding the current block by using the obtained or predicted motion information of the current block; and
generating a bitstream comprising subblock size information indicating a value about base-2 logarithm of the determined size of the subblock minus 3 within a range is equal to or greater than base-2 logarithm of the minimum size of the coding unit minus 3 and is less than or equal to base-2 logarithm of the maximum size of the coding unit minus 3, information indicating the minimum size of the coding unit and information indicating a difference between the minimum size of the coding unit and the maximum size of the coding unit.

6. The inter-layer video encoding method of claim 5, wherein the determining of the candidate block that corresponds to the current block included in the second layer image and is included in the first layer image different from the second layer image comprises obtaining, from the current block included in the second layer image, a disparity vector pointing to the candidate block included in the first layer image different from the second layer image, wherein a vertical component of the obtained disparity vector is 0.

7. The inter-layer video encoding method of claim 5, wherein the current block is one of one or more prediction units generated as a coding unit of the second layer image is split, and the subblock is a block smaller than or equal to the prediction unit.

8. The inter-layer video encoding method of claim 5, wherein the generating of the bitstream comprising the subblock size information indicating the determined size of the subblock comprises:

generating a video parameter set network abstraction layer (VPS NAL) unit or a sequence parameter set network abstraction layer (SPS NAL) unit, which comprises the subblock size information; and
generating the bitstream comprising the VPS NAL unit or the SPS NAL unit.

\* \* \* \* \*